(12) United States Patent
Goche

(10) Patent No.: US 10,903,770 B1
(45) Date of Patent: Jan. 26, 2021

(54) ENHANCED REVERSE-WINDING INDUCTION MOTOR DESIGNS, SYSTEMS, AND METHODS

(71) Applicant: Adventech, LLC, Florence, AL (US)

(72) Inventor: Gerald Goche, Sarasota, FL (US)

(73) Assignee: Adventech, LLC, Florence, AL (US)

( * ) Notice: Subject to any disclaimer, the term of this patent is extended or adjusted under 35 U.S.C. 154(b) by 0 days.

(21) Appl. No.: 16/772,721

(22) PCT Filed: Jan. 14, 2020

(86) PCT No.: PCT/US2020/013538
§ 371 (c)(1),
(2) Date: Jun. 12, 2020

(51) Int. Cl.
*H02P 23/00* (2016.01)
*H02P 23/26* (2016.01)
(Continued)

(52) U.S. Cl.
CPC ............... *H02P 23/26* (2016.02); *H02P 1/54* (2013.01); *H02P 23/20* (2016.02); *H02P 23/24* (2016.02); *H02P 2207/01* (2013.01)

(58) Field of Classification Search
USPC ........................................................ 318/560
See application file for complete search history.

(56) References Cited

U.S. PATENT DOCUMENTS

| | | |
|---|---|---|
| 2,100,660 A | 11/1937 | Greiner |
| 3,291,998 A | 12/1966 | Wildi |

(Continued)

FOREIGN PATENT DOCUMENTS

| | | |
|---|---|---|
| CA | 2609605 C | 12/2006 |
| CN | 104038004 A | 10/2014 |

(Continued)

OTHER PUBLICATIONS

Power Management, Waveform audit: is your inductor saturated?, https://e2e.ti.com/blogs_/b/powerhouse/archive/2016/09/22/waveform-audit, Jul. 19, 2019, 4 pages.

(Continued)

*Primary Examiner* — Bentsu Ro
(74) *Attorney, Agent, or Firm* — Santangelo Law Offices, P.C.

(57) ABSTRACT

Enhanced network power factor corrective designs are presented that can use corrective devices that achieve long-term, operationally stable mechanical work. Embodiments can utilize reverse-winding induction motor designs with engineerable parameters and configurations for the reverse winding (13) in systems and through methods where an inductive motor (1) can present a current that leads voltage and a leading power factor (16) to correct other existing induction motors (8) in an initial network (9) or be optimized for a particular application. Designs also present a power factor correction that can present a variable correction without altering the character or physical capacitive value of an electrical correction component. Individual induction motors that have leading current and a leading power factor (16) can be provided to improve reverse winding induction motors. Progressive start controls (23) can also be used in a manner that limits inrush current to operational levels with passive current establishment control where reverse winding (13) effects can be used and perhaps even delayed to passively limit and even effect a current decrease while rotational acceleration continues after initial start transition.

18 Claims, 40 Drawing Sheets

(51) Int. Cl.
*H02P 1/54* (2006.01)
*H02P 23/24* (2016.01)
*H02P 23/20* (2016.01)

(56) References Cited

U.S. PATENT DOCUMENTS

| | | | | |
|---|---|---|---|---|
| 3,707,661 | A * | 12/1972 | King | H02H 7/0816 318/484 |
| 4,063,135 | A | 12/1977 | Wanlass | |
| 4,095,149 | A | 6/1978 | Wanlass | |
| 4,134,052 | A | 1/1979 | Wanlass et al. | |
| 4,152,630 | A | 5/1979 | Wanlass | |
| 4,187,457 | A | 2/1980 | Wanlass | |
| 4,338,557 | A | 7/1982 | Wanlass | |
| 4,446,416 | A | 5/1984 | Wanlass | |
| 4,672,298 | A | 6/1987 | Rohatyn | |
| 5,013,981 | A * | 5/1991 | Rodi | H02P 7/2985 318/105 |
| 5,212,435 | A | 5/1993 | Dutro | |
| 5,838,127 | A | 11/1998 | Young et al. | |
| 6,775,280 | B1 * | 8/2004 | Ma | H04L 45/00 370/230 |
| 6,995,537 | B1 * | 2/2006 | Plutowski | G11B 5/5565 318/400.04 |
| 7,034,426 | B2 | 4/2006 | Goche | |
| 7,221,684 | B1 * | 5/2007 | Smith | H04L 69/04 370/393 |
| 7,227,288 | B2 | 6/2007 | Goche | |
| 8,093,857 | B1 | 1/2012 | Kolomeitsev | |
| 8,773,062 | B2 | 7/2014 | Kolomeitsev | |
| 9,997,983 | B2 | 6/2018 | Nordstrom et al. | |
| 2014/0232301 | A1 * | 8/2014 | Dittmer | H02J 7/007 318/139 |
| 2014/0253054 | A1 | 9/2014 | Frampton et al. | |
| 2015/0349598 | A1 | 12/2015 | Gieras et al. | |
| 2016/0204683 | A1 | 7/2016 | Nordstrom et al. | |
| 2016/0337878 | A1 * | 11/2016 | Frederiksen | H04W 24/02 |
| 2016/0352204 | A1 | 12/2016 | Li et al. | |

FOREIGN PATENT DOCUMENTS

| | | |
|---|---|---|
| JP | 2017070101 A | 6/2017 |
| RU | 2559197 C2 | 10/2015 |
| SI | 24416 A | 12/2014 |
| WO | 2004001933 A2 | 12/2003 |
| WO | 2006130565 | 12/2006 |

OTHER PUBLICATIONS

Wikipedia, Saturation (magnetic), https://en.wikipedia.org/wiki/Saturation_(magnetic), Jul. 19, 2019, 3 pages.

Quora, What is inductor saturation current?, https://www.quora.com/What-is-inductor-saturation-current, Jul. 19, 2019, 4 pages.

Circuit Digese, What is Inductor Coupling—Inductors in Series & Parallel Combinations, https://circuitdigest.com/tutorial/what-is-inductor-coupling-series-and-parallel-combinations, Jul. 19, 2019, 16 pages.

International Application No. PCT/US20/13538 filed Jan. 14, 2020. First Named Inventor: Goche.

International Application No. PCT/US20/13538 filed Jan. 14, 2020. First Named Inventor: Goche. International Search Report dated May 29, 2020. 4 pages.

International Application No. PCT/US20/13538 filed Jan. 14, 2020. First Named Inventor: Goche. Written Opinion of the International Searching Authority dated May 29, 2020. 10 pages.

* cited by examiner

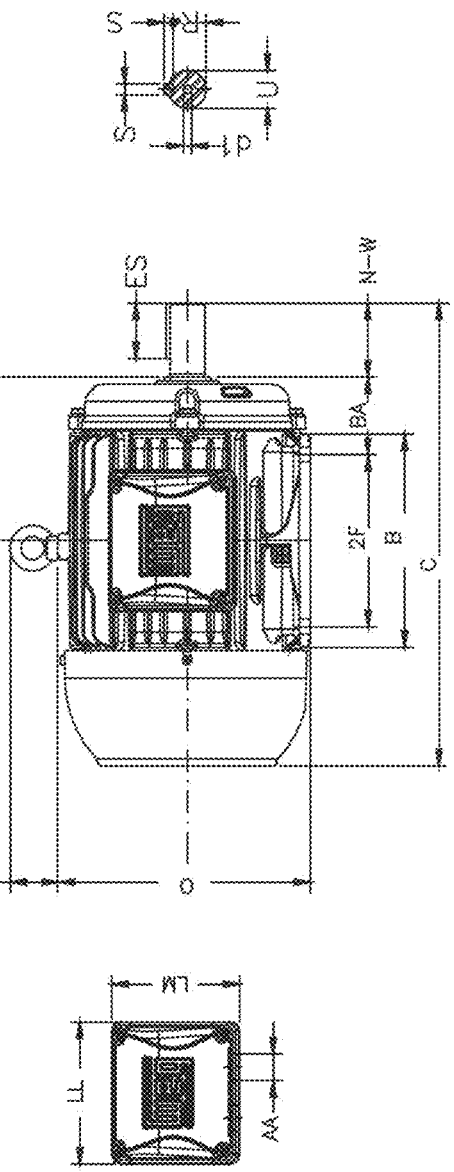
NEMA Standard Dimensions
Frames 143T to 444/5T
Fig. 6A1
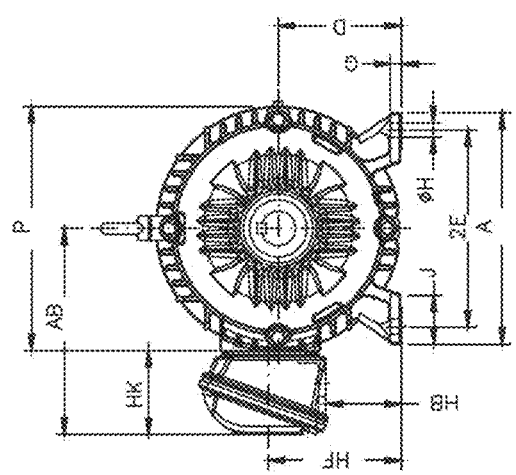

NEMA Standard Dimensions
Frames 588/9T
WEG W22 Terminal Box
Reference
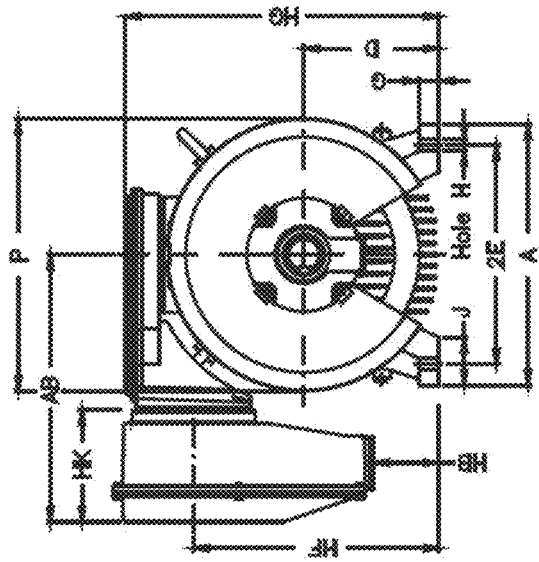
Frames 445/7T to 586/7T
WEG W22 Terminal Box
Reference
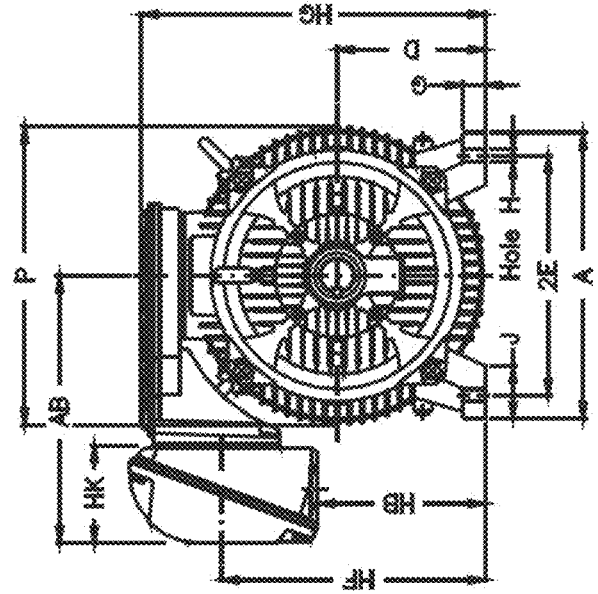
Fig. 6A2

NEMA Standard Dimensions
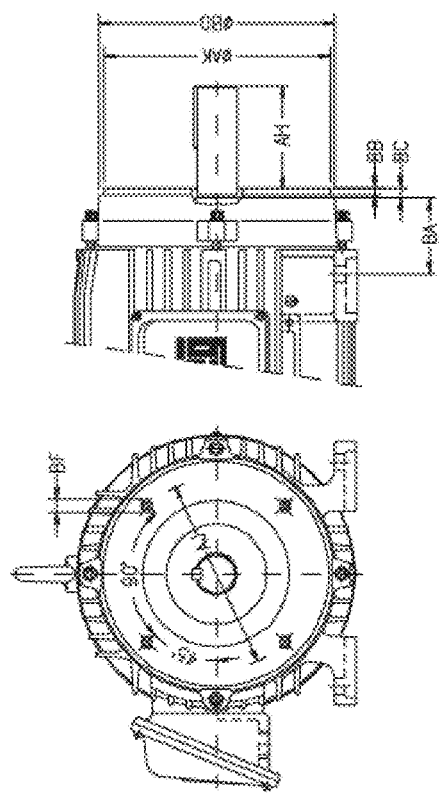
C Flange
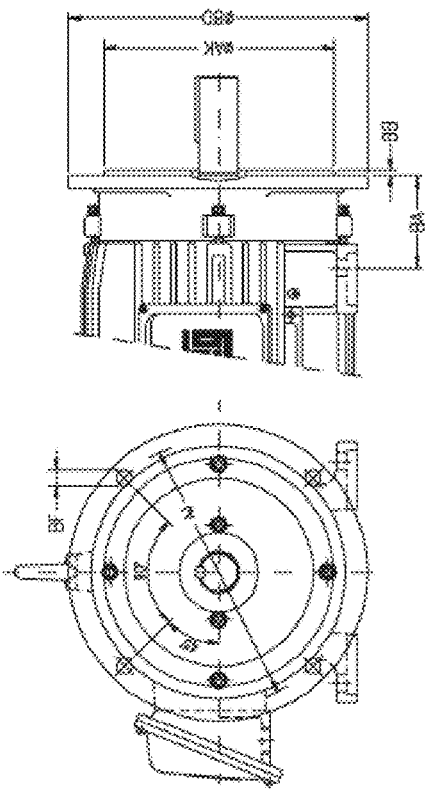
D Flange
Fig. 6A3

This drawing is not representative of all frame sizes. It is used as a dimension guide only.
Dimension C, O, P and all Terminal Box dimensions are specific to WEG W22 General Purpose Motors.
Dimensions in inches.

Values for dimensions - see for example as indicated in 6A1, 6A2, 6A3.

| NEMA Frames | MOUNTING | | | | A | B | C | D | G | J | O | K | P | T |
|---|---|---|---|---|---|---|---|---|---|---|---|---|---|---|
| | 2E | 2F | H | BA | | | | | | | | | | |
| 143T | 5.500 | 4.000 | 0.344 | 2.250 | 6.457 | 5.157 | 12.346 | 3.500 | 0.354 | 1.437 | 7.122 | | 7.047 | - |
| 145T | 5.500 | 5.000 | 0.344 | 2.250 | 6.457 | 6.142 | 13.346 | 3.500 | 0.354 | 1.437 | 7.122 | | 7.047 | - |
| 182T | 7.500 | 4.500 | 0.406 | 2.750 | 8.661 | 5.945 | 14.860 | 4.500 | 0.394 | 1.594 | 9.343 | | 8.740 | 1.772 |
| 184T | 7.500 | 5.500 | 0.406 | 2.750 | 8.661 | 6.969 | 15.860 | 4.500 | 0.394 | 1.594 | 9.343 | | 8.740 | 1.772 |
| 213T | 8.500 | 5.500 | 0.406 | 3.500 | 9.764 | 7.362 | 18.021 | 5.250 | 0.827 | 1.988 | 10.841 | 2.165 | 10.669 | 1.772 |
| 215T | 8.500 | 7.000 | 0.406 | 3.500 | 9.764 | 8.858 | 19.517 | 5.250 | 0.827 | 1.988 | 10.841 | 2.165 | 10.669 | 1.772 |
| 254T | 10.000 | 8.252 | 0.531 | 4.250 | 12.126 | 10.000 | 23.213 | 6.250 | 0.827 | 2.539 | 12.598 | 2.559 | 12.953 | 2.087 |
| 256T | 10.000 | 10.000 | 0.531 | 4.250 | 12.126 | 11.732 | 24.945 | 6.250 | 0.827 | 2.539 | 12.598 | 2.559 | 12.953 | 2.087 |
| 284TS | 11.000 | 9.500 | 0.531 | 4.750 | 13.780 | 11.575 | 25.061 | 7.000 | 1.023 | 3.110 | 14.067 | 2.874 | 14.173 | 2.087 |
| 284T | 11.000 | 9.500 | 0.531 | 4.750 | 13.780 | 11.575 | 26.433 | 7.000 | 1.023 | 3.110 | 14.067 | 2.874 | 14.173 | 2.087 |
| 286TS | 11.000 | 11.000 | 0.531 | 4.750 | 13.780 | 13.071 | 26.557 | 7.000 | 1.023 | 3.110 | 14.067 | 2.874 | 14.173 | 2.087 |
| 286T | 11.000 | 11.000 | 0.531 | 4.750 | 13.780 | 13.071 | 27.929 | 7.000 | 1.023 | 3.110 | 14.067 | 2.874 | 14.173 | 2.087 |
| 324TS | 12.500 | 10.500 | 0.657 | 5.250 | 15.157 | 13.071 | 28.120 | 8.000 | 1.300 | 3.189 | 15.953 | 3.189 | 15.827 | 2.087 |
| 324T | 12.500 | 10.500 | 0.657 | 5.250 | 15.157 | 13.071 | 29.620 | 8.000 | 1.300 | 3.189 | 15.953 | 3.189 | 15.827 | 2.087 |
| 326TS | 12.500 | 12.000 | 0.657 | 5.250 | 15.157 | 14.567 | 29.616 | 8.000 | 1.300 | 3.189 | 15.953 | 3.189 | 15.827 | 2.441 |
| 326T | 12.500 | 12.000 | 0.657 | 5.250 | 15.157 | 14.567 | 31.116 | 8.000 | 1.300 | 3.189 | 15.953 | 3.189 | 15.827 | 2.441 |

Fig. 6A4a

This drawing is not representative of all frame sizes. It is used as a dimension guide only.
Dimension C, O, P and all Terminal Box dimensions are specific to WEG W22 General Purpose Motors. Dimensions in inches.

Values for dimensions - see for example as indicated in 6A1, 6A2, 6A3.

| NEMA Frames | KEYWAY | | | SHAFT EXTENSION | | AB | HB | HF | HG | HH | HK | LL | LM | AA | d1 |
|---|---|---|---|---|---|---|---|---|---|---|---|---|---|---|---|
| | S | R | ES | N-W | U | | | | | | | | | | |
| 143T | 0.187 | 0.765 | 1.575 | 2.250 | 0.875 | 6.181 | 1.728 | 3.500 | - | 4.250 | 2.638 | 4.527 | 4.094 | NPT 3/4" | A 4 |
| 145T | | | | | | | | | - | 4.750 | | | | | A 4 |
| 182T | 0.250 | 0.984 | 1.969 | 2.750 | 1.125 | 7.559 | 2.236 | 4.500 | - | 5.000 | 3.110 | 5.512 | 5.236 | NPT 1" | A 4 |
| 184T | | | | | | | | | - | 5.500 | | | | | A 4 |
| 213T | 0.313 | 1.203 | 2.480 | 3.375 | 1.375 | 8.583 | 3.006 | 5.250 | - | 6.250 | | | | | A 4 |
| 215T | | | | | | | | | - | 7.000 | | | | | A 4 |
| 254T | 0.375 | 1.406 | 2.756 | 4.000 | 1.625 | 10.394 | 3.061 | 6.565 | - | 8.376 | | | | | A 4 |
| 256T | | | | | | | | | - | 9.250 | | | | | A 4 |
| 284TS | | | 2.480 | 3.250 | 1.875 | | | | | | | | | | A 4 |
| 284T | 0.500 | 1.594 | 3.149 | 4.622 | 1.625 | 10.984 | 3.535 | 7.000 | - | 9.500 | 3.937 | 7.795 | 7.402 | NPT 1 1/2" | A 4 |
| 286TS | 0.375 | 1.406 | 2.480 | 3.250 | 1.875 | | | | - | 10.250 | | | | | A 4 |
| 286T | 0.500 | 1.594 | 3.149 | 4.622 | | | | | | | | | | | A 4 |
| 324TS | 0.500 | | 2.756 | 3.750 | 2.125 | 12.480 | 4.811 | 8.708 | - | 10.500 | 4.645 | 8.976 | 8.543 | NPT 2" | A 4 |
| 324T | 0.500 | 1.844 | 3.937 | 5.250 | 1.875 | | | | - | | | | | | A 4 |
| 326TS | 0.500 | 1.594 | 2.756 | 3.750 | 2.125 | | | | - | 11.250 | | | | | A 4 |
| 326T | 0.500 | 1.844 | 3.937 | 5.250 | | | | | | | | | | | A 4 |

TERMINAL BOX

Fig. 6A4b

This drawing is not representative of all frame sizes. It is used as a dimension guide only. Dimension C, O, P and all Terminal Box dimensions are specific to WEG W22 General Purpose Motors. Dimensions in inches.

Values for dimensions - see for example as indicated in 6A1, 6A2, 6A3.

| NEMA Frames | BEARINGS | | BA | AJ | AK | BD | "C" FLANGE DIMENSIONS | | | BB | BC | AH |
|---|---|---|---|---|---|---|---|---|---|---|---|---|
| | D.E. | N.D.E | | | | | BF | | | | | |
| | | | | | | | NUMBER | TAP SIZE | | | | |
| 143T | 6205 ZZ | 6204 ZZ | 2.250(A) | 5.875 | 4.500 | 6.500 | 4 | UNC 3/8"x16 | | 0.156 | | 2.125 |
| 145T | | | 2.750(B) | | | | 4 | | | 0.250 | 0.125 | |
| 182T | 6207 ZZ | 6206 ZZ | 2.750(A) | | | | 4 | UNC 1/2"x13 | | 0.250 | | 2.625 |
| 184T | | | 3.500(B) | | | | 4 | UNC 1/2"x13 | | 0.250 | | |
| 213T | 6308 ZZ | 6207 ZZ | 3.500(A) | 7.250 | 8.500 | 8.875 | 4 | UNC 1/2"x13 | | 0.250 | 0.250 | 3.125 |
| 215T | | | 4.250(B) | | | | 4 | UNC 1/2"x13 | | 0.250 | 0.250 | |
| 254T | 6309 C3 | 6209 C3 | 4.250(A) | | | | 4 | UNC 1/2"x13 | | 0.250 | 0.250 | 3.75 |
| 256T | | | 4.750(B) | | | | 4 | UNC 1/2"x13 | | 0.250 | 0.250 | |
| 284TS | 6311 C3 | 6211 C3 | 4.750 | 9.000 | 10.500 | 11.031 | 4 | UNC 1/2"x13 | | 0.250 | 0.250 | 3.000 |
| 284T | | | | | | | 4 | UNC 1/2"x13 | | 0.250 | 0.250 | 4.375 |
| 286TS | | | | | | | 4 | UNC 1/2"x13 | | 0.250 | 0.250 | 3.000 |
| 286T | | | | | | | 4 | UNC 1/2"x13 | | 0.250 | 0.250 | 4.375 |
| 324TS | 6312 C3 | 6212 C3 | 5.250 | 11.000 | 12.500 | 13.583 | 4 | UNC 5/8"x11 | | 0.250 | 0.250 | 3.500 |
| 324T | 6312 C3 | 6212 C3 | | 11.000 | 12.500 | 13.583 | 4 | UNC 5/8"x11 | | 0.250 | 0.250 | 5.000 |
| 326TS | 6312 C3 | 6212 C3 | | 11.000 | 12.500 | 13.583 | 4 | UNC 5/8"x11 | | 0.250 | 0.250 | 3.500 |
| 326T | 6312 C3 | 6212 C3 | | 11.000 | 12.500 | 13.583 | 4 | UNC 5/8"x11 | | 0.250 | 0.250 | 5.000 |

Notes: (A) - NEMA Standard, (B) BA dimension for WEG cast iron motors, BA dimension for WEG cast iron motors with C-Flange

Fig. 6A4c

Values for dimensions - see for example as indicated in 6A1, 6A2, 6A3.

| NEMA Frames | BA | "D" FLANGE DIMENSIONS | | | BF | | BB |
|---|---|---|---|---|---|---|---|
| | | AJ | AK | BD | NUMBER | TAP SIZE | |
| 143T | 2.250 | 10.000 | 9.000 | 11.000 | 4 | 0.562 | 0.203 |
| 145T | 2.250 | 10.000 | 9.000 | 11.000 | 4 | 0.562 | 0.203 |
| 182T | 2.750 | 10.000 | 9.000 | 11.000 | 4 | 0.562 | 0.203 |
| 184T | 2.750 | 10.000 | 9.000 | 11.000 | 4 | 0.562 | 0.203 |
| 213T | 3.500 | 10.000 | 9.000 | 11.000 | 4 | 0.562 | 0.203 |
| 215T | 3.500 | 10.000 | 9.000 | 11.000 | 4 | 0.562 | 0.203 |
| 254T | 4.250 | 12.500 | 11.000 | 14.000 | 4 | 0.828 | 0.203 |
| 256T | 4.250 | 12.500 | 11.000 | 14.000 | 4 | 0.828 | 0.203 |
| 284TS | 4.750 | 12.500 | 11.000 | 14.000 | 4 | 0.828 | 0.203 |
| 284T | 4.750 | 12.500 | 11.000 | 14.000 | 4 | 0.828 | 0.203 |
| 286TS | 4.750 | 12.500 | 11.000 | 14.000 | 4 | 0.828 | 0.203 |
| 286T | 4.750 | 12.500 | 11.000 | 14.000 | 4 | 0.828 | 0.203 |
| 324TS | 5.250 | 16.000 | 14.000 | 18.000 | 4 | 0.828 | 0.203 |
| 324T | 5.250 | 16.000 | 14.000 | 18.000 | 4 | 0.828 | 0.203 |
| 326TS | 5.250 | 16.000 | 14.000 | 18.000 | 4 | 0.828 | 0.203 |
| 326T | 5.250 | 16.000 | 14.000 | 18.000 | 4 | 0.828 | 0.203 |

This drawing is not representative of all frame sizes. It is used as a dimension guide only.

Dimension C, O, P and all Terminal Box dimensions are specific to WEG W22 General Purpose Motors.

Dimensions in inches.

Fig. 6A4d

This drawing is not representative of all frame sizes. It is used as a dimension guide only. Dimension C, O, P and all Terminal Box dimensions are specific to WEG W22 General Purpose Motors. Dimensions in inches.

Values for dimensions - see for example as indicated in 6A1, 6A2, 6A3.

| NEMA Frames | 2E | MOUNTING 2F | H | BA | A | B | C | D | G | J | O | K | P | T |
|---|---|---|---|---|---|---|---|---|---|---|---|---|---|---|
| 364/5TS | 14.000 | 11.260/12.244 | 0.660 | 5.875 | 17.165 | 16.220 | 32.276 | 9.000 | 1.480 | 3.150 | 17.716 | 4.921 | 17.914 | . |
| 364/5T | | | | | | | 34.251 | | | | | | | , |
| 404/5TS | 16.000 | 12.244/13.740 | 0.810 | 6.625 | 19.921 | 18.386 | 36.732 | 10.000 | 1.811 | 3.937 | 19.566 | 5.669 | 19.134 | ( |
| 404/5T | | | 0.810 | | | | 39.730 | | | 3.937 | | | | ( |
| 444/5TS | | 14.500/16.500 | 0.810 | 7.500 | 21.929 | 20.315 | 41.443 | 11.000 | 1.630 | 3.937 | 22.795 | 5.866 | 23.583 | , |
| 444/5T | | | 0.810 | | | | 45.193 | 11.000 | | 3.937 | | | 23.583 | ( |
| 445/7TS | 18.000 | 16.500/20.000 | 0.810 | | 21.496 | 23.897 | 45.301 | 11.000 | 1.654 | 3.937 | 25.291 | | 23.583 | 4.620 |
| 445/7T | | | 0.810 | | | | 49.051 | 11.000 | | 3.937 | | | 23.583 | 4.620 |
| 447/9TS | | 20.000/25.000 | 0.810 | | 21.929 | 31.535 | 52.568 | 11.000 | 1.630 | 4.331 | | 6.692 | 23.583 | 4.620 |
| 447/9T | | | 0.810 | | | | 56.338 | 11.000 | | 3.937 | 23.874 | 8.780 | 23.583 | 4.620 |
| L447/9TS | | 20.000/25.000 | 0.810 | | | | 53.431 | 11.000 | | | | | | 4.620 |
| L447/9T | | | 0.810 | | | | 57.181 | 11.000 | | | | | 25.866 | 4.620 |
| 504/5TS | 20.000 | 16.000/18.000 | 1.250 | 8.500 | 24.724 | 24.449 | 48.215 | 12.500 | 2.146 | 4.724 | 25.425 | 7.228 | | 4.880 |
| 504/5T | | | | | | | 54.095 | | | | | | | |
| 586/7TS | | 22.000/25.000 | | | 29.526 | 29.921 | 54.829 | 14.500 | 2.492 | 5.512 | 28.985 | 9.055 | 28.977 | 5.590 |
| 586/7T | 23.000 | | 1.181 | 10.000 | | | 61.704 | | | | | | | |
| 588/9TS | | 26.000/32.000 | | | | 37.980 | 62.506 | | | | | 12.795 | | 8.464 |
| 588/9T | | | | | | | 69.381 | | | | | | | |

Fig. 6A4e

This drawing is not representative of all frame sizes. It is used as a dimension guide only. Dimension C, O, P and all Terminal Box dimensions are specific to WEG W22 General Purpose Motors. Dimensions in inches.

Values for dimensions - see for example as indicated in 6A1, 6A2, 6A3.

| NEMA Frames | KEYWAY | | | SHAFT EXTENSION | | | AB | HB | HF | HG | HH | HK | LL | LM | TERMINAL BOX AA | d1 |
|---|---|---|---|---|---|---|---|---|---|---|---|---|---|---|---|---|
| | S | R | ES | N-W | U | | | | | | | | | | | |
| 364/5TS | 0.500 | 1.591 | 1.968 | 3.748 | 1.875 | | | | | | | | | | | UNC 3/4"-10 |
| 364/5T | 0.625 | 2.019 | 4.330 | 5.874 | 2.375 | | 16.378 | 4.055 | | | 12.362 | 6.378 | 9.646 | 10.119 | NPT 3" | UNC 3/4"-10 |
| 404/5TS | 0.500 | 1.842 | 2.756 | 4.250 | 2.125 | | | | | | | | | | | UNC 3/4"-10 |
| 404/5T | 0.750 | 2.449 | 5.512 | 7.250 | 2.875 | | | 5.040 | | | 14.213 | | | | | UNC 3/4"-10 |
| 444/5TS | 0.625 | 2.021 | 3.000 | 4.750 | 2.375 | | 18.386 | | | | | 5.787 | 11.811 | 11.890 | 2xNPT 3" | UNC 3/4"-10 |
| 444/5T | 0.875 | 2.880 | 7.087 | 8.500 | 3.375 | | | 5.394 | | | 15.748 | | | | 2xNPT 3" | UNC 3/4"-10 |
| 445/TS | 0.625 | 2.021 | 3.000 | 4.750 | 2.375 | | | | | | | | | | 2xNPT 3" | UNC 3/4"-10 |
| 445/T | 0.875 | 2.880 | 7.087 | 8.500 | 3.375 | | 20.670 | 12.598 | 20.724 | 26.850 | 11.803 | 6.966 | 14.646 | 15.040 | 2xNPT 3" | UNC 3/4"-10 |
| 447/9TS | 0.625 | 2.021 | 3.000 | 4.750 | 2.375 | | | | | | | | | | 2xNPT 3" | UNC 3/4"-10 |
| 447/9T | 0.875 | 2.880 | 7.087 | 8.500 | 3.375 | | 23.071 | 11.417 | 20.551 | 28.236 | 11.500 | 8.464 | 15.906 | 17.244 | 2xNPT 3" | UNC 3/4"-10 |
| L447/9TS | 0.625 | 2.021 | 3.000 | 4.750 | 2.375 | | | | | | | | | | 2xNPT 3" | UNC 3/4"-10 |
| L447/9T | 0.875 | 2.880 | 7.087 | 8.500 | 3.375 | | 20.670 | 15.275 | 24.291 | 29.409 | 10.394 | 6.966 | 14.646 | 15.040 | 2xNPT 3" | UNC 3/4"-10 |
| 504/5TS | 0.625 | 2.021 | 3.000 | 4.750 | 2.375 | | | | | | | | | | 2xNPT 3" | UNC 3/4"-10 |
| 504/5T | 0.875 | 3.134 | 8.661 | 10.630 | 3.625 | | 23.977 | 17.322 | 26.732 | | 13.386 | 8.464 | 15.906 | 17.244 | 2xNPT 3" | UNC 3/4"-10 |
| 586/7TS | 0.625 | 2.021 | 3.000 | 4.750 | 2.375 | | | | | | | | | | 2xNPT 3" | UNC 3/4"-10 |
| 586/7T | 1.000 | 3.312 | 8.661 | 11.625 | 3.875 | | 27.600 | 8.464 | 28.346 | 34.015 | | 12.520 | 17.441 | 28.740 | 2xNPT 3" | UNC 7/8"-9 |
| 588/9TS | 0.625 | 2.021 | 3.000 | 4.750 | 2.375 | | | | | | | | | | 2xNPT 3" | UNC 3/4"-10 |
| 588/9T | 1.000 | 3.312 | 8.661 | 11.625 | 3.875 | | | | | | | | | | 2xNPT 3" | UNC 7/8"-9 |

Fig. 6A4f

This drawing is not representative of all frame sizes. It is used as a dimension guide only. Dimension C, O, P and all Terminal Box dimensions are specific to WEG W22 General Purpose Motors. Dimensions in inches.

Values for dimensions - see for example as indicated in 6A1, 6A2, 6A3.

"C" FLANGE DIMENSIONS

| NEMA Frames | BEARINGS | | BA | AJ | AK | BD | BF NUMBER | BF TAP SIZE | BB | BC | AH |
|---|---|---|---|---|---|---|---|---|---|---|---|
| | D.E. | N.D.E | | | | | | | | | |
| 364/5TS | 6314 C3 | 6314 C3 | 5.875 | 11.000 | 12.500 | 15.551 | 8 | UNC 5/8"x11 | 0.250 | 0.250 | 3.500 |
| 364/5T | 6314 C3 | 6314 C3 | 5.875 | 11.000 | 12.500 | 15.551 | 8 | UNC 5/8"x11 | 0.250 | 0.250 | 5.625 |
| 404/5TS | 6314 C3 | 6314 C3 | 6.625 | 11.000 | 12.500 | 15.551 | 8 | UNC 5/8"x11 | 0.250 | 0.250 | 4.000 |
| 404/5T | 6316 C3 | 6314 C3 | 6.625 | 11.000 | 12.500 | 15.551 | 8 | UNC 5/8"x11 | 0.250 | 0.250 | 7.000 |
| 444/5TS | 6314 C3 | 6314 C3 | 7.500 | 14.000 | 16.000 | 17.913 | 8 | UNC 5/8"x11 | 0.250 | 0.250 | 4.500 |
| 444/5T | 6319 C3 | 6316 C3 | 7.500 | 14.000 | 16.000 | 17.913 | 8 | UNC 5/8"x11 | 0.250 | 0.250 | 8.250 |
| 445/7TS | 6314 C3 | 6319 C3 | 7.500 | 14.000 | 16.000 | 17.913 | 8 | UNC 5/8"x11 | 0.250 | 0.250 | 4.500 |
| 445/7T | 6319 C3 | 6316 C3 | 7.500 | 14.000 | 16.000 | 17.913 | 8 | UNC 5/8"x11 | 0.250 | 0.250 | 8.250 |
| 447/9TS | 6314 C3 | 6314 C3 | 7.500 | 14.000 | 16.000 | 17.913 | 8 | UNC 5/8"x11 | 0.250 | 0.250 | 4.500 |
| 447/9T | 6322 C3 | 6319 C3 | 7.500 | 14.000 | 16.000 | 17.913 | 8 | UNC 5/8"x11 | 0.250 | 0.250 | 6.250 |
| L447/9TS | 6314 C3 | 6314 C3 | 7.500 | 14.000 | 16.000 | 17.913 | 8 | UNC 5/8"x11 | 0.250 | 0.250 | 4.500 |
| L447/9T | 6322 C3 | 6319 C3 | 7.500 | 14.000 | 16.000 | 17.913 | 8 | UNC 5/8"x11 | 0.250 | 0.250 | 8.250 |
| 504/5TS | 6314 C3 | 6314 C3 | 8.500 | 14.500 | 16.500 | 17.913 | 8 | UNC 5/8"x11 | 0.250 | 0.250 | 4.500 |
| 504/5T | 6319 C3 | 6316 C3 | 8.500 | 14.500 | 16.500 | 17.913 | 8 | UNC 5/8"x11 | 0.250 | 0.250 | 10.375 |
| 586/7TS | 6314 C3 | 6314 C3 | 10.000 | | | 17.913 | 8 | UNC 5/8"x11 | 0.250 | 0.250 | 4.500 |
| 586/7T | 6322 C3 | 6319 C3 | 10.000 | | | 17.913 | 8 | UNC 5/8"x11 | 0.250 | 0.250 | 11.375 |
| 586/9TS | 6314 C3 | 6314 C3 | | | | | | | | | |
| 588/9T | 6322 C3 | 6319 C3 | | | | | | | | | |

Fig. 6A4g

Values for dimensions - see for example as indicated in 6A1, 6A2, 6A3.

| NEMA Frames | BA | "D" FLANGE DIMENSIONS | | | BF | | BB |
|---|---|---|---|---|---|---|---|
| | | AJ | AK | BD | NUMBER | TAP SIZE | |
| 364/5TS | 5.875 | 16.000 | 14.000 | 17.716 | 4 | 0.828 | 0.203 |
| 364/5T | 5.875 | 16.000 | 14.000 | 17.716 | 4 | 0.828 | 0.203 |
| 404/5TS | 6.625 | 20.000 | 18.000 | 22.000 | 8 | 0.828 | 0.203 |
| 404/5T | 6.625 | 20.000 | 18.000 | 22.000 | 8 | 0.828 | 0.203 |
| 444/5TS | 7.500 | 20.000 | 18.000 | 21.653 | 8 | 0.828 | 0.203 |
| 444/5T | 7.500 | 20.000 | 18.000 | 21.653 | 8 | 0.828 | 0.203 |
| 445/7TS | 7.500 | 20.000 | 18.000 | 21.653 | 8 | 0.828 | 0.203 |
| 445/7T | 7.500 | 20.000 | 18.000 | 21.653 | 8 | 0.828 | 0.203 |
| 447/9TS | 7.500 | 20.000 | 18.000 | 21.653 | 8 | 0.828 | 0.203 |
| 447/9T | 7.500 | 20.000 | 18.000 | 21.653 | 8 | 0.828 | 0.203 |
| L447/9TS | 8.500 | 22.000 | 18.000 | 24.803 | 8 | 0.828 | 0.250 |
| L447/9T | 8.500 | 22.000 | 18.000 | 24.803 | 8 | 0.828 | 0.250 |
| 504/5TS | 10.000 | 30.000 | 28.000 | 32.000 | 8 | 0.828 | 0.250 |
| 504/5T | 10.000 | 30.000 | 28.000 | 32.000 | 8 | 0.828 | 0.250 |
| 586/7TS | 10.000 | 30.000 | 28.000 | 32.000 | 8 | 0.828 | 0.250 |
| 586/7T | 10.000 | 30.000 | 28.000 | 32.000 | 8 | 0.828 | 0.250 |

This drawing is not representative of all frame sizes. It is used as a dimension guide only.

Dimension C, O, P and all Terminal Box dimensions are specific to WEG W22 General Purpose Motors.

Dimensions in inches.

Fig. 6A4h

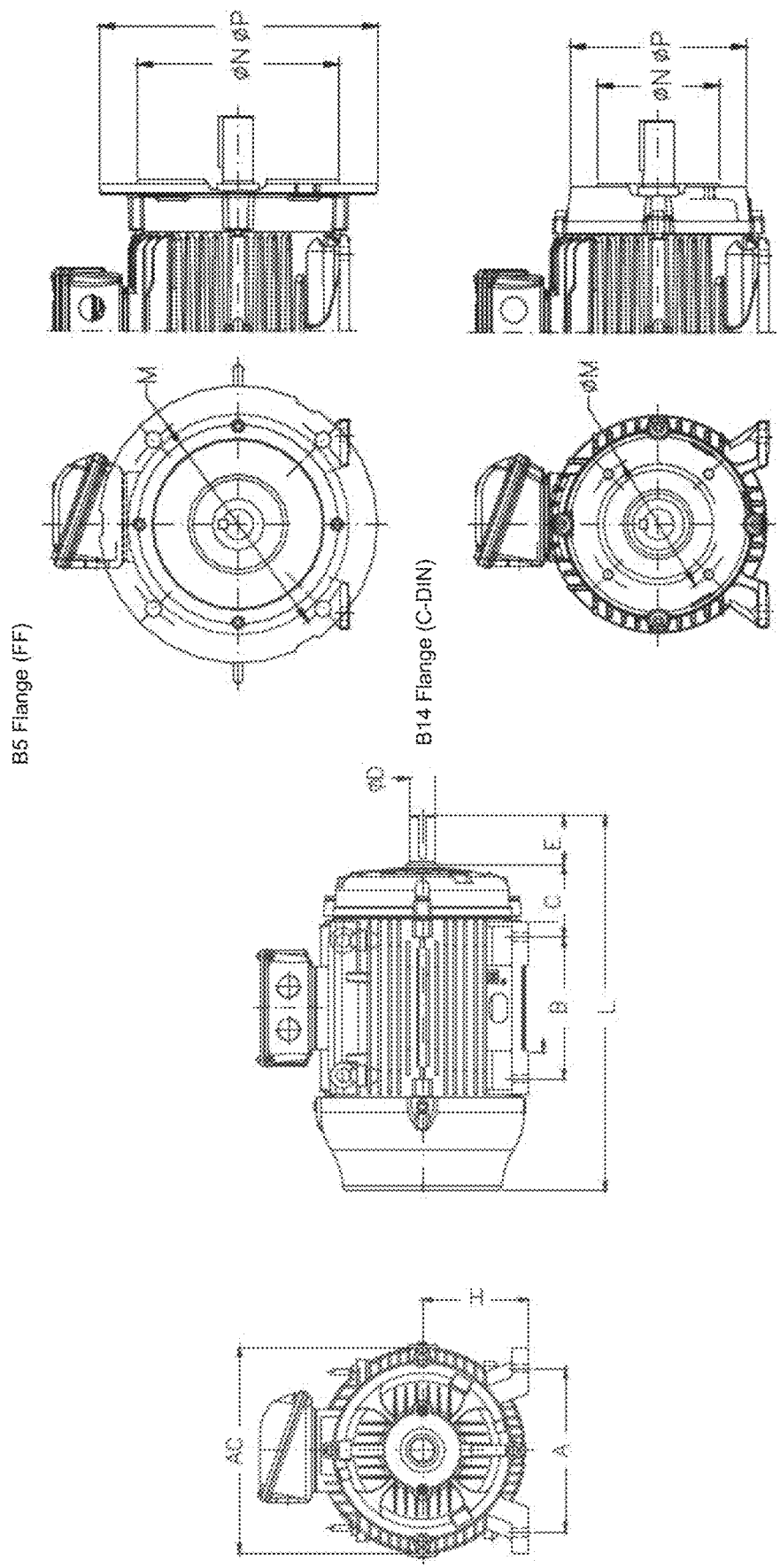
Fig. 6B1

This drawing is not representative of all frame sizes. It is used as a dimension guide only.
Dimension L is specific to WEG W22 IEC General Purpose Metric Motors. Dimensions in millimeters
inches

Values for dimensions - see for example as indicated in 6B1.

| Frame | A | AC | B | C | Shaft D | Shaft E | L |
|---|---|---|---|---|---|---|---|
| 63 | 100 / 3.937 | 125 / 4.921 | 80 / 3.150 | 40 / 0.433 | 11 / 0.433 | 23 / 0.906 | 216 / 8.504 |
| 71 | 112 / 4.409 | 141 / 5.551 | 90 / 3.543 | 45 / 1.772 | 14 / 0.551 | 30 / 1.181 | 248 / 9.764 |
| 80 | 125 / 4.921 | 159 / 6.260 | 100 / 3.937 | 50 / 1.969 | 19 / 0.748 | 40 / 1.575 | 276 / 10.866 |
| L80 | | | | | | | 325 / 12.795 |
| 90S | | | | | | | 304 / 11.969 |
| L90S | 140 / 5.512 | 179 / 7.047 | 125 / 4.921 | 56 / 2.205 | 24 / 0.945 | 50 / 1.969 | 335 / 13.189 |
| 90L | | | | | | | 329 / 12.953 |
| L90L | | | | | | | 360 / 14.173 |
| 100L | 160 / 6.299 | 199 / 7.835 | 140 / 5.512 | 63 / 2.480 | 28 / 1.102 | 60 / 2.362 | 376 / 14.803 |
| L100L | | | | | | | 420 / 16.535 |
| 112M | 190 / 7.480 | 222 / 8.740 | 140 / 5.512 | 70 / 2.756 | | | 393 / 15.472 |
| L112M | | | | | | | 423 / 16.654 |
| 132S | | | | | | | 452 / 17.795 |
| 132M | 216 / 8.504 | 271 / 10.669 | 178 / 7.008 | 89 / 3.504 | 38 / 1.496 | 80 / 3.150 | 490 / 19.291 |
| 132M/L | | | | | | | 515 / 20.276 |

Fig. B2a

Values for dimensions - see for example as indicated in 6B1

| Frame | A | AC | B | C | Shaft D | Shaft E | L |
|---|---|---|---|---|---|---|---|
| 160M | 254<br>10.000 | 329<br>12.953 | 210<br>8.268 | 108<br>4.252 | 42<br>1.654 | 110<br>4.331 | 598<br>23.543 |
| 160L | | | 254<br>10.000 | | | | 642<br>25.276 |
| 180M | 279<br>10.984 | 360<br>14.173 | 241<br>9.488 | 121<br>4.764 | 48<br>1.890 | 110<br>4.331 | 664<br>26.142 |
| 180L | | | 279<br>10.984 | | | | 702<br>27.636 |
| 200M | 318<br>12.520 | 402<br>15.827 | 267<br>10.512 | 133<br>5.236 | 55<br>2.165 | | 729<br>28.701 |
| 200L | | | 305<br>12.008 | | | | 767<br>30.197 |
| 225S/M | 356<br>14.016 | 455<br>17.913 | 286/311<br>11.260/12.244 | 149<br>5.866 | 55<br>2.165<br>60<br>2.362 | 110<br>4.331<br>140<br>5.512 | 856<br>33.701<br>866<br>34.882 |
| 250S/M | 406<br>15.984 | 486<br>19.134 | 311/349<br>12.244/13.740 | 168<br>6.614 | 60<br>2.362<br>65<br>2.559 | 140<br>5.512<br>140<br>5.512 | 965<br>37.992 |
| 280S/M | 457<br>17.992 | 599<br>23.583 | 368/419<br>14.488/16.496 | 190<br>7.480 | 65<br>2.559<br>75<br>2.953 | 140<br>5.512<br>140<br>5.512 | 1071<br>42.165 |
| 315S/M | 508<br>20.000 | 657<br>25.866 | 406/457<br>15.984/17.992 | 216<br>8.504 | 65<br>2.559<br>80<br>3.150 | 140<br>5.512<br>170<br>6.693 | 1244<br>48.976<br>1274<br>50.157 |
| 315L | | | 508<br>20.000 | | 80<br>3.150 | 140<br>5.512<br>170<br>6.693 | 1353<br>53.268<br>1383<br>54.449 |
| 355M/L | 610<br>24.016 | 736<br>28.976 | 560/630<br>22.047/24.803 | 254<br>10.000 | 75<br>2.953<br>100<br>3.937 | 140<br>5.512<br>210<br>8.268 | 1412<br>55.591<br>1462<br>58.346 |
| 355A/B | | | 710/800<br>27.953/31.496 | | 75<br>2.953<br>100<br>3.937 | 140<br>5.512<br>210<br>8.268 | 1607<br>63.268<br>1677<br>66.024 |

This drawing is not representative of all frame sizes. It is used as a dimension guide only.

Dimension L is specific to WEG W22 IEC General Purpose Metric Motors. Dimensions in millimeters inches

Fig. 6B2b

Values for dimensions - see for example as indicated in 6B1.

This drawing is not representative of all frame sizes. It is used as a dimension guide only.
Dimension L is specific to WEG W22 IEC General Purpose Metric Motors. Dimensions in millimeters
inches

| Frame | B5 Flange (FF) Dimensions | | | | B14 Flange (C-DIN) Dimensions | | | |
|---|---|---|---|---|---|---|---|---|
| | Flange | M | N | P | Flange | M | N | P |
| 63 | FF-115 | 115 / 4.528 | 95 / 3.740 | 140 / 5.512 | C-90 | 75 / 2.953 | 60 / 2.362 | 90 / 3.543 |
| 71 | FF-130 | 130 / 5.118 | 110 / 4.331 | 160 / 6.299 | C-105 | 85 / 3.346 | 70 / 2.756 | 105 / 4.134 |
| 80 | | | | | C-120 | 100 / 3.937 | 80 / 3.150 | 120 / 4.724 |
| L80 | | | | | | | | |
| 90S | FF-165 | 165 / 6.496 | 130 / 5.118 | 200 / 7.874 | C-140 | 115 / 4.528 | 95 / 3.740 | 140 / 5.512 |
| L90S | | | | | | | | |
| 90L | | | | | | | | |
| L90L | | | | | | | | |
| 100L | | | | | | | | |
| L100L | FF-215 | 215 / 8.465 | 180 / 7.087 | 250 / 9.843 | C-160 | 130 / 5.118 | 110 / 4.331 | 160 / 6.299 |
| 112M | | | | | | | | |
| L112M | | | | | | | | |
| 132S | FF-265 | 265 / 10.433 | 230 / 9.055 | 300 / 11.811 | C-200 | 165 / 6.496 | 130 / 5.118 | 200 / 7.874 |
| 132M | | | | | | | | |
| 132ML | | | | | | | | |

Fig. 6B2c

Values for dimensions - see for example as indicated in 6B1.

| Frame | B5 Flange (FF) Dimensions | | | | |
|---|---|---|---|---|---|
| | Flange | M | N | P | |
| 160M | FF-300 | 300<br>11.811 | 250<br>9.843 | 350<br>13.780 | |
| 160L | | | | | |
| 180M | FF-350 | 350<br>13.780 | 300<br>11.811 | 400<br>15.748 | |
| 180L | | | | | |
| 200M | FF-400 | 400<br>15.748 | 350<br>13.780 | 450<br>17.717 | |
| 200L | | | | | |
| 225S/M | FF-500 | 500<br>19.685 | 450<br>17.717 | 550<br>21.654 | |
| 250S/M | | | | | |
| 280S/M | FF-600 | 600<br>23.622 | 550<br>21.654 | 660<br>25.984 | |
| 315S/M | | | | | |
| 315L | FF-740 | 740<br>29.134 | 680<br>26.772 | 800<br>31.496 | |
| 355M/L | | | | | |
| 355A/B | | | | | |

This drawing is not representative of all frame sizes. It is used as a dimension guide only.

Dimension L is specific to WEG W22 IEC General Purpose Metric Motors.

Dimensions in millimeters
inches

Fig. 6B2d

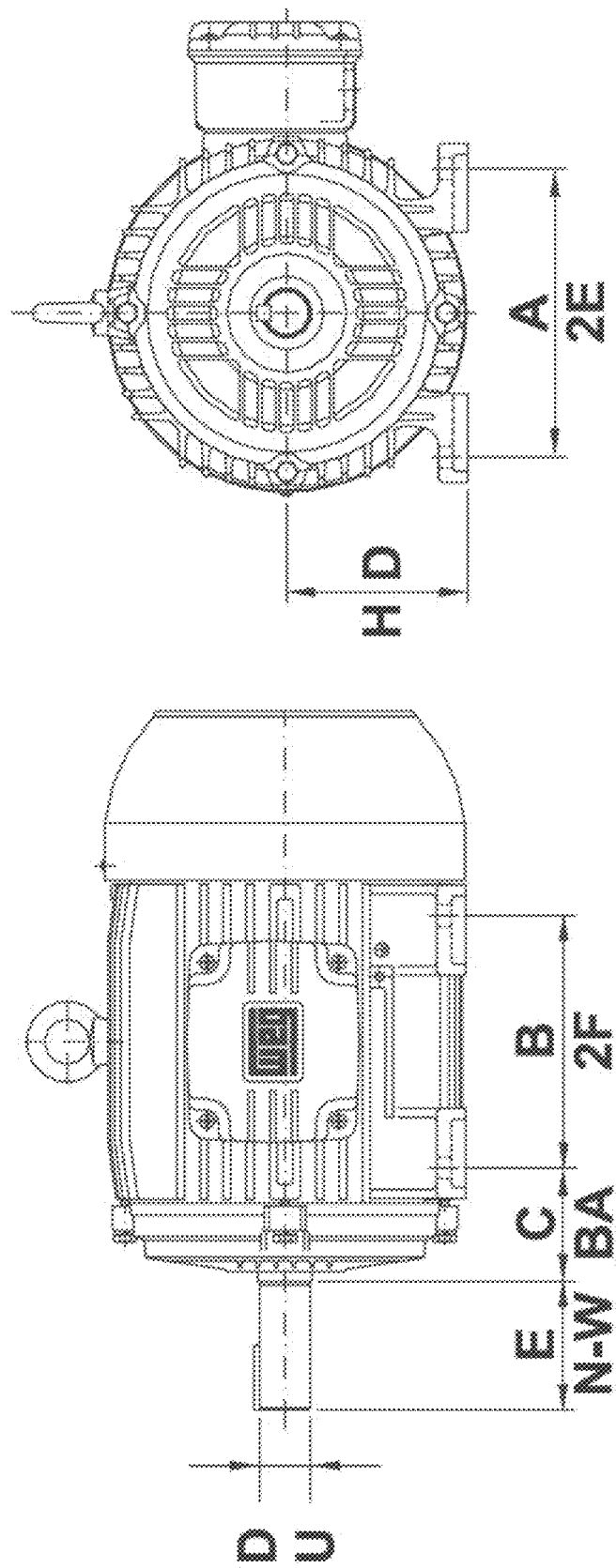
Fig. 6C1

Values for dimensions - see for example as indicated in 6C1.

| IEC | | A | B | C | K | D | E |
|---|---|---|---|---|---|---|---|
| NEMA | D | 2E | 2F | BA | H | U | N-W |
| 90S | 90 / 3.543 | 140 / 5.512 | 100 / 3.937 | 56 / 2.205 | 10 / 0.394 | 24 / 0.945 | 50 / 1.969 |
| 143T | 88.9 / 3.500 | 139.7 / 5.500 | 101.6 / 4.000 | 57.2 / 2.250 | 8.7 / 0.344 | 22.2 / 0.875 | 57.2 / 2.250 |
| 90L | 90 / 3.543 | 140 / 5.512 | 100 / 3.937 | 56 / 2.205 | 10 / 0.394 | 24 / 0.945 | 50 / 1.969 |
| 145T | 88.9 / 3.500 | 139.7 / 5.500 | 127 / 5.000 | 57.2 / 2.250 | 8.7 / 0.344 | 22.2 / 0.875 | 57.2 / 2.250 |
| 112S | 112 / 4.409 | 190 / 7.480 | 140 / 5.512 | 70 / 2.756 | 12 / 0.472 | 28 / 1.102 | 60 / 2.362 |
| 182T | 114.3 / 4.500 | 190.5 / 7.500 | 114.3 / 4.500 | 69.9 / 2.750 | 10.3 / 0.406 | 28.6 / 1.125 | 69.9 / 2.750 |
| 112M | 112 / 4.409 | 190 / 7.480 | 140 / 5.512 | 70 / 2.756 | 12 / 0.472 | 28 / 1.102 | 60 / 2.362 |
| 184T | 114.3 / 4.500 | 190.5 / 7.500 | 139.7 / 5.500 | 69.9 / 2.750 | 10.3 / 0.406 | 28.6 / 1.125 | 69.9 / 2.750 |
| 132S | 132 / 5.197 | 216 / 8.504 | 140 / 5.512 | 89 / 3.504 | 12 / 0.472 | 38 / 1.496 | 80 / 3.150 |
| 213T | 133.4 / 5.250 | 215.9 / 8.500 | 139.7 / 5.500 | 88.9 / 3.500 | 10.3 / 0.406 | 34.9 / 1.375 | 85.7 / 3.375 |
| 132M | 132 / 5.197 | 216 / 8.504 | 178 / 7.008 | 89 / 3.504 | 12 / 0.472 | 38 / 1.496 | 80 / 3.150 |
| 215T | 133.4 / 5.250 | 215.9 / 8.500 | 177.8 / 7.000 | 88.9 / 3.500 | 10.3 / 0.406 | 34.9 / 1.375 | 85.7 / 3.375 |
| 160M | 160 / 6.299 | 254 / 10.000 | 210 / 8.268 | 108 / 4.252 | 14.5 / 0.571 | 42 / 1.654 | 110 / 4.331 |
| 254T | 158.8 / 6.250 | 254 / 10.000 | 209.6 / 8.252 | 108.0 / 4.250 | 13.5 / 0.531 | 41.3 / 1.625 | 101.6 / 4.000 |

Fig. 6C2a

Values for dimensions - see for example as indicated in 6C1.

| IEC | D | 2E | 2F | BA | H | D | N-W |
|---|---|---|---|---|---|---|---|
| NEMA | | A | B | C | K | D | E |
| 160L | 160 / 6.299 | 254 / 10.000 | 254 / 10.000 | 108 / 4.252 | 14.5 / 0.571 | 42 / 1.654 | 110 / 4.331 |
| 256T | 158.8 / 6.250 | 254 / 10.000 | 254 / 10.000 | 108 / 4.250 | 13.5 / 0.531 | 41.3 / 1.625 | 101.6 / 4.000 |
| 180M | 180 / 7.087 | 279 / 10.984 | 241 / 9.488 | 121 / 4.764 | 14.5 / 0.571 | 48 / 1.890 | 110 / 4.331 |
| 284T | 177.8 / 7.000 | 279.4 / 11.000 | 241.3 / 9.500 | 120.7 / 4.750 | 13.5 / 0.531 | 47.6 / 1.875 | 117.4 / 4.622 |
| 180L | 180 / 7.087 | 279 / 10.984 | 279 / 10.984 | 121 / 4.764 | 14.5 / 0.571 | 48 / 1.890 | 110 / 4.331 |
| 286T | 177.8 / 7.000 | 279.4 / 11.000 | 279.4 / 11.000 | 120.7 / 4.750 | 13.5 / 0.531 | 47.6 / 1.875 | 117.4 / 4.622 |
| 200M | , | ( | , | , | ( | ( | ( |
| 324T | 203.2 / 8.000 | 317.5 / 12.500 | 266.7 / 10.500 | 133.4 / 5.250 | 16.7 / 0.657 | 54 / 2.125 | 133.4 / 5.250 |
| 200L | 200 / 7.874 | 318 / 12.520 | 305 / 12.008 | 133 / 5.236 | 18.5 / 0.728 | 55 / 2.165 | 110 / 4.331 |
| 326T | 203.2 / 8.000 | 317.5 / 12.500 | 304.8 / 12.000 | 133.4 / 5.250 | 16.7 / 0.657 | 54 / 2.125 | 133.4 / 5.250 |
| 225S | 225 / 8.858 | 356 / 14.016 | 286 / 11.260 | 149 / 5.866 | 18.5 / 0.728 | 55 / 2.165 | 110 / 4.331 |
| 364T | 228.6 / 9.000 | 355.6 / 14.000 | 286 / 11.260 | 149.2 / 5.875 | 16.8 / 0.660 | 60.3 / 2.375 | 149.2 / 5.874 |
| 225M | 225 / 8.858 | 356 / 14.016 | 311 / 12.244 | 149 / 5.866 | 18.5 / 0.728 | 60 / 2.362 | 140 / 5.512 |
| 365T | 228.6 / 9.000 | 355.6 / 14.000 | 311 / 12.244 | 149.2 / 5.875 | 16.8 / 0.660 | 60.3 / 2.375 | 149.2 / 5.874 |
| 250M | 250 / 9.843 | 406 / 15.984 | 349 / 13.740 | 168 / 6.614 | 24 / 0.945 | 65 / 2.559 | 140 / 5.512 |
| 405T | 254 / 10.000 | 406.4 / 16.000 | 349 / 13.740 | 168.3 / 6.625 | 20.6 / 0.810 | 73 / 2.875 | 184.2 / 7.250 |

Fig. 6C2b

Values for dimensions – see for example as indicated in 6C1.

| IEC | | A | | B | | C | | K | | D | | E | |
|---|---|---|---|---|---|---|---|---|---|---|---|---|---|
| NEMA | H | D | 2E | | 2F | | BA | | H | | U | | N-W |
| 280S | | 280<br>11.024 | 457<br>17.992 | | 368<br>14.488 | | 190<br>7.480 | | 24<br>0.945 | | 65<br>2.559 | | 140<br>5.512 |
| 444T | | 279.4<br>11.000 | 457.2<br>18.000 | | 368.3<br>14.500 | | 190.5<br>7.500 | | 20.6<br>0.810 | | 85.7<br>3.375 | | 215.9<br>8.500 |
| 280M | | 280<br>11.024 | 457<br>17.992 | | 419<br>16.496 | | 190<br>7.480 | | 24<br>0.945 | | 75<br>2.953 | | 140<br>5.512 |
| 445T | | 279.4<br>11.000 | 457.2<br>18.000 | | 419.1<br>16.500 | | 190.5<br>7.500 | | 20.6<br>0.810 | | 85.7<br>3.375 | | 215.9<br>8.500 |
| 315S | | 315<br>12.402 | 508<br>20.000 | | 406<br>15.984 | | 216<br>8.504 | | 28<br>1.102 | | 65<br>2.559 | | 140<br>5.512 |
| 504Z | | 317.5<br>12.500 | 508<br>20.000 | | 406.4<br>16.000 | | 215.9<br>8.500 | | 31.8<br>1.250 | | 92.1<br>3.625 | | 270<br>10.630 |
| 315M | | 315<br>12.402 | 508<br>20.000 | | 457<br>17.992 | | 216<br>8.504 | | 28<br>1.102 | | 80<br>3.150 | | 170<br>6.693 |
| 505Z | | 317.5<br>12.500 | 508<br>20.000 | | 457.2<br>18.000 | | 215.9<br>8.500 | | 31.8<br>1.250 | | 92.1<br>3.625 | | 270<br>10.630 |
| 355M | | 355<br>13.976 | 610<br>24.016 | | 560<br>22.047 | | 254<br>10.000 | | 28<br>1.102 | | 75<br>2.953 | | 140<br>5.512 |
| 586T | | 368.3<br>14.500 | 584.2<br>23.000 | | 558.8<br>22.000 | | 254<br>10.000 | | 30<br>1.181 | | 98.4<br>3.875 | | 295.3<br>11.625 |
| 355L | | 355<br>13.976 | 610<br>24.016 | | 630<br>24.803 | | 254<br>10.000 | | 28<br>1.102 | | 100<br>3.937 | | 210<br>8.268 |
| 587T | | 368.3<br>14.500 | 584.2<br>23.000 | | 635<br>25.000 | | 254<br>10.000 | | 30<br>1.181 | | 98.4<br>3.875 | | 295.3<br>11.625 |

Fig. 6C2c

NEMA Frame Assignments

"T" FRAMES 1964

| NEMA FRAME PROGRAM | 3600 | | 1800 | | 1200 | | 900 | |
|---|---|---|---|---|---|---|---|---|
| HP | ODP | TEFC | ODP | TEFC | ODP | TEFC | ODP | TEFC |
| 1 | - | - | 143T | 143T | 145T | 145T | 182T | 182T |
| 1.5 | 143T | 143T | 145T | 145T | 182T | 182T | 184T | 184T |
| 2 | 145T | 145T | 145T | 145T | 184T | 184T | 213T | 213T |
| 3 | 145T | 182T | 182T | 182T | 213T | 213T | 215T | 215T |
| 5 | 182T | 184T | 184T | 184T | 215T | 215T | 254T | 254T |
| 7.5 | 184T | 213T | 213T | 213T | 254T | 254T | 256T | 256T |
| 10 | 213T | 215T | 215T | 215T | 256T | 256T | 284T | 284T |
| 15 | 215T | 254T | 254T | 254T | 284T | 284T | 286T | 286T |
| 20 | 254T | 256T | 256T | 256T | 286T | 286T | 324T | 324T |
| 25 | 256T | 284TS | 284T | 284T | 324T | 324T | 326T | 326T |
| 30 | 284TS | 286TS | 286T | 286T | 326T | 326T | 364T | 364T |
| 40 | 286TS | 324TS | 324T | 324T | 364T | 364T | 365T | 365T |
| 50 | 324TS | 326TS | 326T | 326T | 365T | 365T | 404T | 404T |
| 60 | 326TS | 364TS | 364TS | 364TS | 404T | 404T | 405T | 405T |
| 75 | 364TS | 365TS | 365TS | 365TS | 405T | 405T | 444T | 444T |
| 100 | 365TS | 405TS | 404TS | 405TS | 444T | 444T | 445T | 445T |
| 125 | 404TS | 444TS | 405TS | 444TS | 445T | 445T | - | - |
| 150 | 405TS | 445TS | 444TS | 445TS | - | - | - | - |
| 200 | 444TS | 444TS | 445TS | - | - | - | - | - |
| 250 | 445TS | 445TS | - | - | - | - | - | - |

Fig. 6D1

NEMA Frame Assignments

| NEMA FRAME PROGRAM | "U" FRAMES 1952 ||||||||||
|---|---|---|---|---|---|---|---|---|---|---|
| | 3600 || 1800 || 1200 || 900 ||
| HP | ODP | TEFC | ODP | TEFC | ODP | TEFC | ODP | TEFC |
| 1 | - | - | 182 | 182 | 184 | 184 | 213 | 213 |
| 1.5 | 182 | 182 | 184 | 184 | 184 | 184 | 213 | 213 |
| 2 | 184 | 184 | 184 | 184 | 213 | 213 | 215 | 215 |
| 3 | 184 | ##### | 213 | 213 | 215 | 215 | 254U | 254U |
| 5 | 213 | 213 | 215 | 215 | 254U | 254U | 256U | 256U |
| 7.5 | 215 | 215 | 254U | 254U | 256U | 256U | 284U | 284U |
| 10 | 254U | 254U | 256U | 256U | 284U | 284U | 286U | 286U |
| 15 | 256U | 256U | 284U | 284U | 286U | 286U | 326U | 326U |
| 20 | 284U | 286U | 286U | 286U | 324U | 324U | 364U | 364U |
| 25 | 286U | 324U | 324U | 324U | 326U | 326U | 365U | 365U |
| 30 | 324S | 326S | 326U | 326U | 364U | 364U | 404U | 404U |
| 40 | 326S | 364US | 364U | 364U | 365U | 365U | 405U | 405U |
| 50 | 364US | 364US | 365US | 365US | 404U | 404U | 444U | 444U |
| 60 | 365US | 405US | 404US | 404US | 405U | 405U | 445U | 445U |
| 75 | 404US | 444US | 405US | 405US | 444U | 444U | - | - |
| 100 | 405US | 445US | 444US | 444US | 445U | 445U | - | - |
| 125 | 444US | 444US | 445US | 445US | - | - | - | - |
| 150 | 445US | 445US | - | - | - | - | - | - |
| 200 | - | - | - | - | - | - | - | - |
| 250 | - | - | - | - | - | - | - | - |

Fig. 6D2

NEMA Frame Assignments

| NEMA FRAME PROGRAM | ORIGINAL NEMA FRAMES ||||||||||
|---|---|---|---|---|---|---|---|---|---|---|
| | 3600 || 1800 || 1200 || 900 ||
| HP | ODP | TEFC | ODP | TEFC | ODP | TEFC | ODP | TEFC |
| 1 | - | - | 203 | 203 | 204 | 204 | 225 | 225 |
| 1.5 | 203 | 203 | 204 | 204 | 224 | 224 | 254 | 254 |
| 2 | 204 | 204 | 224 | 224 | 225 | 225 | 254 | 254 |
| 3 | 224 | 224 | 225 | 225 | 254 | 254 | 284 | 284 |
| 5 | 225 | 225 | 254 | 254 | 284 | 284 | 324 | 324 |
| 7.5 | 254 | 254 | 284 | 284 | 324 | 324 | 326 | 326 |
| 10 | 286 | 286 | 324 | 324 | 326 | 326 | 364 | 364 |
| 15 | 324 | 324 | 326 | 326 | 364 | 364 | 365 | 365 |
| 20 | 326 | 326 | 364 | 364 | 365 | 365 | 404 | 404 |
| 25 | 364S | 365S | 364 | 365 | 404 | 404 | 405 | 405 |
| 30 | 364S | 404S | 365 | 404 | 405 | 405 | 444 | 444 |
| 40 | 365S | 405S | 404 | 405 | 444 | 444 | 445 | 445 |
| 50 | 404S | 444S | 405S | 444S | 445 | 445 | 504U | 504U |
| 60 | 405S | 445S | 444S | 445S | 504U | 504U | 505 | 505 |
| 75 | 444S | 504S | 445S | 504S | 505 | 505 | - | - |
| 100 | 445S | 505S | 504S | 505S | - | - | - | - |
| 125 | 504S | 504S | 505S | 505S | - | - | - | - |
| 150 | 505S | 505S | - | - | - | - | - | - |
| 200 | - | - | - | - | - | - | - | - |
| 250 | - | - | - | - | - | - | - | - |

Fig. 6D3

IEC Enclosure Ratings (IP Designation)

| Level | 1st Numeral: Protection against Solids | 2nd Numeral: Protection against Liquids |
|---|---|---|
| 0 | Non-protected | Non-protected |
| 1 | Objects greater than 50 mm | Dripping water |
| 2 | Objects greater than 12 mm | Dripping water on enclosure tilted up to 15 degrees |
| 3 | Objects greater than 2.5 mm | Spraying water up to 60 degrees from both sides |
| 4 | Objects greater than 1.0 mm | Splashing water from all sides |
| 5 | Dust-protected | Water jets |
| 6 | Dust-tight | Heavy seas |

Fig. 6E

NEMA Enclosure Ratings for Controls

| Protection Against: | 1 Indoor | 2 Indoor | 3 Outdoor | 3S Outdoor | 4 Indoor/Outdoor | 4X Indoor/Outdoor | 6 Indoor/Outdoor | 6P Indoor/Outdoor | 12 Indoor | 13 Indoor | PW12 Indoor/Outdoor |
|---|---|---|---|---|---|---|---|---|---|---|---|
| Accidental Bodily Contact | NEMA 1 | NEMA 2 | NEMA 3 | NEMA 3S | NEMA 4 | NEMA 4X | NEMA 6 | NEMA 6P | NEMA 12 | NEMA 13 | - |
| Falling Dirt | NEMA 1 | NEMA 2 | NEMA 3 | NEMA 3S | NEMA 4 | NEMA 4X | NEMA 6 | NEMA 6P | NEMA 12 | NEMA 13 | - |
| Dust, Lint, Non-Volatile Fibers | - | - | NEMA 3 | NEMA 3S | NEMA 4 | NEMA 4X | NEMA 6 | NEMA 6P | NEMA 12 | NEMA 13 | - |
| Windblown Dust | - | - | NEMA 3 | NEMA 3S | NEMA 4 | NEMA 4X | NEMA 6 | NEMA 6P | - | - | - |
| Falling Liquid Light Splash | - | NEMA 2 | NEMA 3 | NEMA 3S | NEMA 4 | NEMA 4X | NEMA 6 | NEMA 6P | NEMA 12 | NEMA 13 | - |
| Hosedown, Heavy Splash | - | - | - | - | NEMA 4 | NEMA 4X | NEMA 6 | NEMA 6P | - | - | - |
| High-Pressure, High-Temperature Spray | - | - | - | - | - | - | - | - | - | - | PW12 |
| Exposure to Cleaning, Sanitizing Chemicals | - | - | - | - | - | - | - | - | - | - | PW12 |
| Rain, Snow, Sleet | - | - | NEMA 3 | NEMA 3S | - | - | NEMA 6 | NEMA 6P | - | - | - |
| Ice Buildup | - | - | - | NEMA 3S | - | - | - | - | - | - | - |
| Oil or Coolant Seepage | - | - | - | - | - | - | - | - | NEMA 12 | NEMA 13 | - |
| Oil Coolant Spray or Splash | - | - | - | - | - | - | - | - | - | NEMA 13 | - |
| Occasional Submersion | - | - | - | - | - | - | NEMA 6 | NEMA 6P | - | - | - |
| Prolonged Submersion | - | - | - | - | - | - | - | NEMA 6P | - | - | - |
| Corrosive Agents | - | - | - | - | - | NEMA 4X | - | NEMA 6P | - | - | - |

Fig. 6F

Voltage Effects on Induction Motor Performance

| Characteristic | 110% of Voltage | 90% of Voltage |
|---|---|---|
| Starting Torque | Increase 21% | Decrease 19% |
| Maximum Torque | Increase 21% | Decrease 19% |
| Slip | Decrease 15-20% | Increase 20-30% |
| 100% Load Efficiency | Decrease 0-3% | Decrease 0-2% |
| 75% Load Efficiency | Decrease 0-3% | Little Change |
| 50% Load Efficiency | Decrease 0-5% | Increase 0-1% |
| 100% Power Factor | Decrease 5-15% | Increase 1-7% |
| 75% Power Factor | Decrease 5-15% | Increase 2-7% |
| 50% Power Factor | Decrease 10-20% | Increase 3-10% |
| Full Load Current | Decrease Slightly-5% | Increase 5-10% |
| Starting Current | Increase 10% | Decrease 10% |
| Full Load Temperature Rise | Decrease 10% | Increase 10-15% |
| Maximum Overload Capacity | Increase 5% | Decrease 5-7% |
| Noise | Increase Slightly | Decrease Slightly |

Fig. 6G

NEMA vs. IEC Terminal Markings

| NEMA | IEC |
|------|-----|
| T1   | U1  |
| T2   | V1  |
| T3   | W1  |
| T4   | U2  |
| T5   | V2  |
| T6   | W2  |
| T7   | U5  |
| T8   | V5  |
| T9   | W5  |
| T10  | U6  |
| T11  | V6  |
| T12  | W6  |

Fig. 6H

Electrical Formulas

| Motor Type | Single Phase | Three Phase | Direct Current |
|---|---|---|---|
| Horsepower | $\dfrac{I \times E \times \text{Eff} \times PF}{746}$ | $\dfrac{I \times E \times \text{Eff} \times 1.73 \times PF}{746}$ | $\dfrac{I \times E \times \text{Eff}}{746}$ |
| KVA | $\dfrac{I \times E}{1000}$ | $\dfrac{I \times E \times 1.73}{1000}$ | --- |
| Kilowatts | $\dfrac{I \times E \times PF}{1000}$ | $\dfrac{I \times E \times 1.73 \times PF}{1000}$ | $\dfrac{I \times E}{1000}$ |
| Amperes when Horsepower is known | $\dfrac{HP \times 746}{E \times \text{Eff} \times PF}$ | $\dfrac{HP \times 746}{1.73 \times E \times \text{Eff} \times PF}$ | $\dfrac{HP \times 746}{E \times \text{Eff}}$ |
| Amperes when Kilowatts is known | $\dfrac{KW \times 1000}{E \times PF}$ | $\dfrac{KW \times 1000}{1.73 \times E \times PF}$ | $\dfrac{KW \times 1000}{E}$ |
| Amperes | $\dfrac{KVA \times 1000}{E}$ | $\dfrac{KVA \times 1000}{1.73 \times E}$ | --- |

E = Volts   I = Amperes   Eff = Percent efficiency
PF = Power factor   HP = Horsepower   KVA = Kilovolt-Amps

Fig. 6I

Three Phase Wiring Diagrams
NEMA
Dual Voltage
Y Connected
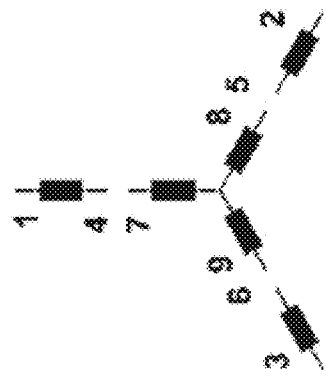
| Voltage | L1 | L2 | L3 | Join |
|---|---|---|---|---|
| Low | 1,7 | 2,8 | 3,9 | 4&5&6 |
| High | 1 | 2 | 3 | 4&7, 5&8, 6&9 |
Fig. 6J1

Three Phase Wiring Diagrams
NEMA
Dual Voltage
Delta Connected
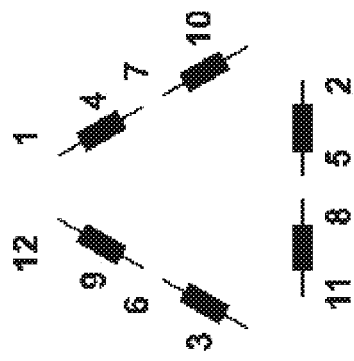
| Voltage | L1 | L2 | L3 | Join |
|---|---|---|---|---|
| Low | 1,6, 7,12 | 2,4, 8,10 | 3,5, 9,11 | - |
| High | 1,12 | 2,10 | 3,11 | 4&7, 5&8, 6&9 |
Fig. 6J2

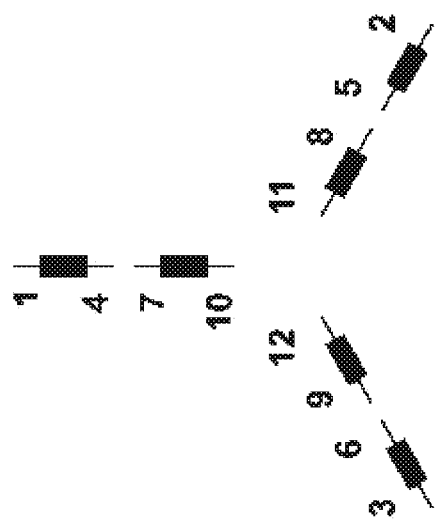
Fig. 6J3

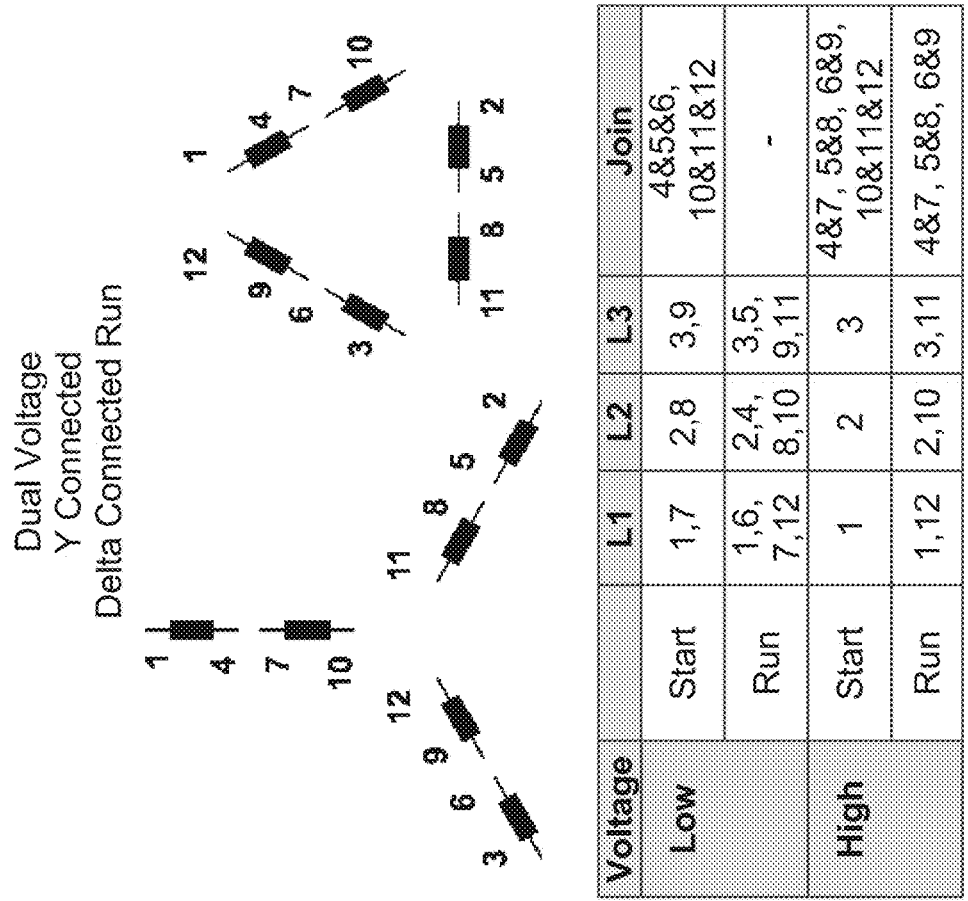
Fig. 6J4

Fig. 6L

Understanding The New Electric Motor Energy Efficiency Regulations

Minimal Nominal Efficiency Standard (Premium)

| Item | Power in HP | Power in kW | Energy Efficiency Standard (Percentage) | | | | | | This table applies to: |
|---|---|---|---|---|---|---|---|---|---|
| | | | Open | | | Enclosed | | | |
| | | | 2 Pole | 4 Pole | 6 Pole | 2 Pole | 4 Pole | 6 Pole | NEMA Motors from 1 HP up to and including 200 HP or IEC (Metric) Motors larger than 0.746 kW and up to and including 150 kW |
| 1 | 1 | 0.75 | 77 | 85.5 | 82.5 | 77 | 85.5 | 82.5 | • 2 Pole (3600 RPM), 4 Pole (1800 RPM) or 6 Pole (1200 RPM) |
| 2 | 1.5 | 1.1 | 84 | 86.5 | 86.5 | 84 | 86.5 | 87.5 | • NEMA T frame or IEC (metric) 90 frame and above |
| 3 | 2 | 1.5 | 85.5 | 86.5 | 87.5 | 85.5 | 86.5 | 88.5 | • NEMA design A or B, or IEC design N |
| 4 | 3 | 2.2 | 85.5 | 89.5 | 88.5 | 86.5 | 89.5 | 89.5 | • Standard shaft, R-shaft (tapered) or S-shaft (short) or an IEC (metric) equivalent |
| 5 | 4 | 3 | 86.5 | 89.5 | 89.5 | 88.5 | 89.5 | 89.5 | |
| 6 | 5 | 3.7 | 86.5 | 89.5 | 89.5 | 88.5 | 89.5 | 89.5 | |
| 7 | 5.5 | 4 | 86.5 | 89.5 | 89.5 | 88.5 | 89.5 | 89.5 | |
| 8 | 7.5 | 5.5 | 88.5 | 91 | 90.2 | 89.5 | 91.7 | 91 | |
| 9 | 10 | 7.5 | 89.5 | 91.7 | 91.7 | 90.2 | 91.7 | 91 | |
| 10 | 15 | 11 | 90.2 | 93 | 91.7 | 91 | 92.4 | 91.7 | |
| 11 | 20 | 15 | 91 | 93 | 92.4 | 91 | 93 | 91.7 | |
| 12 | 25 | 19 | 91.7 | 93.6 | 93 | 91.7 | 93.6 | 93 | |
| 13 | 30 | 22 | 91.7 | 94.1 | 93.6 | 91.7 | 93.6 | 93 | |
| 14 | 40 | 30 | 92.4 | 94.1 | 94.1 | 92.4 | 94.1 | 94.1 | |
| 15 | 50 | 37 | 93 | 94.5 | 94.1 | 93 | 94.5 | 94.1 | |
| 16 | 60 | 45 | 93.6 | 95 | 94.5 | 93.6 | 95 | 94.5 | |
| 17 | 75 | 55 | 93.6 | 95 | 94.5 | 93.6 | 95.4 | 94.5 | |
| 18 | 100 | 75 | 93.6 | 95.4 | 95 | 94.1 | 95.4 | 95 | |
| 19 | 125 | 90 | 94.1 | 95.4 | 95 | 95 | 95.4 | 95 | |
| 20 | 150 | 110 | 95 | 95.8 | 95.4 | 95 | 95.8 | 95.8 | |
| 21 | 175 | 132 | 95 | 95.8 | 95.4 | 95.4 | 96.2 | 95.8 | |
| 22 | 200 | 150 | 95 | 95.8 | 95.4 | 95.4 | 96.2 | 95.8 | |

Fig. 6M1

Understanding The New Electric Motor Energy Efficiency Regulations

Minimal Nominal Efficiency Standard (Energy Efficient)

| Item | Power in HP | Power in kW | Energy Efficiency Standard (Percentage) ||||||||
|---|---|---|---|---|---|---|---|---|---|---|
| | | | Open |||| Enclosed ||||
| | | | 2 Pole | 4 Pole | 6 Pole | 8 Pole | 2 Pole | 4 Pole | 6 Pole | 8 Pole |
| 1. | 1 | 0.75 | 75.5 | 82.5 | 80.0 | 74.0 | 75.5 | 82.5 | 80.0 | 74.0 |
| 2. | 1.5 | 1.1 | 82.5 | 84.0 | 84.0 | 75.5 | 82.5 | 84.0 | 85.5 | 77.0 |
| 3. | 2 | 1.5 | 84.0 | 84.0 | 85.5 | 85.5 | 84.0 | 84.0 | 86.5 | 82.5 |
| 4. | 3 | 2.2 | 84.0 | 86.5 | 86.5 | 86.5 | 85.5 | 87.5 | 87.5 | 84.0 |
| 5. | 4 | 3 | 84.0 | 86.5 | 86.5 | 86.5 | 85.5 | 87.5 | 87.5 | 84.0 |
| 6. | 5 | 3.7 | 85.5 | 87.5 | 87.5 | 87.5 | 87.5 | 87.5 | 87.5 | 85.5 |
| 7. | 5.5 | 4 | 85.5 | 87.5 | 87.5 | 87.5 | 87.5 | 87.5 | 87.5 | 85.5 |
| 8. | 7.5 | 5.5 | 87.5 | 88.5 | 88.5 | 88.5 | 88.5 | 89.5 | 89.5 | 85.5 |
| 9. | 10 | 7.5 | 88.5 | 89.5 | 90.2 | 89.5 | 89.5 | 89.5 | 89.5 | 88.5 |
| 10. | 15 | 11 | 89.5 | 91.0 | 90.2 | 89.5 | 90.2 | 91.0 | 90.2 | 88.5 |
| 11. | 20 | 15 | 90.2 | 91.0 | 91.0 | 90.2 | 90.2 | 91.0 | 90.2 | 89.5 |
| 12. | 25 | 19 | 91.0 | 91.7 | 91.7 | 90.2 | 91.0 | 92.4 | 91.7 | 89.5 |
| 13. | 30 | 22 | 91.0 | 92.4 | 92.4 | 91.0 | 91.0 | 92.4 | 91.7 | 91.0 |
| 14. | 40 | 30 | 91.7 | 93.0 | 93.0 | 91.0 | 91.7 | 93.0 | 93.0 | 91.0 |
| 15. | 50 | 37 | 92.4 | 93.0 | 93.0 | 91.7 | 92.4 | 93.0 | 93.0 | 91.7 |
| 16. | 60 | 45 | 93.0 | 93.6 | 93.6 | 92.4 | 93.0 | 93.6 | 93.6 | 91.7 |
| 17. | 75 | 55 | 93.0 | 94.1 | 93.6 | 93.6 | 93.0 | 94.1 | 93.6 | 93.0 |
| 18. | 100 | 75 | 93.0 | 94.1 | 94.1 | 93.6 | 93.6 | 94.5 | 94.1 | 93.0 |
| 19. | 125 | 90 | 93.6 | 94.5 | 94.1 | 93.6 | 94.5 | 94.5 | 94.1 | 93.6 |
| 20. | 150 | 110 | 93.6 | 95.0 | 94.5 | 93.6 | 94.5 | 95.0 | 95.0 | 93.6 |
| 21. | 175 | 132 | 94.5 | 95.0 | 94.5 | 93.6 | 94.5 | 95.0 | 95.0 | 94.1 |
| 22. | 200 | 150 | 94.5 | 95.0 | 94.5 | | 95.0 | 95.0 | 95.0 | 94.1 |
| 23. | 250 | 185 | 94.5 | 95.4 | 95.4 | 94.5 | 95.4 | 95.0 | 95.0 | 94.5 |
| 24. | 300 | 225 | 95.0 | 95.4 | 95.4 | | 95.4 | 95.4 | 95.0 | |
| 25. | 350 | 260 | 95.0 | 95.4 | 95.4 | | 95.4 | 95.4 | 95.0 | |
| 26. | 400 | 300 | 95.4 | 95.4 | 95.4 | | 95.4 | 95.4 | | |
| 27. | 450 | 335 | 95.8 | 95.8 | | | 95.4 | 95.4 | | |
| 28. | 500 | 375 | 95.8 | 95.8 | | | 95.4 | 95.8 | | |

This table applies to:

- 8-pole (900 RPM) construction, or
- U frame or equivalent IEC (metric) dimensions, or
- NEMA design C or IEC (metric) design H, or
- Close-coupled pump motor (JM, JP, P Base etc..), or
- Fire pump duty motor, or
- Vertically-mounted solid shaft normal thrust motor, as tested in the horizontal configuration, or
- Footless construction, or
- NEMA design B motors of size greater than 200 HP and up to and including 500 HP or IEC design N motor of size greater than 150 kW and up to and including 375 kW.
- Integral gear motors
- Voltage other than 230V & 460V

Fig. 6M2

ENHANCED REVERSE-WINDING INDUCTION MOTOR DESIGNS, SYSTEMS, AND METHODS

This application is the United States National Phase of international PCT application number PCT/US20/13538, filed 14 Jan. 2020. Said international application and any priority cases are hereby incorporated by reference in their entirety herein.

TECHNICAL FIELD

This patent relates to designs, systems, and methods for induction motors. It has particular applicability to a unique class of induction motors, namely, reverse-winding induction motors. These motors present unique designs that offer high-efficiency and exceptionally good power factor. This patent provides enhanced designs for such motors and other induction motors, and discloses systems and methods that expand applicability of this unique class of induction motors as well as other induction motors to achieve additional benefits.

BACKGROUND

Induction motors, sometimes referred to as asynchronous motors, were first invented by Nikola Tesla over 100 years ago. Although originally invented via a highly intuitive basis, over the ensuing century, their operation has come to be understood to some degree both theoretically and mathematically. Improvements have been made and designs have been refined to where the induction motor is nearly ubiquitous in our society. In 2003, The present inventor created what is here characterized as a unique class of induction motors, the reverse-winding induction motor. As explained in U.S. Pat. Nos. 7,034,426 and 7,227,288, incorporated herein by reference, this class of induction motors involves a main or forward winding as well as a secondary or reverse winding. Interestingly, as with the highly intuitive original invention of the induction motor by Tesla himself, these types of motors were also developed via a highly intuitive understanding of induction motors. Theoretical and mathematical bases were not the primary basis of invention at that time. As a result, this particular class of induction motor presents advantages and results that were often difficult to understand and difficult to accept for more parochially trained engineers. While those original reverse-winding induction motors offered unusually high power factor and unquestioned advantages in isolation, it appears that widespread acceptance did not occur commensurate with the commercial advantages offered.

And, just as with a more conventional induction motor, development continued nonetheless, and a number of even more significant advantages and designs has been realized. These advantages address concerns of the use of induction motors in general alone as well as in combined load networks. And, surprisingly and even unexpectedly even though the reverse-winding induction motor class has been known since their original invention in the early 2000's, it is now discovered that with appropriate selection of parameters and, for some embodiments revised winding techniques, parameters and techniques that were for reverse-winding induction motors previously understood as undesirable, fundamentally different and advantageous operational characteristics can now be achieved. These new advantages offer specific operational opportunities that can now be realized especially in utilization of this unique class of induction motor, albeit likely in others as well. This disclosure shows that even the teachings and understandings from the original invention of the reverse-winding induction motors can and has now been advanced. Again, these advances have occurred like Tesla's original invention from an intuitive understanding. And perhaps also like Tesla's original invention over a century ago, these advances may be more challenging for the more parochially trained, but they exist nonetheless as actual reduction to practice establishes.

The present invention may thus be understood to offer advantages that are not only unexpected but that may even run counter to the prevailing considerations of and expectations for induction motors in general. Specifically, although it is widely accepted that induction motors are, as they are very name implies, inductive, and thus present lagging current with respect to voltage, the present invention and newly discovered reverse-winding induction motor designs show that even this time-accepted truism is not always true and that there are unique designs (many of which are disclosed here) that can even overcome this seemingly unalterable rule or seemingly irrefutable paradigm.

Accordingly, the present invention presents unique induction motor designs as well as unique uses of these designs and unique operational advantages for these designs both in isolation as well as in combination with other loads, and especially with other induction motor loads. It also present unique uses of these designs and unique operational advantages for these designs both in isolation as well as in combination with other loads, and again especially with other induction motor loads.

DISCLOSURE OF THE INVENTION

Accordingly, this patent discloses a variety of new designs, systems, and methods that offer advantages for reverse-winding induction motors as well as other situations. It presents designs and combinations that can present power factor and other corrections in more advantageous ways than such were achieved previously. For example, designs can now be achieved that present an induction motor that is not even inductive in the sense that it does not present a lagging power factor. Counterintuitive as this may at first glance appear, because as the word "induction" in induction motor indicates or at least suggests that the inductor must be inductive, the present invention shows that there are ways to design an induction motor so that that motor alone is not inductive. And, while this may meet with resistance from the parochially trained, the fact of the matter is that the present invention includes designs that have been shown to actually function in this manner. Thus, one goal of an embodiment of the invention is to present induction motors that are less if not completely un-inductive in the sense of presenting a lagging current as compared to voltage.

Another goal of the invention is to present designs which can correct negative attributes of an existing network or connection. In keeping with this goal, an object of the invention is to present a motor that actually corrects power factor for a network by the inclusion of new elements. And these elements can themselves be work producing. Hence, another goal of the invention is to provide designs which can achieve correction such as power factor correction for a network not just by using passive elements, but by providing a device that can actually achieve work while accomplishing its desired correction. And in further keeping with this goal, an object is to provide a device that accomplishes work in a long-term operational manner, without overheating or having poor practical attributes.

Yet another goal of the invention is to provide elements that variably correct without adjusting the particular electrical element involved in the correction. Thus, an object of the invention is to achieve the degree of correction appropriate without needing to alter the particular corrective element.

An aspect and goal of embodiments of the invention is to allow devices and combinations that form an enhanced power factor network where the addition of a work producing, and typically thought of as inductive, device can actually reduce the inductive character of the network.

As mentioned above, one goal of the invention is to provide individual devices that have enhanced operational characteristics. In keeping with this goal, embodiments of the invention present new induction motor designs and new reverse-winding induction motor designs that can achieve not only the above attributes but that themselves individually present an enhanced attribute induction motor. In keeping with this goal, objects can include presenting an individual motor that not only has high power factor, but that can also present leading current as compared to voltage. In this regard, a goal of the invention is to present embodiments that (however counterintuitive and unbelievable it may at first glance appear to the parochially trained) present an induction motor that exhibits leading current as compared to voltage and may even be considered from this perspective as presenting negative reactive power.

Yet another goal of the invention is to offer designs and operational processes that can achieve unusually advantageous start processes and characteristics. In keeping with this goal, an object can be to provide low inrush current, soft start capabilities that are not only enhanced with respect to existing designs, but that can be achieved with less control complexities and easier than existing designs.

Naturally, other goals and objects of the invention are disclosed throughout the text, clauses, and claims.

MODE(S) FOR CARRYING OUT THE INVENTION

As mentioned earlier, this patent presents a variety of inventive aspects which may be combined in different ways or that may be inventive by their combination with other aspects. The following descriptions are provided to list elements and describe some of the embodiments of the present invention. These elements are listed with initial embodiments, however, it should be understood that they may be combined in any manner and in any number to create additional embodiments. The variously described examples and preferred embodiments should not be construed to limit the present invention to only be explicitly described designs, systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breath of other more encompassing claims that may be made where such may be only one of several methods or embodiments which could be employed in a broader claim or the like. Further, this description should be understood to support and encompass descriptions and claims of all the various environments, systems, techniques, methods, designs, devices, and applications with any number of disclosed elements, with each element alone, and also with any and all various permutations and combinations of all elements in this or any subsequent application.

Figure 1:
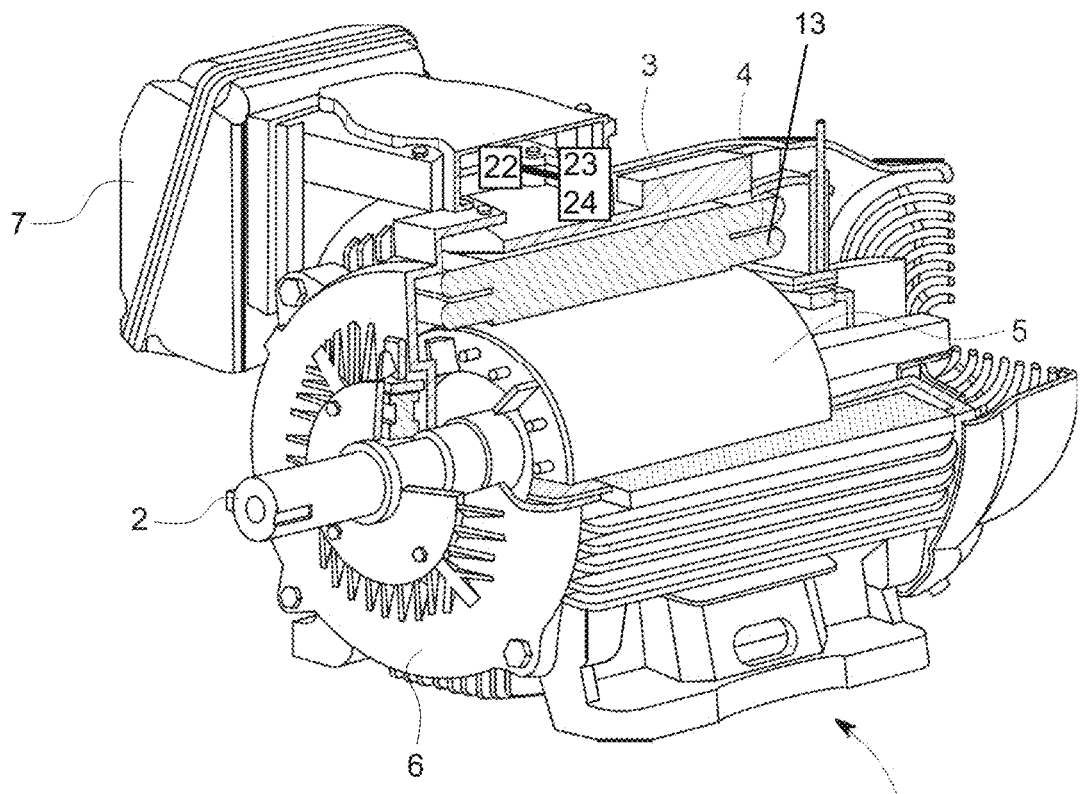
FIG. 1 depicts a cut away view of a representative motor according to some embodiments of the present invention.

One of aspect of the invention focuses on a reverse-winding induction motor. As shown in FIG. 1, the electrical motor (1) can operate to turn a rotor (2) by magnetic operation of a stator (3) that has windings (4) situated therein operating in conjunction with the rotor (2). As is well known, the induction motor (1) can utilize magnetically permeable material at both the rotor (2) and the stator (3) which together can be considered to comprise the core (5). As is well-known, the core (5) can be sized in previous designs to be as small as possible for the amount of horsepower or kilowatts of that motor design. All this can be provided in an encasement (6) that can be a standardized encasement (6) sized by standard setting bodies such as NEMA based on the hp size of the motor. This electrical induction motor (1) is operated by providing electrical connection (17) to a source of power (7). This source of power (7) is typically a public power source such as the grid (20) and usually involves billing that, for commercial customers, can vary based upon the power factor existing and observed by the public power company such as at the point of connection to the grid (20).

Figure 2:
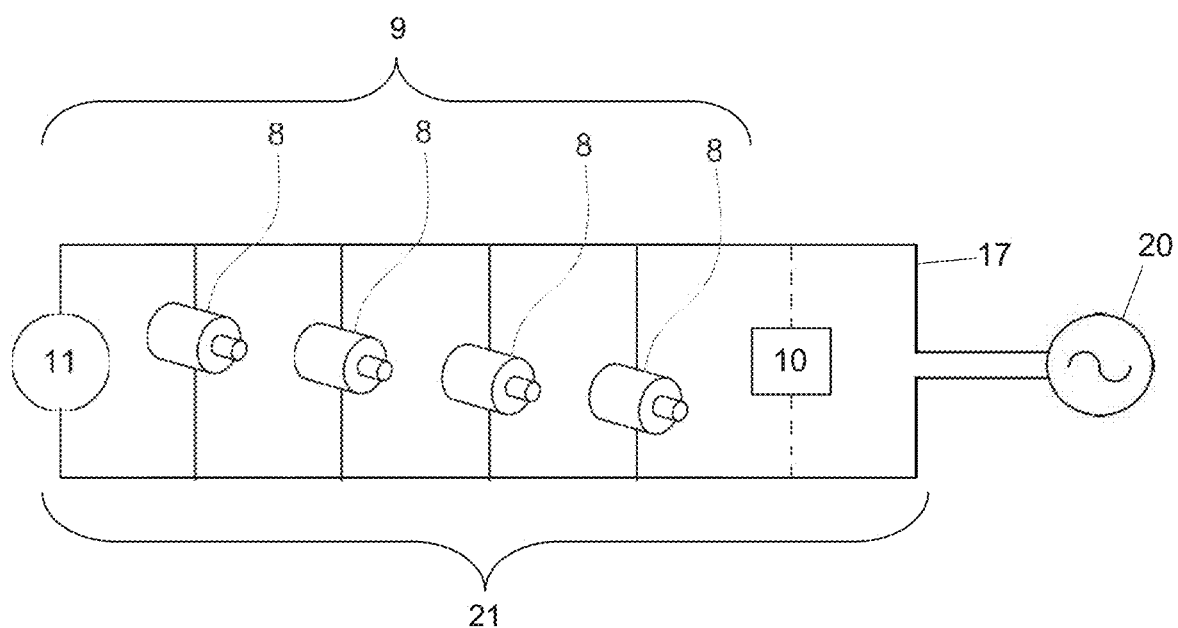
FIG. 2 is a schematic diagram of an initial and enhanced network of a collection of induction motors.

As illustrated in the schematic in FIG. 2, the grid (20) can supply power to a network of items, shown in FIG. 2 as a number of existing motors perhaps existing induction motors (8). The network of items can also include other network elements (11) which together present a particular type of load for the grid (20). This collection, shown in FIG. 2 as four existing motors (8) plus the other network elements (11) can together be considered an initial network (9). Naturally any number of motors, devices, other network elements, or the like can exist; FIG. 2 shows just a diagrammatic example. As illustrated by the dashed lines, addition to the initial network (9), can be of an additional item, perhaps an additional electrical motor (10) or other corrective device. This additional motor (10) or other corrective device can be added to the initial network (9) and this total combination can (if according to the present invention) present an enhanced power factor electrical network (21) that exhibits enhanced power factor or other attributes. Naturally, this can be when the additional motor (10) or other corrective device is included and designed according to aspects of the present invention.

As mentioned above and as should be appreciated, above description is identifying elements as may be contained in apparatus claims, however, methods and processes can be included as well. This is now discussed with respect to the above elements, as an example only. Later discussions in this application—whether provided in apparatus element language or in method step language should be understood as encompassing both. For example, in the above the electrical connection (17) to a source of power (7) should be understood as encompassing electrically connecting and providing at least one electrical motor and powering the device, or network as one of ordinary skill in the art should well understand.

An aspect of the invention is the fact that it can offer not only unique devices and unique motors, but that, when employed in combination with or added to other items, such as by adding to an initial network (9), it can enhance that initial network (9) and even correct it. This can create an enhanced power factor electrical network (21) that has a corrected power factor and other enhanced attributes.

Correction of power factor is something that is, of course, well known. Typically, it is done by a passive, non-work producing element that is traditionally expected to include capacitors or capacitive elements. These types of corrective elements are non-productive, non-work producing items. They not only present an expense, but by containing capacitors, they can tend to present problems and introduce reliability issues. As embodiments of the present invention show, this can be substantially avoided and the correction now shows that an induction motor can be used that exhibits negative reactive power, enhanced power factor, and need not be what is typically thought of as necessarily a capacitive load in this regard. Not only does this invention show that the additional corrective device or element can be a work producing element, it can be a torque producing electrical motor capable of long-term operation. Furthermore, the additional electrical motor (10) can be a motor that is not prone to overheating in substantially full load operation and can thus be used in long-term operation. Of course, the aspect of long-term operation is important to all motors, however, it should be understood that the teachings of the present invention provide for improved induction motors that are not merely intended for incidental use, but rather, they are intended for long-term operational and work producing use.

Of course, the aspect of using seemingly inductive components such as an "induction" motor to achieve the step of inductively correcting to at least some degree an initial inductive component can be non-intuitive to the parochially trained. Yet, the fact remains that by connecting at least one electrical induction motor of this particular type, an initial network (9) can exhibit a corrected inductive power factor condition and can achieve other advantages. An induction motor of this new type can hereby be used to correct lag of current with respective voltage as is well desired.

Figure 3:
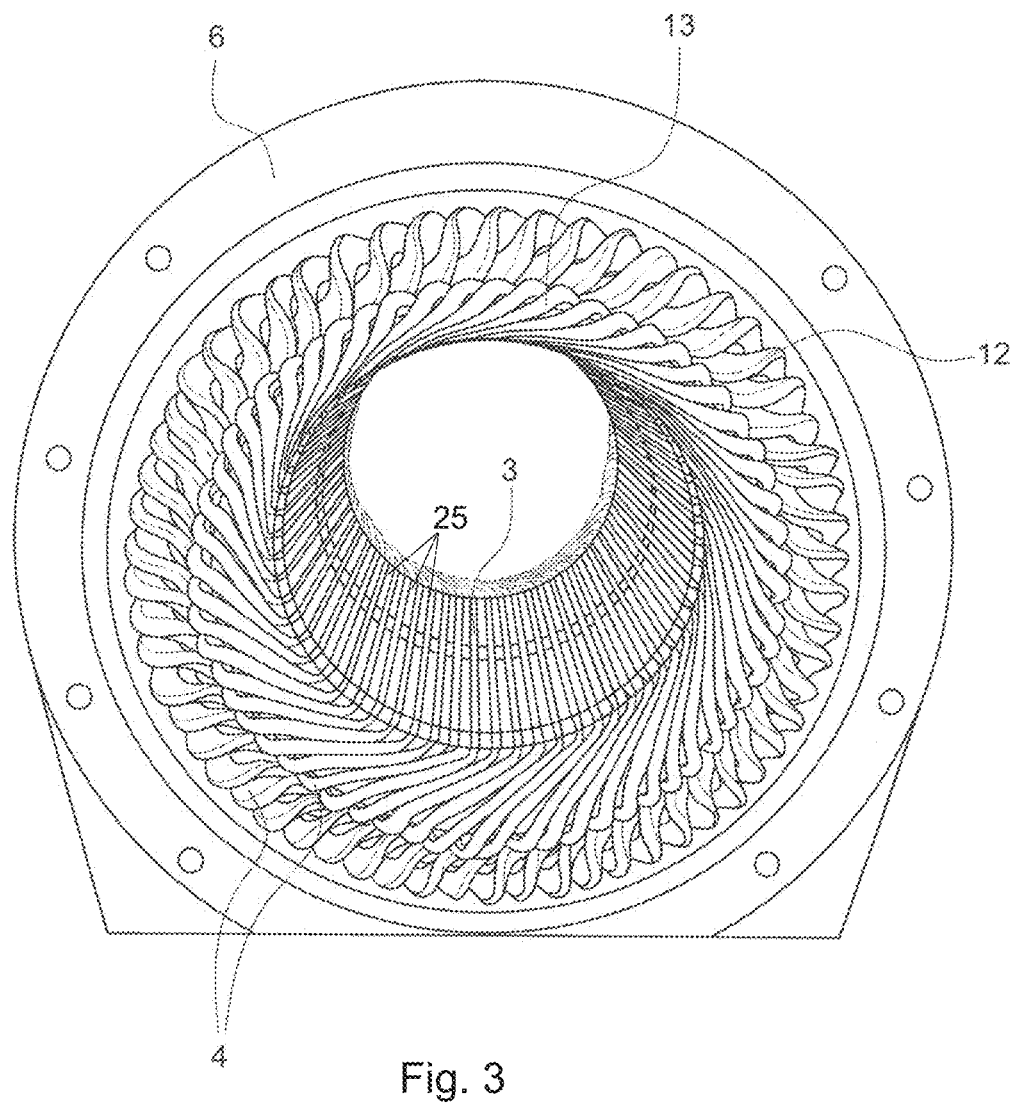
FIG. 3 shows a representative design having adjacent forward and reverse windings in the stator portion of an encased motor.
Figure 4:
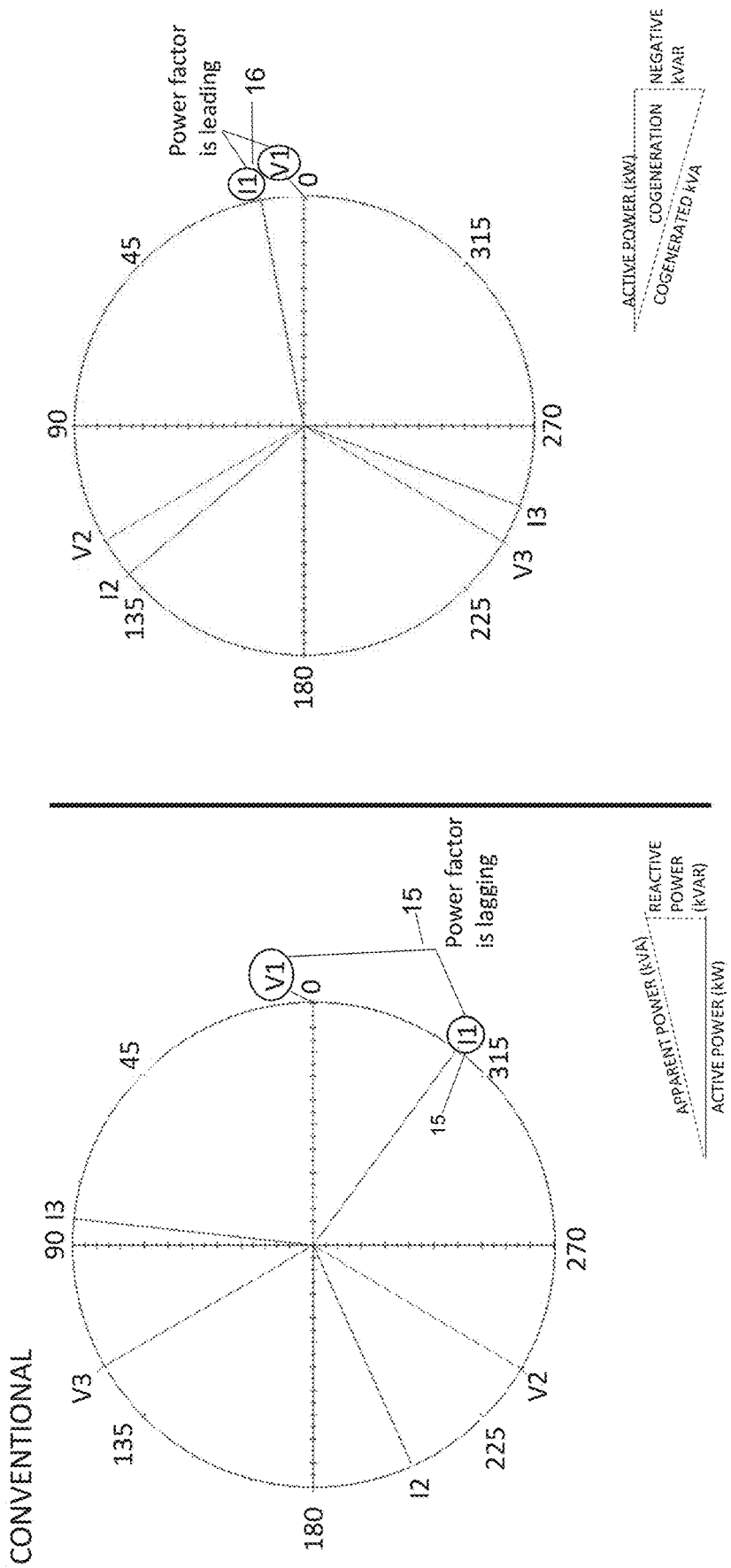
FIG. 4 shows a polar diagram of voltage and current for a conventional and improved design according to one embodiment of the present invention.

In embodiments of the invention, the enhanced power factor electrical network (21) can as shown contain two different types of induction motors. A traditional induction motor, namely, designs with only what is herein referred to as forward windings (12), and a reverse winding induction motor, namely, an induction motor that has both forward (12) and reverse (13) windings. Adjacent forward (12) and reverse (13) windings are shown in FIG. 3; co-wound forward (12) and reverse (13) windings can also be utilized. In the new technique of utilizing adjacent forward (12) and reverse (13) windings shown in FIG. 3, as those of ordinary skill in the art will well appreciate, the windings can be made around a winding former and then the winding be positioned in a known looping fashion into the slots (25) of the stator core (3) as shown. Further these windings (4) can be configured as opposite direction windings and so, such motors can present opposite direction winding electrical motors. The opposite direction windings can also act in a reverse fashion and can present a motor that exhibits leading current with respect to voltage. These embodiments of the invention can lessen to at least some degree an amount of current lag behind voltage for an initial network (9). This relationship between current and voltage is shown in, as one actual example, FIG. 4. As FIG. 4 shows, the conventional motor might in this example exhibit a current lag of about 40° as a lagging power factor (15), whereas for a similar horsepower and other factors motor, that same motor with aspects of embodiments of the present invention might exhibit a lead of current with respect to voltage of about 10° as a leading power factor (16) as shown. While this leading power factor might otherwise be undesired because totally in-phase current and voltage might in isolation be desired, when used in combination with other traditional induction motors, it can correct power factor in an initial network (9). Accordingly, a reduction in a network lag angle of current as compared to voltage for a given load percentage condition can be achieved for a network. Embodiments of the invention can be considered as presenting a network current lag reduction device or a network current lag reduction electrical motor.

And for some embodiments of the invention, the amounts of correction can be substantial. For example, embodiments of the invention can cause a reduction of lag angle of current as compared to voltage by at least about 60° at 0% maximum rated load, 50° at 25%, 40° at 50%, 30° at 75%, and even 20° at 100% of maximum rated load. Similarly, the reduction in power consumed by an initial network (9) as compared to an enhanced power factor electrical network (21) which includes an additional electrical motor (10) can exist. Embodiments can cause or can provide network power consumption reduction electrical motors that achieve a 1% power reduction, a 2% power reduction, a 4% power reduction, an 8% power reduction, a 10% power reduction, a 15% power reduction, a 20% power reduction, and even a 25% power reduction. Again, this can represent the power reduction that occurs by the, amazingly, the addition of an electrical motor that is itself doing work. To be clear, in achieving correction, the additional electrical motor (10) can actually reduce the power consumed from an initial network (9) without that additional electrical motor (10) to the enhanced power factor electrical network (21) with that additional electrical motor (10) doing its additional amount of work. This is remarkable and underscores the non-intuitiveness of the present invention to those that are parochially trained.

Of course, related to an improvement of lag angle as well as an improvement in power consumption, is the fact that embodiments of the present invention can improve power factor. Again, these improvements are not trivial. For example the improvement in power factor between the initial network (9) (without the additional electrical motor (10)) and the enhanced power factor electrical network (21) (with the additional electrical motor (10)) can be an improvement in power factor by at least about 0.1 up to one, 0.2 up to one, 0.3 up to one, 0.4 up to one, 0.5 up to one, and even 0.6 up to one (considering a power factor of one to be the maximum, although as mentioned there can be apparent reduction in energy consumed as mentioned above). These magnitudes of power factor correction can exist for at least one load percentage condition or even for all load percentage conditions.

Correction across all loads is also a significant result of embodiments of the invention. As explained below, the correction can also be variable to suit the needs of the network, the load of the motor, or otherwise. With respect to just the loads involved, appropriately designed embodiments of the invention can cause or achieve a lag correction for at least about a 25% load, a 33% load, a 50% load, a 67% load, an 80% load, a 90% load, a 95% load, a 98% load, only even a 100% load as compared to the rating of the motor. Correction can be across substantially all work producing loads. Appropriately designed embodiments of the additional electrical motor (10) can be an induction motor that exhibits a lag of current as compared to voltage chosen from a lag angle of not greater than about 80° at 0% maximum rated load, 60° at about 15%, 45° at about 25%, 30° at about 50%, 30° at about 75%, and 30° at about 100% maximum rated load. Appropriately designed embodiments of the additional electrical motor (10) can also present a leading angle of current as compared to voltage at about 0% maximum rated load, about 25%, about 50%, about 75%, about 90%, about 95%, and even a lead angle of current as compared to voltage at about 100% of maximum rated load. Designs can be selected for any of these attributes as well as others mentioned herein.

These advantages and improvements can be achieved by providing an additional electrical motor (10) that has at least one forward winding (12) and at least one reverse winding (13). As may be appreciated, single phase motors might utilize one forward and one reversed winding, and three phase motors may utilize three forward and three reverse windings. As will be well appreciated by those skilled in the art, the windings can both have a magnetic flux space. And the forward winding (12) and reverse winding (13) can both have magnetic flux space that coincide internally and now even externally to at least some degree. While they may overlap entirely throughout the flux space, it is possible that certain embodiments may only involve a situation where, as but one example, the reverse winding (13) may be adjacent the forward winding (12) and external flux space can be the primary overlap. Again, the windings may be co-located or it/they may be adjacent and so have flux that overlaps in only a portion (perhaps for some embodiments primarily the external portion for some adjacent winding designs). The adjacent winding and placement technique of the reverse winding (13) may be desirable for higher voltage motors (above 2000 V) where windings (4) can be positioned adjacent each other in the slots (25) of the stator core (3) as shown to allow insulation advantages. Further, as mentioned above, these two windings can be opposite direction windings. As may be understood, this exists as one example where the current in one winding flows the opposite direction of the other winding whether around the same core or as adjacent windings. In such an arrangement it can conceptually be considered that the two cancel some effects between them. And with such designs, the additional electrical motor (10) can be considered to present a magnetic flux direction opposed electrical motor.

An interesting attribute of embodiments of the invention is that they can also be considered as presenting variable correction capabilities. The electrical motor or other device can thus be a variable correction electrical motor or other device. This variable correction can exist across substantially all loads and can act passively without any altering of the character of the electrical correction component that contributes to the correction. Although in traditional power factor correction devices, the elements involved can sometimes be variable such as a capacitor for which capacitance is varied, perhaps even by adding or removing capacitors via relays and contactors, in the present invention variable correction can exist without any alteration of the character of the electrical correction component. The reverse winding can remain configured and have the same values throughout. And this variable character can exist for all the correction amounts and all operational parameters mentioned above.

Figure 6K:
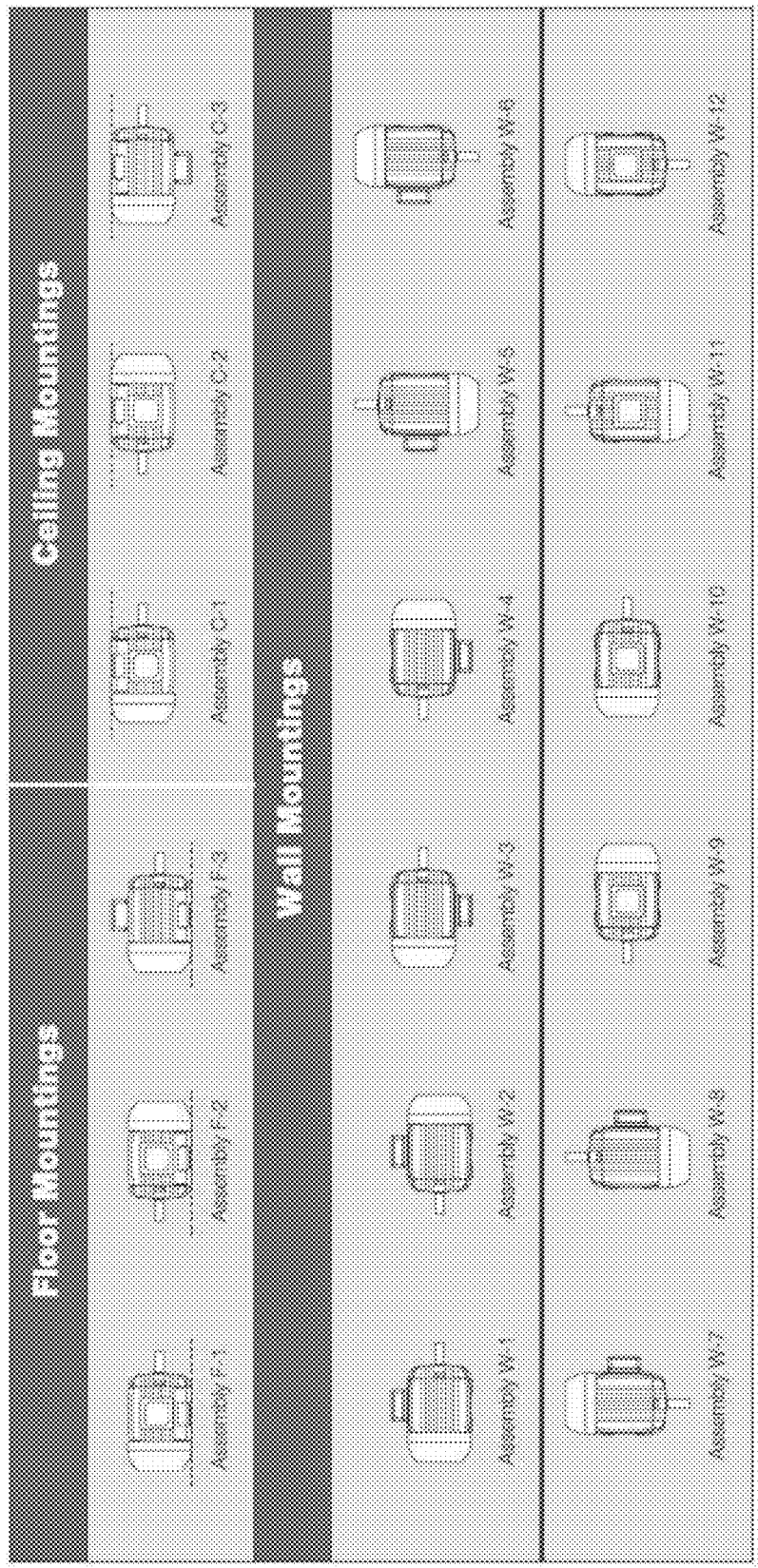
FIG. 6 is an excerpt of one set of industry standards as is useful to understand embodiments of the invention.
Figure 6L:
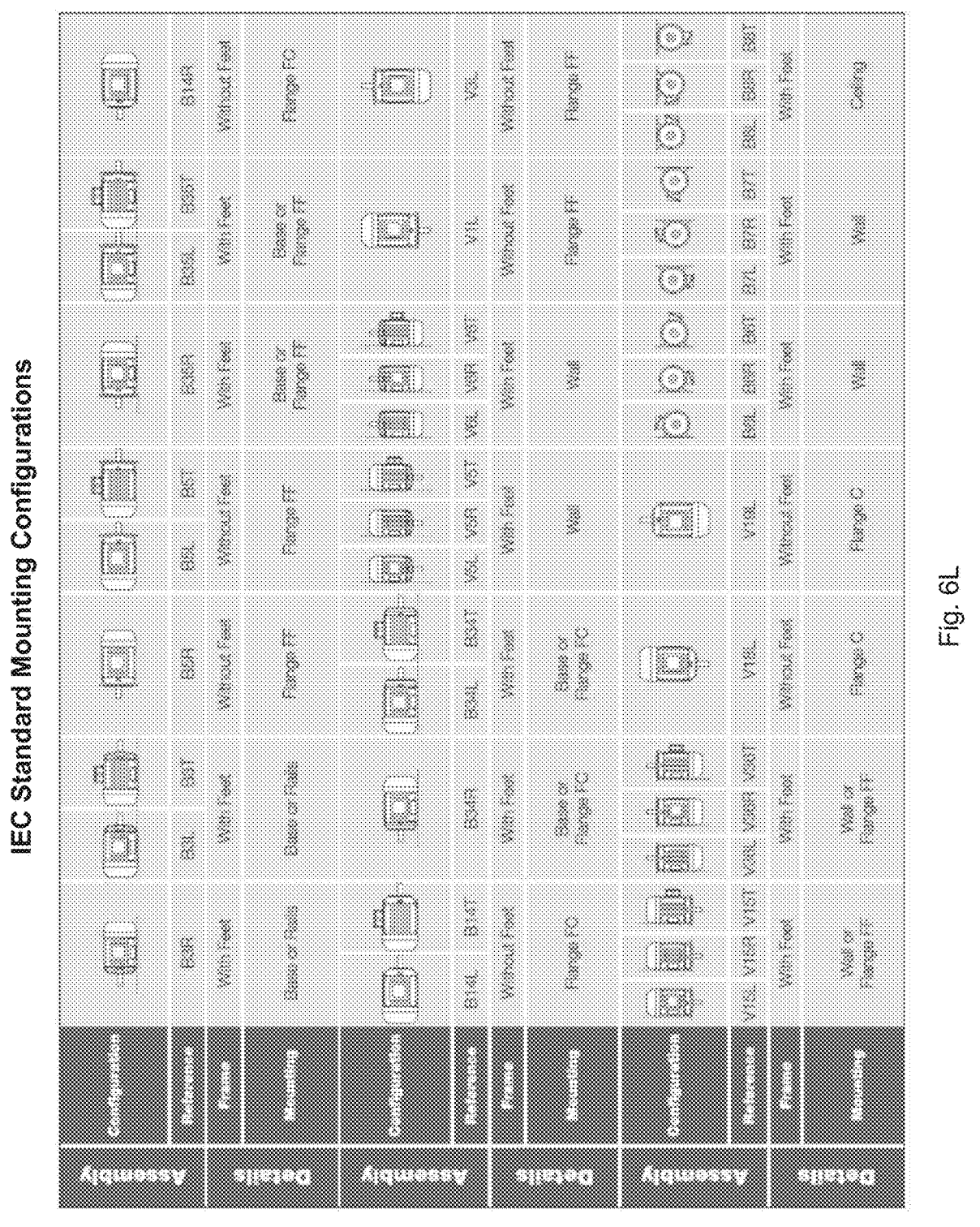

As mentioned earlier, the present invention improves upon prior reverse winding motor designs. Particular ratios and designs for the forward winding (12) as compared to the reverse winding (13) can be important among other parameters not then understood or evident. For example, the ratio of the turns of the forward winding (12) to the number of winding turns of the reverse winding (13) can be important. Ratios where the forward winding number of turns to reverse winding number of turns are at least about five, at least about four, at least about three, at least about two and a half, and even at least about or something greater than two can be important. Surprisingly, where in even the earlier reverse winding motor designs it was thought that the ratio should not exceed two, the present invention shows that advantages and even new attributes are now available when these ratios do, in fact, exceed the previously perceived limit. Designs can even be optimized for particular applications such as the winding ratio being selected for a motor's anticipated typical percentage load or otherwise. In this regard, operation at lower levels can require a lower forward to reverse winding ratio. Similarly, the forward to reverse winding ratio can be selected for an amount of current lag behind voltage that is exhibited by the initial network (9) or a typical initial electrical network. Forward to reverse winding ratios can also be selected to fit within current industry standards for established motor encasement sizes for particular rated horsepower. In this regard, as those skilled in the art should well understand, current industry association standards establish particular sizes for rated horsepower electrical motor encasements. The winding ratio can be chosen to fit within an existing encasement (6). Such standards are set and available from NEMA and IEC or the like and for reference, one set of such currently existing standards are attached as FIG. 6. As can be seen, such standards establish dimensions for the encasement (6). The difference between the forward winding (12) to the reverse winding (13) can be considered as presenting a differential turn winding. These differential turn windings can also be selected in designs to present a forward to reverse winding ratio selected to fit within the current industry association standard established size of motor encasement for the rated horsepower of the motor. As mentioned below, there can also be departure from these standards in order to optimize embodiments of the invention as well.

The forward winding (12) and the reverse winding (13) can also have different winding wire cross-sectional areas. The ratio of the forward winding to reverse winding, winding-wire cross sectional area, can be less than about two to about one half. This can afford design variability as persons of ordinary skill in the art would well recognize even if only by empirically measuring the amount of current experienced in the forward to reverse windings. In this regard, and as can be understood, the amount of current can be different in the forward versus the reverse winding. Wire cross-sectional areas can be chosen to accommodate the differences in current and also can be chosen to fit within the current industry association standards established sized motor encasement for the rated horsepower of the motor as well as for other considerations. The size of the winding wire, specifically, its cross-sectional area, can also be selected for the amount of current lag behind voltage for the initial network (9). Again, this can be determined empirically if necessary. Similarly, the winding wire cross-sectional area ratios can be selected for an anticipated typical load percentage for the additional electrical motor (10).

Beyond merely fitting within currently industry association standards established encasement sizes, one element where the present invention presents yet another potentially non-intuitive aspect is how the core (5) can be designed for the reverse winding induction motor. Although in traditional designs, it is typically perceived to be desirable to include as small a motor core as possible, embodiments of the present invention show that, contrary to most conventional ways of thinking, it can be advantageous to include an unusually large core. For example, the corrective device or induction motor can utilize a power over-rated core. For example, embodiments can include designs where the additional electrical motor (10) utilizes a core sized to what currently industry association standards establish as a higher than rated horsepower motor encasement (6). So, for example embodiments can utilize a larger encasement (6) so as to include a core (5) that is larger than what is normally expected to be needed for that horsepower rating. The core (5) can include both the rotor core and the stator core (3) as shown in FIG. 1. The core (5) can be a larger core sized to fit within the currently industry Association standards established sized motor encasement for that horsepower rated motor, or it can be sized to fit within a larger encasement (6). In embodiments, the larger core can be sized from larger than about 110% of a core for that particular horsepower to about 125% of that rated horsepower sized core for the encasement standard. The core (5) can also be even larger. It can be larger than 110% of core sized to fit within a currently industry association standards established encasement for that horsepower rated motor to about 200% of a core sized to fit within a currently industry association standards established for that horsepower rated motor. The core can also be sized for that motor's anticipated typical percentage load. At lower percentage loads, the core can be smaller even when and if still larger than a typical core. The core (5) can also be sized for an amount of current lag behind voltage for the initial electrical network (9). And again, when there is more lag that needs to be corrected, the core can be accordingly larger. Furthermore, with respect to winding ratios, winding wire cross-sectional area and core sizing parameters among other attributes can be chosen to be coordinated with the new encasement (6) size anticipated to be used. Encasements (6) can also be selected to allow desired designs to fit.

An aspect of utilization of a reverse winding (13) is the fact that the reverse winding (13) can be connected to a capacitor (shown only conceptually as 26) in series with each of the at least one reverse winding. For example, for a three phase system, there could be three reverse windings. Each can have a capacitor connected in series. This capacitance can be another peculiar design component that can be varied for embodiments according to the present invention. For example, the capacitor can have a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage. By setting the capacitor size, optimal operation can be achieved and again this can be varied within the parameters mentioned and can even be determined empirically. As to the 1.32 to 1.5 value in the capacitor sizing option, there can be situations where the 1.32 is optimal as well as situations where a value of likely not more than one and one half is optimal. Again, this feature presents different design parameters for reverse winding induction motors then had previously been understood and afford design optimization for particular applications, motors, or uses.

Interestingly, even the individual motor, apart from its use to correct the network, can exhibit improved characteristics as compared to what was understood for reverse winding motors. By employing a design having the previously thought of as undesirable value of a forward to reverse winding ratio of greater than two, embodiments of the present invention can offer individual motors with new attributes. For example, electrical motors, specifically induction motors capable of long-term operation can now be presented that exhibit parameters chosen from a leading current as compared to voltage at about 0% maximum load, a leading current as compared to voltage at about 25% maximum rated load, a leading current as compared to voltage had 50% maximum rated load, leading current as compared to voltage at about 75% of maximum rated load, and a leading current as compared to voltage at 100% of maximum rated load. This may be perceived as presenting an induction motor he is no longer treated as inductive. Embodiments can thus present designs that are remarkable and non-intuitive to the parochially trained. This characteristic is certainly remarkable and not just an extension of the previously disclosed reversed winding motor induction motor designs.

Furthermore, when the reverse winding (13) is included in the motor, the inclusion of a capacitor in series with the at least one reverse winding can be important. Again, this capacitor can be sized as having a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage. And this design can allow embodiments to provide induction motors that exhibit a lead angle of current as mentioned. The concept of presenting an induction motor that exhibits a leading current or a negative reactive power is remarkable. This can be presented in embodiments by providing a motor having the forward winding (12) to reverse winding (13) ratios mentioned, having the capacitor sizing as indicated, as well as having both the forward and reverse windings having an at least partially coinciding magnetic flux and presenting opposite induction windings. These designs can include a flux space that overlaps or coincides to at least some degree and by presenting windings that are opposite direction windings. Through these designs the induction motor can present an operationally stable induction motor that is not only work producing, but that is not prone to overheating at full load operation as well as one that is capable of long-term operation.

Furthermore, additional embodiments can be created so that desired attributes for motor starting can be achieved. While motor starting components do exist for traditional induction motors, the peculiar creation of designs for a reverse winding induction motor with a reverse winding (13)

affords significant new advantages. As shown in FIG. 1, The electrical motor (1) can be an induction motor that includes two elements that can be configured and used in conjunction with a reverse winding (13) to great advantage. Specifically, the electrical motor (1) can include a forward winding electrical reconfiguration switch (22) that is arranged to electrically reconfigure the forward winding (12). This is for the forward winding (12) as opposed to any reconfiguration of the reverse winding (13). This forward winding electrical reconfiguration switch (22) can even be operated through utilization of a start control (23) in a manner to achieve three different start acceleration conditions. First, the forward winding (12) can be configured in a first electrical configuration and a first acceleration condition can occur by the application of power so that the rotor (2) rotationally accelerates under a situation where the first electrical configuration exists. Switching can then occur of the forward winding electrical reconfiguration switch (22) to alter the electrical configuration of the forward winding (12) from the first electrical configuration to a second electrical configuration. In this second electrical configuration, a second acceleration condition can exist under which the rotor (2) further rotationally accelerates with that second electrical configuration. Regardless of however brief the second acceleration condition can exist for, a third Acceleration condition can also exist. With the inclusion of the reverse winding (13), this third rotational acceleration condition can be considered as occurring when the reverse winding (13) becomes active. Under this third acceleration rotational condition, both the forward winding (12) and the reverse winding (13) can be can be considered as acting with respect to the rotational acceleration of the rotor (2). Although it should be understood that both windings (4) can actually be acting at all times, this three condition start is one way to understand the effects that appear and should not be understood as exclusive of all winding actually causing some effect during the start operation. It is with this perspective in mind, that the above disclosure is provided.

In the start operation, as should be well appreciated, the forward winding (12) and the reverse winding (13) can be multiple ones such as windings in a three-phase configuration. In such an arrangement, the operation of the forward winding electrical reconfiguration switch (22) can select either an electrically reconfigurable star (or series or wye) configuration start winding or it can select an electrically reconfigurable delta (or parallel) configuration drive winding in one embodiment. Converse configurations are also possible. In this fashion, the forward winding (12) or more appropriately for a three-phase situation, configuration, the forward windings (12) can reconfigure from a star (or series) configuration to a delta (or parallel) configuration as the motor accelerates. Even where such reconfiguration is otherwise known, this reconfiguration in combination with one or more reverse windings (13) is not only new, but it offers significant new advantages. For example, the first and second acceleration conditions may be considered to represent conditions characterized largely by a star (or series) configuration forward winding effect and a delta configuration forward winding effect. Through energizing the reverse winding (13) by the reconfiguration of the forward winding (12) to the delta configuration (which would correspond to the delta configuration of the reverse winding in this example), main effects (considered as including but not limited to correction, opposing flux, generation, or the like) of the reverse winding (13) can act in a delayed manner to further enhance start parameters. Significantly, and as can be appreciated from the disclosure of FIG. 5, the most significantly enhanced start parameters can be a lower inrush current during the start event. As is well known, during start typically inrush current can reach a significantly high value. This can even dictate the need for wire sizing and the like in consideration of the windings (4). In order to limit inrush current, electrical reconfiguration of windings is used, however, effects are even larger for this embodiment when implemented in conjunction with reverse winding (13). The effect can even be greater than with a traditional current limiting start control. Not only can even the previously limited inrush current be more reduced, but, a need for overt and active current control can be avoided. Specifically, the use of this configuration with a reverse winding (13) in conjunction with a switch control of only the forward winding (12) can further reduce, and can significantly reduce, inrush current during a start.

In embodiments having the start control feature with a reverse winding (13), operation of the start control (23) and its activation of the forward winding electrical reconfiguration switch (22) can be sequenced so that the switching of the forward winding (12) from its first electrical configuration to its second electrical configuration can occur when the start is substantially complete. Additionally, the starter control (23) can include a switch timer (24) that activates the switching to the delta configuration at different times. These times can be chosen from times of about 10 seconds after initiating a start operation, 15 seconds, 20 seconds, and even about 25 seconds after initiating a start operation. Furthermore, even after the first winding (12) has been switched to a delta configuration, the reverse winding (13) can act to achieve the indicated in rush current limitation. This can occur by the reconfigured forward winding now acting in concert with the reverse winding, a feature not possible in traditional induction motors that lack the reverse winding (13).

Figure 5:
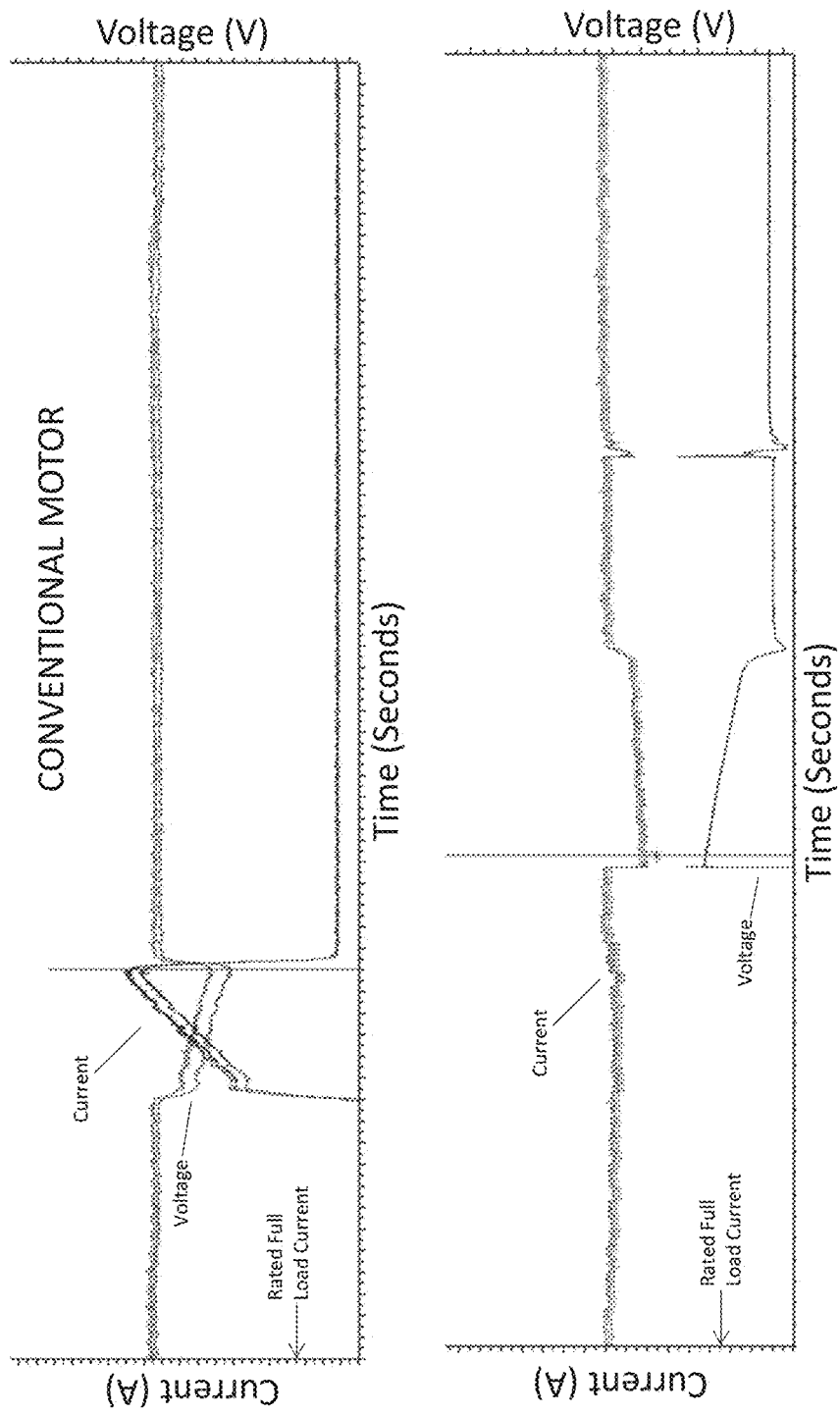
FIG. 5 is a plot of current and voltage during conventional and improved start operations.

As mentioned above, this entire progressive reverse winding induction motor start system and start operation can be achieved without a need for overt start current control as it is the various windings that achieve the desired control. In the manner that overt current limitation activities are not necessary, the start control can be considered a passive current establishment control and it can even be configured to present a secondary current limitation affect control where the current limitation is achieved as a secondary effect of the winding's effects. The secondary current limitation affect control can even cause and can act as a current decrease after initial transition control. Thus, is shown in FIG. 5 where it can be seen that at the initiation of start there is an initial sharper increase in current, and thereafter there can be a current decrease as shown. This is remarkable as in most instances start current is typically seen as a rising value as shown in the conventional motor start parameters shown in FIG. 5.

The current decrease after initial transition control can also be a low in rush current maintenance control that exists throughout the entire start operation. As shown in FIG. 5, it can be understood that through this peculiar control, embodiments can substantially maintain not greater than 1½ rated full load current throughout start (not including transient harmonic spikes). In fact, with optimal design, embodiments can passively establish a limited amount of inrush current that is maintained at substantially not more than rated full load current throughout start. This can even eliminate a need to design for the typically higher start current. Even when maintaining inrush current at substantially not more than an average operational current throughout the start the start operation can be comparable to conventional starts. Even with limited inrush current elements and controls embodiments can achieve operational motor speed in about the same amount of time. In part, this is because of at least partially a reverse winding effect. As mentioned above this offers the ability to substantially directly apply a source voltage. And, while there may be small effects from the operation of the start control (23) and/or the forward winding electrical reconfiguration switch (22), these are negligible and thus the source voltage is substantially directly applied and yet the current is limited.

Furthermore, embodiments can offer the passive switch controlled current ramp down affect as shown in FIG. 5. These can also offer a further reduced current as speed increases. Again, this is due at least in part to a reverse winding effect (even if by its absence). In such designs it may be important and helpful to include design criteria as mentioned above including having the forward winding (12) and reverse winding (13) having flux space that coincides to at least some degree. One can also include the aspect of having opposite direction windings, core sizing, differential term winding ratios, capacitor sizing, and winding wire cross-sectional area criteria as mentioned above. Furthermore, designing such aspects to fit within currently industry association standards established sized motor encasements for a larger sized motor and encasements than a typical rated horsepower can be helpful. Finally, it should be understood that this start control may be particularly applicable for three-phase designs where reconfiguration from star (or series) to delta (or parallel) configurations can be more appropriately implemented.

While the invention has been described in connection with some preferred embodiments, it is not intended to limit the scope of the invention to the particular form set forth, but on the contrary, it is intended to cover such alternatives, modifications, and equivalents as may be included within the spirit and scope of the invention as defined by the statements of inventions. Examples of alternative claims may include:

1. A method of establishing a network of efficiently powered electrical devices comprising the steps of:
   providing at least one electrical motor;
   electrically connecting to said at least one electrical motor or any other clause, wherein a connection to said at least one electrical motor is capable of exhibiting characteristics of an initial electrical network having an initial inductive power factor condition having an initial inductive component;
   providing at least one additional electrical motor;
   electrically connecting said at least one additional electrical motor with said initial electrical network or any other clause, wherein a connection of said at least one additional electrical motor with said initial electrical network is capable of exhibiting characteristics of a corrected inductive power factor condition; and
   correcting to at least some degree said initial inductive component by said at least one additional electrical motor.

2. A method of establishing a network of efficiently powered electrical devices as described in clause 1 or any other clause, wherein said step of providing at least one electrical motor comprises the step of providing at least one electrical induction motor.

3. A method of establishing a network of efficiently powered electrical devices as described in clause 1 or any other clause, wherein said step of correcting to at least some degree said initial inductive component by said at least one additional electrical motor comprises the step of lessening to at least some degree an amount of current lag behind voltage for said initial electrical network by said at least one additional electrical motor.

4. A method of establishing a network of efficiently powered electrical devices as described in clause 1 or any other clause, wherein said step of correcting to at least some degree said initial inductive component by said at least one additional electrical motor comprises the step of inductively correcting to at least some degree said initial inductive component by said at least one additional electrical motor.

5. A method of establishing a network of efficiently powered electrical devices as described in clause 1 or any other clause, wherein said step of correcting to at least some degree said initial inductive component by said at least one additional electrical motor comprises the step of variably correcting to at least some degree said initial inductive component without altering the character of an electrical correction component that contributes to varying the correction.

6. A method of establishing a network of efficiently powered electrical devices as described in clause 3 or any other clause, wherein said step of providing at least one additional electrical motor comprises the step of providing at least one electrical induction motor.

7. A method of establishing a network of efficiently powered electrical devices as described in clause 1 or any other clause, wherein said step of providing at least one additional electrical motor comprises the step of providing at least one forward and reverse winding electrical motor.

8. A method of establishing a network of efficiently powered electrical devices as described in clause 7 or any other clause, wherein said step of providing at least one forward and reverse winding electrical motor comprises the step of providing at least one forward winding establishing a forward winding magnetic flux space and providing at least one reverse winding establishing a reverse winding magnetic flux space, and or any other clause, wherein said forward reverse winding magnetic flux space and said reverse winding magnetic flux space coincide to at least some degree.

9. A method of establishing a network of efficiently powered electrical devices as described in clause 8 or any other clause, wherein said at least one forward winding and said at least one reverse winding comprise opposite direction windings.

10. A method of establishing a network of efficiently powered electrical devices as described in clause 1 or any other clause, wherein said step of correcting to at least some degree said initial inductive component by said at least one additional electrical motor comprises the step of directionally opposing a magnetic flux to at least some degree in said at least one additional electrical motor.

11. A method of establishing a network of efficiently powered electrical devices as described in clause 7 or any other clause, wherein said step of correcting to at least some degree said initial inductive component by said at least one additional electrical motor comprises the step of directionally opposing a magnetic flux to at least some degree in said at least one additional electrical motor.

12. A method of establishing a network of efficiently powered electrical devices as described in clause 1 or any other clause, wherein said step of correcting to at least some degree said initial inductive component by said at least one additional electrical motor comprises the step of accomplishing at least some mechanical work while accomplishing said step of correcting to at least some degree said initial inductive component by said at least one additional electrical motor.

13. A method of establishing a network of efficiently powered electrical devices as described in clause 1 or any other clause, wherein said step of correcting to at least some degree said initial inductive component by said at least one additional electrical motor comprises the step of utilizing a power over-rated core in said at least one additional electrical motor.

14. A method of establishing a network of efficiently powered electrical devices as described in clause 1 or any other clause, wherein said step of correcting to at least some degree said initial inductive component by said at least one additional electrical motor comprises the step of causing, by said at least one additional electrical motor, a reduction in a network lag angle of current as compared to voltage for a given load percentage condition with reference to said network without said at least one electrical motor.

15. A method of establishing a network of efficiently powered electrical devices as described in clause 12 or any other clause, wherein said step of correcting to at least some degree said initial inductive component by said at least one additional electrical motor comprises the step of causing, by said at least one additional electrical motor, a reduction in the power consumed by said at least one electrical network and said at least one additional electrical motor for at least one given load percentage condition above 50% as compared to the power that would have been consumed by said at least one electrical network without said at least one additional electrical motor at said same load percentage.

16. A method of establishing a network of efficiently powered electrical devices as described in clause 14 or any other clause, wherein said step of causing, by said at least one additional electrical motor, a reduction in the lead angle of current as compared to voltage comprises the step of causing, by said at least one additional electrical motor, a reduction in the lag angle of current as compared to voltage chosen from:
   causing a reduction of lag angle of current as compared to voltage by at least about 60 degrees by said at least one additional electrical motor at 0 percent of maximum rated load;
   causing a reduction of lag angle of current as compared to voltage by at least about 50 degrees by said at least one additional electrical motor at 25 percent of maximum rated load;
   causing a reduction of lag angle of current as compared to voltage by at least about 40 degrees by said at least one additional electrical motor at 50 percent of maximum rated load;
   causing a reduction of lag angle of current as compared to voltage by at least about 30 degrees by said at least one additional electrical motor at 75 percent of maximum rated load; and
   causing a reduction of lag angle of current as compared to voltage by at least about 20 degrees by said at least one additional electrical motor at 100 percent of maximum rated load.

17. A method of establishing a network of efficiently powered electrical devices as described in clause 15 or any other clause, wherein said step of causing, by said at least one additional electrical motor, a reduction in the power consumed by said at least one electrical network and said at least one additional electrical motor for at least one given load percentage condition above 50% as compared to the power that would have been consumed by said at least one electrical network without said at least one additional electrical motor at said same load percentage comprises the step of causing, by said at least one additional electrical motor, a reduction in the power consumed by said at least one electrical network and said at least one additional electrical motor for at least one given load percentage condition above 50% as compared to the power that would have been consumed by said at least one electrical network without said at least one additional electrical motor at said same load percentage chosen from:
   causing, by said at least one additional electrical motor, at least about a 1% percent reduction in the power consumed by said at least one electrical network and said at least one additional electrical motor as compared to the power that would have been consumed by said at least one electrical network without said at least one additional electrical motor at said same load percentage;
   causing, by said at least one additional electrical motor, at least about a 2% percent reduction in the power consumed by said at least one electrical network and said at least one additional electrical motor as compared to the power that would have been consumed by said at least one electrical network without said at least one additional electrical motor at said same load percentage;
   causing, by said at least one additional electrical motor, at least about a 4% percent reduction in the power consumed by said at least one electrical network and said at least one additional electrical motor as compared to the power that would have been consumed by said at least one electrical network without said at least one additional electrical motor at said same load percentage;
   causing, by said at least one additional electrical motor, at least about a 8% percent reduction in the power consumed by said at least one electrical network and said at least one additional electrical motor as compared to the power that would have been consumed by said at least one electrical network without said at least one additional electrical motor at said same load percentage;
   causing, by said at least one additional electrical motor, at least about a 10% percent reduction in the power consumed by said at least one electrical network and said at least one additional electrical motor as compared to the power that would have been consumed by said at least one electrical network without said at least one additional electrical motor at said same load percentage;
   causing, by said at least one additional electrical motor, at least about a 15% percent reduction in the power consumed by said at least one electrical network and said at least one additional electrical motor as compared to the power that would have been consumed by said at least one electrical network without said at least one additional electrical motor at said same load percentage;
   causing, by said at least one additional electrical motor, at least about a 20% percent reduction in the power consumed by said at least one electrical network and said at least one additional electrical motor as compared to the power that would have been consumed by said at least one electrical network without said at least one additional electrical motor at said same load percentage; and
   causing, by said at least one additional electrical motor, at least about a 25% percent reduction in the power consumed by said at least one electrical network and said at least one additional electrical motor as compared to the power that would have been consumed by said at least one electrical network without said at least one additional electrical motor at said same load percentage.

18. A method of establishing a network of efficiently powered electrical devices as described in clause 1 or any other clause, wherein said step of providing at least one additional electrical motor comprises the step of providing at least one torque producing electrical motor.

19. A method of establishing a network of efficiently powered electrical devices as described in clause 18 or any other clause, wherein said step of providing at least one additional electrical motor comprises the step of providing at least one additional electrical motor that is not prone to overheating in substantially full load operation.

20. A method of establishing a network of efficiently powered electrical devices as described in clause 19 or any other clause, wherein said step of providing at least one additional electrical motor comprises the step of providing at least one additional electrical motor capable of long term operation.

21. A method of establishing a network of efficiently powered electrical devices as described in clause 1 or any other clause, wherein said step of correcting to at least some degree said initial inductive component by said at least one additional electrical motor comprises the step of improving a power factor that would have been exhibited for said initial electrical network chosen from:
  improving a power factor that would have been exhibited for said initial electrical network by at least about 0.1 up to a maximum of about 1.00 by said at least one additional electrical motor;
  improving a power factor that would have been exhibited for said initial electrical network by at least about 0.2 up to a maximum of about 1.00 by said at least one additional electrical motor;
  improving a power factor that would have been exhibited for said initial electrical network by at least about 0.3 up to a maximum of about 1.00 by said at least one additional electrical motor;
  improving a power factor that would have been exhibited for said initial electrical network by at least about 0.4 up to a maximum of about 1.00 by said at least one additional electrical motor;
  improving a power factor that would have been exhibited for said initial electrical network by at least about 0.5 up to a maximum of about 1.00 by said at least one additional electrical motor; and
  improving a power factor that would have been exhibited for said initial electrical network by at least about 0.6 up to a maximum of about 1.00 by said at least one additional electrical motor.

22. A method of establishing a network of efficiently powered electrical devices as described in clause 9 or any other clause, wherein said at least one forward winding has at least about five times the number of winding turns of said at least one reverse winding.

23. A method of establishing a network of efficiently powered electrical devices as described in clause 9 or any other clause, wherein said at least one forward winding has at least about four times the number of winding turns of said at least one reverse winding.

24. A method of establishing a network of efficiently powered electrical devices as described in clause 9 or any other clause, wherein said at least one forward winding has at least about three times the number of winding turns of said at least one reverse winding.

25. A method of establishing a network of efficiently powered electrical devices as described in clause 9 or any other clause, wherein said at least one forward winding has at least about two and a half times the number of winding turns of said at least one reverse winding.

26. A method of establishing a network of efficiently powered electrical devices as described in clause 9 or any other clause, wherein said at least one forward winding has at least about two point one times the number of winding turns of said at least one reverse winding.

27. A method of establishing a network of efficiently powered electrical devices as described in clause 9 or any other clause, wherein said at least one forward winding has at least greater than two times the number of winding turns of said at least one reverse winding.

28. A method of establishing a network of efficiently powered electrical devices as described in clause 8 or any other clause, and further comprising the step of providing a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

29. A method of establishing a network of efficiently powered electrical devices as described in clause 9 or any other clause, and further comprising the step of providing a capacitor connected in series with each of said at least one reverse winding or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

30. A method of establishing a network of efficiently powered electrical devices as described in clause 9 or any other clause, and further comprising the step of providing a capacitor connected in series with each of said at least one reverse winding or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

31. A method of establishing a network of efficiently powered electrical devices as described in clause 1 or any other clause, wherein said step of providing at least one additional electrical motor comprises the step of providing at least one additional electrical motor utilizing a core sized to fit what currently industry association standards establish as a higher than rated horsepower motor.

32. A method of establishing a network of efficiently powered electrical devices as described in clause 31 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor.

33. A method of establishing a network of efficiently powered electrical devices as described in clause 31 or any other clause, and further comprising the step of encasing said motor in a currently industry association standards established sized motor encasement for that horsepower rated motor, and or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor fit within a currently industry association standards established sized motor encasement for that horsepower rated motor.

34. A method of establishing a network of efficiently powered electrical devices as described in clause 31 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

35. A method of establishing a network of efficiently powered electrical devices as described in clause 31 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

36. A method of establishing a network of efficiently powered electrical devices as described in clause 31 or any other clause, wherein said step of providing at least one additional electrical motor utilizing a core sized to fit what currently industry association standards establish as a higher than rated horsepower motor comprises the step of providing at least one additional electrical motor utilizing a core sized for that motor's anticipated typical percentage load.

37. A method of establishing a network of efficiently powered electrical devices as described in clause 31 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized for an amount of current lag behind voltage for said initial electrical network.

38. A method of establishing a network of efficiently powered electrical devices as described in clause 1 or any other clause, wherein said step of correcting to at least some degree said initial inductive component by said at least one additional electrical motor comprises the step of variably correcting to at least some degree said initial inductive component.

39. A method of establishing a network of efficiently powered electrical devices as described in clause 38 or any other clause, wherein said step of variably correcting to at least some degree said initial inductive component comprises the step of correcting to at least some degree said initial inductive component by said at least one additional electrical motor across substantially all work producing loads.

40. A method of establishing a network of efficiently powered electrical devices as described in clause 38 or any other clause, wherein said step of variably correcting to at least some degree said initial inductive component comprises the step of causing lag correction for loads chosen from:
  causing lag correction for at least about a 25 percent load;
  causing lag correction for at least about a 33 percent load;
  causing lag correction for at least about a 50 percent load;
  causing lag correction for at least about a 67 percent load;
  causing lag correction for at least about a 80 percent load;
  causing lag correction for at least about a 90 percent load;
  causing lag correction for at least about a 95 percent load;
  causing lag correction for at least about a 98 percent load; and
  causing lag correction for at least a 100 percent load.

41. A method of establishing a network of efficiently powered electrical devices as described in clause 38 or any other clause, wherein said step of variably correcting to at least some degree said initial inductive component comprises the step of causing current to lead voltage for up to a maximum load.

42. A method of establishing a network of efficiently powered electrical devices as described in clause 9 or any other clause, wherein said step of providing at least one additional electrical motor comprises the step of providing at least one additional electrical motor utilizing a forward winding to reverse winding ratio selected for that motor's anticipated typical percentage load for said at least one additional electrical motor.

43. A method of establishing a network of efficiently powered electrical devices as described in clause 9 or any other clause, wherein said step of providing at least one additional electrical motor comprises the step of providing at least one additional electrical motor utilizing a forward winding to reverse winding ratio selected for an amount of current lag behind voltage for said initial electrical network.

44. A method of establishing a network of efficiently powered electrical devices as described in clause 9 or any other clause, and further comprising the step of encasing said motor in a currently industry association standards established sized motor encasement for that rated horsepower, and or any other clause, wherein said step of providing at least one additional electrical motor comprises the step of providing at least one additional electrical motor utilizing a forward winding to reverse winding ratio selected to fit within said currently industry association standards established sized motor encasement for that rated horsepower.

45. A method of establishing a network of efficiently powered electrical devices as described in clause 9 or any other clause, wherein said step of providing at least one additional electrical motor comprises the step of providing at least one additional electrical motor utilizing a forward winding to reverse winding ratio of from at least about two point one times the number of winding turns of said at least one reverse winding to about three times the number of winding turns of said at least one reverse winding.

46. A method of establishing a network of efficiently powered electrical devices as described in clause 9 or any other clause, wherein said step of providing at least one additional electrical motor comprises the step of providing at least one additional electrical motor utilizing a forward winding to reverse winding wire cross sectional area ratio selected for an anticipated typical percentage load for said at least one additional electrical motor.

47. A method of establishing a network of efficiently powered electrical devices as described in clause 9 or any other clause, wherein said step of providing at least one additional electrical motor comprises the step of providing at least one additional electrical motor utilizing a forward winding to reverse winding wire cross sectional area ratio selected for an amount of current lag behind voltage for said initial electrical network.

48. A method of establishing a network of efficiently powered electrical devices as described in clause 9 or any other clause, and further comprising the step of encasing said motor in a currently industry association standards established sized motor encasement for the horsepower rating of said motor, and or any other clause, wherein said step of providing at least one additional electrical motor comprises the step of providing at least one additional electrical motor utilizing a forward winding to reverse winding wire cross sectional area ratio sized to fit within said currently industry association standards established sized motor encasement for the horsepower rating of said motor.

49. A method of establishing a network of efficiently powered electrical devices as described in clause 1 or any other clause, wherein said step of providing at least one additional electrical motor comprises the step of providing at least one additional electrical motor utilizing a forward winding to reverse winding wire cross sectional area ratio of less than about two to about one half.

50. A network of efficiently powered electrical devices comprising:
   at least one electrical motor;
   an electrical connection to said at least one electrical motor or any other clause, wherein said electrical connection to said at least one electrical motor establishes an initial electrical network capable of exhibiting an initial inductive power factor condition having an initial inductive component;
   at least one additional electrical motor; and
   an electrical connection that joins said at least one additional electrical motor to said initial electrical network in a manner capable of exhibiting characteristics of a corrected inductive power factor condition as a result of said at least one additional electrical motor;
   or any other clause, wherein said corrected inductive power factor condition corrects to at least some degree said initial inductive component by said at least one additional electrical motor.

51. A network of efficiently powered electrical devices as described in clause 50 or any other clause, wherein said at least one additional electrical motor comprises at least one electrical induction motor.

52. A network of efficiently powered electrical devices as described in clause 50 or any other clause, wherein said corrected inductive power factor condition comprises a corrected inductive power factor condition that lessens to at least some degree an amount of current lag behind voltage for said initial electrical network by said at least one additional electrical motor.

53. A network of efficiently powered electrical devices as described in clause 50 or any other clause, wherein said initial inductive component comprises an initial inductive component that is inductively corrected to at least some degree said by said at least one additional electrical motor.

54. A network of efficiently powered electrical devices as described in clause 50 or any other clause, wherein said at least one additional electrical motor comprises a variable power factor correction motor that variably acts without altering a character of an electrical correction component that contributes to said correction.

55. A network of efficiently powered electrical devices as described in clause 52 or any other clause, wherein said at least one additional electrical motor comprises at least one electrical induction motor.

56. A network of efficiently powered electrical devices as described in clause 50 or any other clause, wherein said at least one additional electrical motor comprises at least one forward winding and at least one reverse winding.

57. A network of efficiently powered electrical devices as described in clause 56 or any other clause, wherein said at least one forward winding comprises at least one forward winding establishing a forward winding magnetic flux space, and or any other clause, wherein said at least one reverse winding comprises at least one reverse winding establishing a reverse winding magnetic flux space, and or any other clause, wherein said forward reverse winding magnetic flux space and said reverse winding magnetic flux space coincide to at least some degree.

58. A network of efficiently powered electrical devices as described in clause 57 or any other clause, wherein at least one forward winding and said at least one reverse winding comprises opposite direction windings.

59. A network of efficiently powered electrical devices as described in clause 50 or any other clause, wherein said at least one additional electrical motor comprises magnetic flux direction opposed electrical motor.

60. A network of efficiently powered electrical devices as described in clause 50 or any other clause, wherein said at least one additional electrical motor is configured to accomplish at least some mechanical work while acting to correct to at least some degree said initial inductive component.

61. A network of efficiently powered electrical devices as described in clause 50 or any other clause, wherein said at least one additional electrical motor comprises a power over-rated core.

62. A network of efficiently powered electrical devices as described in clause MCa1 or any other clause, wherein at least one additional electrical motor comprises a network current lag reduction electrical motor for at least one given load percentage condition with reference to said network without said at least one additional electrical motor.

63. A network of efficiently powered electrical devices as described in clause 60 or any other clause, wherein at least one additional electrical motor comprises a network power consumption reduction electrical motor that reduces, for at least one given load percentage condition above 50%, network power consumption of said electrical network with said network power consumption reduction electrical motor as compared to said network power consumption without said at least one additional electrical motor at said same load percentage.

64. A network of efficiently powered electrical devices as described in clause 62 or any other clause, wherein said network power consumption reduction electrical motor comprises a network power consumption reduction electrical motor chosen from:
an at least about 80 degrees of network current lag reduction at 0 percent of maximum rated load electrical motor;
an at least about 60 degrees of network current lag reduction at 15 percent of maximum rated load electrical motor;
an at least about 50 degrees of network current lag reduction at 25 percent of maximum rated load electrical motor;
an at least about 40 degrees of network current lag reduction at 50 percent of maximum rated load electrical motor;
an at least about 30 degrees of network current lag reduction at 75 percent of maximum rated load electrical motor; and
an at least about 20 degrees of network current lag reduction at 100 percent of maximum rated load electrical motor.

65. A network of efficiently powered electrical devices as described in clause 63 or any other clause, wherein said network power consumption reduction electrical motor comprises a network power consumption reduction electrical motor chosen from:
an at least about 1% network power consumption reduction electrical motor;
an at least about 2% network power consumption reduction electrical motor;
an at least about 4% network power consumption reduction electrical motor;
an at least about 8% network power consumption reduction electrical motor;
an at least about 10% network power consumption reduction electrical motor;
an at least about 15% network power consumption reduction electrical motor;
an at least about 20% network power consumption reduction electrical motor; and
an at least about 25% network power consumption reduction electrical motor.

66. A network of efficiently powered electrical devices as described in clause 50 or any other clause, wherein at least one additional electrical motor comprises at least one torque producing electrical motor.

67. A network of efficiently powered electrical devices as described in clause 66 or any other clause, wherein at least one torque producing electrical motor comprises at least one not prone to overheating at full load operation electrical motor.

68. A network of efficiently powered electrical devices as described in clause 67 or any other clause, or any other clause, wherein at least one not prone to overheating at full load operation electrical motor comprises at least one not prone to overheating at full load operation electrical motor capable of long-term operation.

69. A network of efficiently powered electrical devices as described in clause 50 or any other clause, wherein at least one additional electrical motor comprises a network power factor correction electrical motor that corrects, for at least one load percentage condition, said initial inductive power factor condition.

70. A network of efficiently powered electrical devices as described in clause 69 or any other clause, wherein network power factor correction electrical motor comprises a network power factor correction electrical motor that accomplishes a correction chosen from:
an at least about 0.1 up to a maximum of about 1.00 correction;
an at least about 0.2 up to a maximum of about 1.00 correction;
an at least about 0.3 up to a maximum of about 1.00 correction;
an at least about 0.4 up to a maximum of about 1.00 correction;
an at least about 0.5 up to a maximum of about 1.00 correction; and
an at least about 0.6 up to a maximum of about 1.00 correction.

71. A network of efficiently powered electrical devices as described in clause 58 or any other clause, wherein at least one forward winding comprises at least about five times the number of said reverse windings.

72. A network of efficiently powered electrical devices as described in clause 58 or any other clause, wherein at least one forward winding comprises at least about four times the number of said reverse windings.

73. A network of efficiently powered electrical devices as described in clause 58 or any other clause, wherein at least one forward winding comprises at least about three times the number of said reverse windings.

74. A network of efficiently powered electrical devices as described in clause 58 or any other clause, wherein at least one forward winding comprises at least about two and a half times the number of said reverse windings.

75. A network of efficiently powered electrical devices as described in clause 58 or any other clause, wherein at least one forward winding comprises at least about two point one times the number of said reverse windings.

76. A network of efficiently powered electrical devices as described in clause 58 or any other clause, wherein at least one forward winding comprises at least greater than two times the number of said reverse windings.

77. A network of efficiently powered electrical devices as described in clause 57 or any other clause, and further comprising a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

78. A network of efficiently powered electrical devices as described in clause 57 or any other clause, and further comprising a capacitor connected in series with each of said at least one reverse winding or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

79. A network of efficiently powered electrical devices as described in clause 57 or any other clause, and further comprising a capacitor connected in series with each of said at least one reverse winding or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

80. A network of efficiently powered electrical devices as described in clause 50 or any other clause, wherein said at least one additional electrical motor comprises a core sized to fit what currently industry association standards establish as a higher than rated horsepower motor.

81. A network of efficiently powered electrical devices as described in clause 80 or any other clause, and further comprising a currently industry association standards established sized motor encasement for that horsepower rated motor, and or any other clause, wherein said core sized to fit what currently industry association standards establish as a higher than rated horsepower motor comprises a core sized to fit what currently industry association standards establish as a higher than rated horsepower motor fit within a currently industry association standards established sized motor encasement for that horsepower rated motor.

82. A network of efficiently powered electrical devices as described in clause 80 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

83. A network of efficiently powered electrical devices as described in clause 80 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

84. A network of efficiently powered electrical devices as described in clause 80 or any other clause, wherein said core sized to fit what currently industry association standards establish as a higher than rated horsepower motor comprises a core sized for that motor's anticipated typical percentage load.

85. A network of efficiently powered electrical devices as described in clause 80 or any other clause, wherein said core sized to fit what currently industry association standards establish as a higher than rated horsepower motor comprises a core sized to fit what currently industry association standards establish as a higher than rated horsepower motor sized for an amount of current lag behind voltage for said initial electrical network.

86. A network of efficiently powered electrical devices as described in clause 50 or any other clause, wherein said at least one additional electrical motor comprises at least one variable correction electrical motor.

87. A network of efficiently powered electrical devices as described in clause 86 or any other clause, wherein said at least one variable correction electrical motor comprises at least one variable correction electrical motor that acts across substantially all work producing loads.

88. A network of efficiently powered electrical devices as described in clause 86 or any other clause, wherein said at least one variable correction electrical motor comprises at least one variable correction electrical motor chosen from:
  at least one variable correction electrical motor that achieves correction at at least about 25 percent load;
  at least one variable correction electrical motor that achieves correction at at least about 33 percent load;
  at least one variable correction electrical motor that achieves correction at at least about 50 percent load;
  at least one variable correction electrical motor that achieves correction at at least about 67 percent load;
  at least one variable correction electrical motor that achieves correction at at least about 80 percent load;
  at least one variable correction electrical motor that achieves correction at at least about 90 percent load;
  at least one variable correction electrical motor that achieves correction at at least about 95 percent load;
  at least one variable correction electrical motor that achieves correction at at least about 98 percent load; and
  at least one variable correction electrical motor that achieves correction at at least about 100 percent load.

89. A network of efficiently powered electrical devices as described in clause 86 or any other clause, wherein said at least one variable correction electrical motor comprises at least one current leads voltage for up to a maximum load correction electrical motor.

90. A network of efficiently powered electrical devices as described in clause 58 or any other clause, wherein at least one forward winding and said at least one reverse winding have a forward winding to reverse winding ratio, and or any other clause, wherein said forward winding to reverse winding ratio comprises a forward winding to reverse winding ratio selected for that motor's anticipated typical percentage load.

91. A network of efficiently powered electrical devices as described in clause 58 or any other clause, wherein at least one forward winding and said at least one reverse winding have a forward winding to reverse winding ratio, and or any other clause, wherein said forward winding to reverse winding ratio comprises a forward winding to reverse winding ratio selected for an amount of current lag behind voltage for said initial electrical network.

92. A network of efficiently powered electrical devices as described in clause 58 or any other clause, and further comprising a currently industry association standards established sized motor encasement for that rated horsepower, and or any other clause, wherein said at least one forward winding and said at least one reverse winding have a forward winding to reverse winding ratio, and or any other clause, wherein said forward winding to reverse winding ratio comprises a forward winding to reverse winding ratio selected to fit within said currently industry association standards established sized motor encasement for that rated horsepower.

93. A network of efficiently powered electrical devices as described in clause 58 or any other clause, wherein at least one forward winding and said at least one reverse winding have a forward winding to reverse winding ratio, and or any other clause, wherein said forward winding to reverse winding ratio comprises a forward winding to reverse winding ratio of from at least about two point one to about three.

94. A network of efficiently powered electrical devices as described in clause 58 or any other clause, wherein said at least one additional electrical motor comprises a forward winding to reverse winding wire cross sectional area ratio selected for an anticipated typical percentage load for said at least one additional electrical motor.

95. A network of efficiently powered electrical devices as described in clause 58 or any other clause, wherein at least one forward winding and said at least one reverse winding have a forward winding wire to reverse winding wire cross sectional area ratio, and or any other clause, wherein said forward winding wire to reverse winding wire cross sectional area ratio comprises a forward winding wire to reverse winding wire cross sectional area ratio selected for an amount of current lag behind voltage for said initial electrical network.

96. A network of efficiently powered electrical devices as described in clause 58 or any other clause, and further comprising a currently industry association standards established sized motor encasement for the horsepower rating of said motor, and or any other clause, wherein said at least one additional electrical motor comprises a forward winding to reverse winding wire cross sectional area ratio sized to fit within said currently industry association standards established sized motor encasement for the horsepower rating of said motor.

97. A network of efficiently powered electrical devices as described in clause 50 or any other clause, wherein at least one additional electrical motor comprises at least one additional electrical motor utilizing a forward winding to reverse winding wire cross sectional area ratio of less than about two to about one half.

98. A method of establishing a network of efficiently powered electrical devices comprising the steps of:
  providing at least one predominantly inductive electrical device;
  electrically connecting to said at least one predominantly inductive electrical device or any other clause, wherein a connection to said at least one predominantly inductive electrical device is capable of exhibiting characteristics of an initial electrical network having an initial inductive power factor condition having an initial inductive component;
  electrically connecting at least one work producing electrically corrective device with said initial electrical network or any other clause, wherein a connection of said at least one work producing electrically corrective device with said initial electrical network is capable of exhibiting characteristics of corrected inductive power factor condition; and
  correcting to at least some degree said initial inductive component by said at least one work producing electrically corrective device.

99. A method of establishing a network of efficiently powered electrical devices as described in clause 98 or any other clause, wherein said step of correcting to at least some degree said initial inductive component by said at least one work producing electrically corrective device comprises the step of accomplishing at least some mechanical work while accomplishing said step of correcting to at least some degree said initial inductive component by said at least one work producing electrically corrective device.

100. A method of establishing a network of efficiently powered electrical devices as described in clause 98 or any other clause, wherein said step of correcting to at least some degree said initial inductive component by said at least one work producing electrically corrective device comprises the step of lessening to at least some degree an amount of current lag behind voltage for said initial electrical network by said at least one work producing electrically corrective device.

101. A method of establishing a network of efficiently powered electrical devices as described in clause 98 or any other clause, wherein said step of correcting to at least some degree said initial inductive component by said at least one work producing electrically corrective device comprises the step of inductively correcting to at least some degree said initial inductive component by said at least one work producing electrically corrective device.

102. A method of establishing a network of efficiently powered electrical devices as described in clause 98 or any other clause, wherein said step of correcting to at least some degree said initial inductive component by said at least one work producing electrically corrective device comprises the step of variably correcting to at least some degree said initial inductive component without altering the character of an electrical correction component that contributes to varying the correction.

103. A method of establishing a network of efficiently powered electrical devices as described in clause 100 or any other clause, wherein said step of electrically connecting at least one work producing electrically corrective device with said initial electrical network or any other clause, wherein a connection of said at least one work producing electrically corrective device with said initial electrical network is capable of exhibiting characteristics of corrected inductive power factor condition comprises the step of electrically connecting at least one electrical induction motor.

104. A method of establishing a network of efficiently powered electrical devices as described in clause 98 or any other clause, wherein said step of electrically connecting at least one work producing electrically corrective device with said initial electrical network or any other clause, wherein a connection of said at least one work producing electrically corrective device with said initial electrical network is capable of exhibiting characteristics of corrected inductive power factor condition comprises the step of electrically connecting at least one forward and reverse winding electrical motor.

105. A method of establishing a network of efficiently powered electrical devices as described in clause 98 or any other clause, wherein said step of electrically connecting at least one work producing electrically corrective device with said initial electrical network or any other clause, wherein a connection of said at least one work producing electrically corrective device with said initial electrical network is capable of exhibiting characteristics of corrected inductive power factor condition comprises the step of electrically connecting at least one opposite direction winding electrical motor.

106. A method of establishing a network of efficiently powered electrical devices as described in clause 98 or any other clause, wherein said step of correcting to at least some degree said initial inductive component by said at least one work producing electrically corrective device comprises the step of causing, by said at least one work producing electrically corrective device, a reduction in a network lag angle of current as compared to voltage for at least one load percentage condition with reference to said network without said at least one electrical motor for said same percentage load condition.

107. A method of establishing a network of efficiently powered electrical devices as described in clause 99 or any other clause, wherein said step of correcting to at least some degree said initial inductive component by said at least one work producing electrically corrective device comprises the step of causing, by said at least one work producing electrically corrective device, a reduction in the power consumed by said at least one electrical network and said at least one work producing electrically corrective device for at least one given load percentage condition above 50% as compared to the power that would have been consumed by said at least one electrical network without said at least one work producing electrically corrective device at said same load percentage.

108. A method of establishing a network of efficiently powered electrical devices as described in clause 98 or any other clause, wherein said step of electrically connecting at least one work producing electrically corrective device with said initial electrical network or any other clause, wherein a connection of said at least one work producing electrically corrective device with said initial electrical network is capable of exhibiting characteristics of corrected inductive power factor condition comprises the step of electrically connecting at least one torque producing electrical motor.

109. A method of establishing a network of efficiently powered electrical devices as described in clause 108 or any other clause, wherein said step of electrically connecting at least one work producing electrically corrective device with said initial electrical network or any other clause, wherein a connection of said at least one work producing electrically corrective device with said initial electrical network is capable of exhibiting characteristics of corrected inductive power factor condition comprises the step of electrically connecting at least one additional electrical motor that is not prone to overheating in substantially full load operation.

110. A method of establishing a network of efficiently powered electrical devices as described in clause 109 or any other clause, wherein said step of electrically connecting at least one work producing electrically corrective device with said initial electrical network or any other clause, wherein a connection of said at least one work producing electrically corrective device with said initial electrical network is capable of exhibiting characteristics of corrected inductive power factor condition comprises the step of electrically connecting at least one additional electrical motor capable of long term operation.

111. A method of establishing a network of efficiently powered electrical devices as described in clause 98 or any other clause, wherein said step of correcting to at least some degree said initial inductive component by said at least one work producing electrically corrective device comprises the step of improving a power factor that would have been exhibited for said initial electrical network chosen from:

improving a power factor that would have been exhibited for said initial electrical network by at least about 0.1 up to a maximum of about 1.00 by said at least one additional electrical motor;

improving a power factor that would have been exhibited for said initial electrical network by at least about 0.2 up to a maximum of about 1.00 by said at least one additional electrical motor;

improving a power factor that would have been exhibited for said initial electrical network by at least about 0.3 up to a maximum of about 1.00 by said at least one additional electrical motor;

improving a power factor that would have been exhibited for said initial electrical network by at least about 0.4 up to a maximum of about 1.00 by said at least one additional electrical motor;

improving a power factor that would have been exhibited for said initial electrical network by at least about 0.5 up to a maximum of about 1.00 by said at least one additional electrical motor; and improving a power factor that would have been exhibited for said initial electrical network by at least about 0.6 up to a maximum of about 1.00 by said at least one additional electrical motor.

112. A method of establishing a network of efficiently powered electrical devices as described in clause 104 or any other clause, wherein said at least one forward and reverse winding electrical motor has at least one forward winding and at least one reverse winding, and or any other clause, wherein said at least one forward winding has at least about five times the number of winding turns of said at least one reverse winding.

113. A method of establishing a network of efficiently powered electrical devices as described in clause 104 or any other clause, wherein said at least one forward and reverse winding electrical motor has at least one forward winding and at least one reverse winding, and or any other clause, wherein said at least one forward winding has at least about four times the number of winding turns of said at least one reverse winding.

114. A method of establishing a network of efficiently powered electrical devices as described in clause 104 or any other clause, wherein said at least one forward and reverse winding electrical motor has at least one forward winding and at least one reverse winding, and or any other clause, wherein said at least one forward winding has at least about three times the number of winding turns of said at least one reverse winding.

115. A method of establishing a network of efficiently powered electrical devices as described in clause 104 or any other clause, wherein said at least one forward and reverse winding electrical motor has at least one forward winding and at least one reverse winding, and or any other clause, wherein said at least one forward winding has at least about two and a half times the number of winding turns of said at least one reverse winding.

116. A method of establishing a network of efficiently powered electrical devices as described in clause 104 or any other clause, wherein said at least one forward and reverse winding electrical motor has at least one forward winding and at least one reverse winding, and or any other clause, wherein said at least one forward winding has at least about two point one times the number of winding turns of said at least one reverse winding.

117. A method of establishing a network of efficiently powered electrical devices as described in clause 104 or any other clause, wherein said at least one forward and reverse winding electrical motor has at least one forward winding and at least one reverse winding, and or any other clause, wherein said at least one forward winding has at least greater than two times the number of winding turns of said at least one reverse winding.

118. A method of establishing a network of efficiently powered electrical devices as described in clause 104 or any other clause, and further comprising the step of providing a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

119. A method of establishing a network of efficiently powered electrical devices as described in clause 98 or any other clause, wherein said step of providing at least one additional electrical motor comprises the step of providing at least one additional electrical motor utilizing a core sized to fit what currently industry association standards establish as a higher than rated horsepower motor.

120. A method of establishing a network of efficiently powered electrical devices as described in clause 119 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor.

121. A method of establishing a network of efficiently powered electrical devices as described in clause 119 or any other clause, and further comprising the step of encasing said motor in a currently industry association standards established sized motor encasement for that horsepower rated motor, and or any other clause, wherein said step of providing at least one additional electrical motor utilizing a core sized to fit what currently industry association standards establish as a higher than rated horsepower motor comprises the
step of providing at least one additional electrical motor utilizing a core sized to fit what currently industry association standards establish as a higher than rated horsepower motor fit within a currently industry association standards established sized motor encasement for that horsepower rated motor.

122. A method of establishing a network of efficiently powered electrical devices as described in clause 119 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

123. A method of establishing a network of efficiently powered electrical devices as described in clause 119 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

124. A method of establishing a network of efficiently powered electrical devices as described in clause 119 or any other clause, wherein said step of providing at least one additional electrical motor utilizing a core sized to fit what currently industry association standards establish as a higher than rated horsepower motor comprises the step of providing at least one additional electrical motor utilizing a core sized for that motor's anticipated typical percentage load.

125. A method of establishing a network of efficiently powered electrical devices as described in clause 119 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized for an amount of current lag behind voltage for said initial electrical network.

126. A method of establishing a network of efficiently powered electrical devices as described in clause 98 or any other clause, wherein said step of correcting to at least some degree said initial inductive component by said at least one additional electrical motor comprises the step of variably correcting to at least some degree said initial inductive component.

127. A method of establishing a network of efficiently powered electrical devices as described in clause 126 or any other clause, wherein said step of variably correcting to at least some degree said initial inductive component comprises the step of correcting to at least some degree said initial inductive component by said at least one additional electrical motor across substantially all work producing loads.

128. A network of efficiently powered electrical devices comprising:
    at least one predominantly inductive electrical device;
    an electrical connection to said at least one predominantly inductive electrical device or any other clause, wherein said electrical connection to said at least one predominantly inductive electrical device establishes an initial electrical network capable of exhibiting an initial inductive power factor condition having an initial inductive component;
    at least one work producing electrically corrective device; and
    an electrical connection that joins said at least one work producing electrically corrective device to said initial electrical network in a manner capable of exhibiting characteristics of a corrected inductive power factor condition as a result of said at least one work producing electrically corrective device;

or any other clause, wherein said corrected inductive power factor condition corrects to at least some degree said initial inductive component by said at least one work producing electrically corrective device.

129. A network of efficiently powered electrical devices as described in clause 128 or any other clause, wherein said at least one additional electrical motor is configured to accomplish at least some mechanical work while acting to correct to at least some degree said initial inductive component.

130. A network of efficiently powered electrical devices as described in clause 128 or any other clause, wherein said corrected inductive power factor condition comprises a corrected inductive power factor condition that lessens to at least some degree an amount of current lag behind voltage for said initial electrical network by said at least one additional electrical motor.

131. A network of efficiently powered electrical devices as described in clause 128 or any other clause, wherein said initial inductive component comprises an initial inductive component that is inductively corrected to at least some degree said by said at least one additional electrical motor.

132. A network of efficiently powered electrical devices as described in clause 128 or any other clause, wherein said at least one additional electrical motor comprises a variable power factor correction motor that variably acts without altering a character of an electrical correction component that contributes to said correction.

133. A network of efficiently powered electrical devices as described in clause 130 or any other clause, wherein said at least one additional electrical motor comprises at least one electrical induction motor.

134. A network of efficiently powered electrical devices as described in clause 128 or any other clause, wherein said at least one additional electrical motor comprises at least one forward winding and at least one reverse winding.

135. A network of efficiently powered electrical devices as described in clause 134 or any other clause, wherein at least one forward winding and said at least one reverse winding comprises opposite direction windings.

136. A network of efficiently powered electrical devices as described in clause 128 or any other clause, wherein at least one additional electrical motor comprises a network current lag reduction electrical motor for at least one given load percentage condition with reference to said network without said at least one additional electrical motor.

137. A network of efficiently powered electrical devices as described in clause 136 or any other clause, wherein said at least one additional electrical motor comprises a network power consumption reduction electrical motor that reduces, for at least one given load percentage condition above 50%, network power consumption of said electrical network with said network power consumption reduction electrical motor as compared to said network power consumption without said at least one additional electrical motor at said same load percentage.

138. A network of efficiently powered electrical devices as described in clause 128 or any other clause, wherein at least one additional electrical motor comprises at least one torque producing electrical motor.

139. A network of efficiently powered electrical devices as described in clause 138 or any other clause, wherein at least one torque producing electrical motor comprises at least one not prone to overheating at full load operation electrical motor.

140. A network of efficiently powered electrical devices as described in clause 139 or any other clause, wherein at least one not prone to overheating at full load operation electrical motor comprises at least one not prone to overheating at full load operation electrical motor capable of long-term operation.

141. A network of efficiently powered electrical devices as described in clause 128 or any other clause, wherein said at least one work producing electrically corrective device comprises a network power factor correction work producing device that corrects, for at least one load percentage condition, said initial inductive power factor condition.

142. A network of efficiently powered electrical devices as described in clause 141 or any other clause, wherein said network power factor correction work producing device comprises a network power factor correction work producing device that accomplishes a correction chosen from:

an at least about 0.1 up to a maximum of about 1.00 correction;
an at least about 0.2 up to a maximum of about 1.00 correction;
an at least about 0.3 up to a maximum of about 1.00 correction;
an at least about 0.4 up to a maximum of about 1.00 correction;
an at least about 0.5 up to a maximum of about 1.00 correction; and
an at least about 0.6 up to a maximum of about 1.00 correction.

143. A network of efficiently powered electrical devices as described in clause 135 or any other clause, wherein at least one forward winding comprises at least about five times the number of said reverse windings.

144. A network of efficiently powered electrical devices as described in clause 135 or any other clause, wherein at least one forward winding comprises at least about four times the number of said reverse windings.

145. A network of efficiently powered electrical devices as described in clause 135 or any other clause, wherein at least one forward winding comprises at least about three times the number of said reverse windings.

146. A network of efficiently powered electrical devices as described in clause 135 or any other clause, wherein at least one forward winding comprises at least about two and a half times the number of said reverse windings.

147. A network of efficiently powered electrical devices as described in clause 135 or any other clause, wherein at least one forward winding comprises at least about two point one times the number of said reverse windings.

148. A network of efficiently powered electrical devices as described in clause 135 or any other clause, wherein at least one forward winding comprises at least greater than two times the number of said reverse windings.

149. A network of efficiently powered electrical devices as described in clause 134 or any other clause, and further comprising a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

150. A network of efficiently powered electrical devices as described in clause 128 or any other clause, wherein at least one additional electrical motor comprises a core sized to fit what currently industry association standards establish as a higher than rated horsepower motor.

151. A network of efficiently powered electrical devices as described in clause 150 or any other clause, and further comprising a currently industry association standards established sized motor encasement for that horsepower rated motor, and or any other clause, wherein said core sized to fit what currently industry association standards establish as a higher than rated horsepower motor comprises a core sized to fit what currently industry association standards establish as a higher than rated horsepower motor fit within a currently industry association standards established sized motor encasement for that horsepower rated motor.

152. A network of efficiently powered electrical devices as described in clause 150 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

153. A network of efficiently powered electrical devices as described in clause 150 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

154. A network of efficiently powered electrical devices as described in clause 150 or any other clause, wherein said core sized to fit what currently industry association standards establish as a higher than rated horsepower motor comprises a core sized for that motor's anticipated typical percentage load.

155. A network of efficiently powered electrical devices as described in clause 150 or any other clause, wherein said core sized to fit what currently industry association standards establish as a higher than rated horsepower motor comprises a core sized to fit what currently industry association standards establish as a higher than rated horsepower motor sized for an amount of current lag behind voltage for said initial electrical network.

156. A network of efficiently powered electrical devices as described in clause 128 or any other clause, wherein said at least one additional electrical motor comprises at least one variable correction electrical motor.

157. A network of efficiently powered electrical devices as described in clause 156 or any other clause, wherein said at least one variable correction electrical motor comprises at least one variable correction electrical motor that acts across substantially all work producing loads.

158. A method of establishing a network of efficiently powered electrical devices comprising the steps of:
providing at least one first type predominately inductive electrical device;
providing at least one forward plus reverse winding induction motor having a forward to reverse winding ratio of greater than two;
electrically combining said at least one first type predominately inductive electrical device and said at least one at least one forward plus reverse winding induction motor to form enhanced power factor electrical network;
or any other clause, wherein said enhanced power factor electrical network exhibits an enhanced power factor value that has a less inductive component than without said at least one second type predominately inductive electrical device for said otherwise same enhanced power factor electrical network.

159. A method of establishing a network of efficiently powered electrical devices as described in clause 158 or any other clause, wherein said step of correcting to at least some degree said initial inductive component by said at least one additional electrical motor comprises the step of lessening to at least some degree an amount of current lag behind voltage for said initial electrical network by said at least one additional electrical motor.

160. A method of establishing a network of efficiently powered electrical devices as described in clause 158 or any other clause, wherein said enhanced power factor value comprises a power factor closer to one than without said at least one second type predominately inductive electrical device for said otherwise same enhanced power factor electrical network.

161. A method of establishing a network of efficiently powered electrical devices as described in clause 158 or any other clause, wherein said step of correcting to at least some degree said initial inductive component by said at least one additional electrical motor comprises the step of inductively correcting to at least some degree said initial inductive component by said at least one additional electrical motor.

162. A method of establishing a network of efficiently powered electrical devices as described in clause 158 or any other clause, wherein said step of correcting to at least some degree said initial inductive component by said at least one additional electrical motor comprises the step of variably correcting to at least some degree said initial inductive component without altering the character of an electrical correction component that contributes to varying the correction.

163. A method of establishing a network of efficiently powered electrical devices as described in clause 159 or any other clause, wherein said step of providing at least one additional electrical motor comprises the step of providing at least one electrical induction motor.

164. A method of establishing a network of efficiently powered electrical devices as described in clause 158 or any other clause, wherein said step of providing at least one forward plus reverse winding induction motor comprises the step of providing at least one forward winding establishing a forward winding adjacent space and providing at least one reverse winding establishing a reverse winding magnetic flux space, and or any other clause, wherein said forward reverse winding magnetic flux space and said reverse winding magnetic flux space coincide to at least some degree.

165. A method of establishing a network of efficiently powered electrical devices as described in clause 164 or any other clause, wherein said at least one forward winding and said at least one reverse winding comprise opposite direction windings.

166. A method of establishing a network of efficiently powered electrical devices as described in clause 158 or any other clause, wherein said step of correcting to at least some degree said initial inductive component by said at least one additional electrical motor comprises the step of directionally opposing a magnetic flux to at least some degree in said at least one additional electrical motor 167. A method of establishing a network of efficiently powered electrical devices as described in clause 158 or any other clause, wherein said step of correcting to at least some degree said initial inductive component by said at least one additional electrical motor comprises the step of accomplishing at least some mechanical work while accomplishing said step of correcting to at least some degree said initial inductive component by said at least one additional electrical motor.

168. A method of establishing a network of efficiently powered electrical devices as described in clause 158 or any other clause, wherein said step of correcting to at least some degree said initial inductive component by said at least one additional electrical motor comprises the step of utilizing a power over-rated core in said at least one additional electrical motor.

169. A method of establishing a network of efficiently powered electrical devices as described in clause 158 or any other clause, wherein said step of correcting to at least some degree said initial inductive component by said at least one additional electrical motor comprises the step of causing, by said at least one additional electrical motor, a reduction in a network lag angle of current as compared to voltage for a given load percentage condition with reference to said network without said at least one electrical motor.

170. A method of establishing a network of efficiently powered electrical devices as described in clause 167 or any other clause, wherein said step of correcting to at least some degree said initial inductive component by said at least one additional electrical motor comprises the step of causing, by said at least one additional electrical motor, a reduction in the power consumed by said at least one electrical network and said at least one additional electrical motor for at least one given load percentage condition above 50% as compared to the power that would have been consumed by said at least one electrical network without said at least one additional electrical motor at said same load percentage.

171. A method of establishing a network of efficiently powered electrical devices as described in clause 169 or any other clause, wherein said step of causing, by said at least one additional electrical motor, a reduction in the lead angle of current as compared to voltage comprises the step of causing, by said at least one additional electrical motor, a reduction in the lag angle of current as compared to voltage chosen from:
  causing a reduction of lag angle of current as compared to voltage by at least about 60 degrees by said at least one additional electrical motor at 0 percent of maximum rated load;
  causing a reduction of lag angle of current as compared to voltage by at least about 50 degrees by said at least one additional electrical motor at 25 percent of maximum rated load;
  causing a reduction of lag angle of current as compared to voltage by at least about 40 degrees by said at least one additional electrical motor at 50 percent of maximum rated load;
  causing a reduction of lag angle of current as compared to voltage by at least about 30 degrees by said at least one additional electrical motor at 75 percent of maximum rated load; and
  causing a reduction of lag angle of current as compared to voltage by at least about 20 degrees by said at least one additional electrical motor at 100 percent of maximum rated load.

172. A method of establishing a network of efficiently powered electrical devices as described in clause 170 or any other clause, wherein said step of
causing, by said at least one additional electrical motor, a reduction in the power consumed by said at least one electrical network and said at least one additional electrical motor for at least one given load percentage condition above 50% as compared to the power that would have been consumed by said at least one electrical network without said at least one additional electrical motor at said same load percentage comprises the step of causing, by said at least one additional electrical motor, a reduction in the power consumed by said at least one electrical network and said at least one additional electrical motor for at least one given load percentage condition above 50% as compared to the power that would have been consumed by said at least one electrical network without said at least one additional electrical motor at said same load percentage chosen from:
  causing, by said at least one additional electrical motor, at least about a 1% percent reduction in the power consumed by said at least one electrical network and said at least one additional electrical motor as compared to the power that would have been consumed by said at least one electrical network without said at least one additional electrical motor at said same load percentage;
  causing, by said at least one additional electrical motor, at least about a 2% percent reduction in the power consumed by said at least one electrical network and said at least one additional electrical motor as compared to the power that would have been consumed by said at least one electrical network without said at least one additional electrical motor at said same load percentage;
  causing, by said at least one additional electrical motor, at least about a 4% percent reduction in the power consumed by said at least one electrical network and said at least one additional electrical motor as compared to the power that would have been consumed by said at least one electrical network without said at least one additional electrical motor at said same load percentage;
  causing, by said at least one additional electrical motor, at least about a 8% percent reduction in the power consumed by said at least one electrical network and said at least one additional electrical motor as compared to the power that would have been consumed by said at least one electrical network without said at least one additional electrical motor at said same load percentage;
  causing, by said at least one additional electrical motor, at least about a 10% percent reduction in the power consumed by said at least one electrical network and said at least one additional electrical motor as compared to the power that would have been consumed by said at least one electrical network without said at least one additional electrical motor at said same load percentage;
  causing, by said at least one additional electrical motor, at least about a 15% percent reduction in the power consumed by said at least one electrical network and said at least one additional electrical motor as compared to the power that would have been consumed by said at least one electrical network without said at least one additional electrical motor at said same load percentage;
causing, by said at least one additional electrical motor, at least about a 20% percent reduction in the power consumed by said at least one electrical network and said at least one additional electrical motor as compared to the power that would have been consumed by said at least one electrical network without said at least one additional electrical motor at said same load percentage; and
causing, by said at least one additional electrical motor, at least about a 25% percent reduction in the power consumed by said at least one electrical network and said at least one additional electrical motor as compared to the power that would have been consumed by said at least one electrical network without said at least one additional electrical motor at said same load percentage.

173. A method of establishing a network of efficiently powered electrical devices as described in clause 158 or any other clause, wherein said step of correcting to at least some degree said initial inductive component by said at least one additional electrical motor comprises the step of improving a power factor that would have been exhibited for said initial electrical network chosen from:
improving a power factor that would have been exhibited for said initial electrical network by at least about 0.1 up to a maximum of about 1.00 by said at least one additional electrical motor;
improving a power factor that would have been exhibited for said initial electrical network by at least about 0.2 up to a maximum of about 1.00 by said at least one additional electrical motor;
improving a power factor that would have been exhibited for said initial electrical network by at least about 0.3 up to a maximum of about 1.00 by said at least one additional electrical motor;
improving a power factor that would have been exhibited for said initial electrical network by at least about 0.4 up to a maximum of about 1.00 by said at least one additional electrical motor;
improving a power factor that would have been exhibited for said initial electrical network by at least about 0.5 up to a maximum of about 1.00 by said at least one additional electrical motor; and
improving a power factor that would have been exhibited for said initial electrical network by at least about 0.6 up to a maximum of about 1.00 by said at least one additional electrical motor.

174. A method of establishing a network of efficiently powered electrical devices as described in clause 165 or any other clause, wherein said at least one forward winding has at least about five times the number of winding turns of said at least one reverse winding.

175. A method of establishing a network of efficiently powered electrical devices as described in clause 165 or any other clause, wherein said at least one forward winding has at least about four times the number of winding turns of said at least one reverse winding.

176. A method of establishing a network of efficiently powered electrical devices as described in clause 165 or any other clause, wherein said at least one forward winding has at least about three times the number of winding turns of said at least one reverse winding.

177. A method of establishing a network of efficiently powered electrical devices as described in clause 165 or any other clause, wherein said at least one forward winding has at least about two and a half times the number of winding turns of said at least one reverse winding.

178. A method of establishing a network of efficiently powered electrical devices as described in clause 165 or any other clause, wherein said at least one forward winding has at least about two point one times the number of winding turns of said at least one reverse winding.

179. A method of establishing a network of efficiently powered electrical devices as described in clause 165 or any other clause, wherein said at least one forward winding has at least greater than two times the number of winding turns of said at least one reverse winding.

180. A method of establishing a network of efficiently powered electrical devices as described in clause 164 or any other clause, and further comprising the step of providing a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

181. A method of establishing a network of efficiently powered electrical devices as described in clause 158 or any other clause, wherein said step of providing at least one additional electrical motor comprises the step of providing at least one additional electrical motor utilizing a core sized to fit what currently industry association standards establish as a higher than rated horsepower motor.

182. A method of establishing a network of efficiently powered electrical devices as described in clause 181 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor.

183. A method of establishing a network of efficiently powered electrical devices as described in clause 181 or any other clause, and further comprising the step of encasing said motor in a currently industry association standards established sized motor encasement for that horsepower rated motor, and or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor fit within a currently industry association standards established sized motor encasement for that horsepower rated motor.

184. A method of establishing a network of efficiently powered electrical devices as described in clause 181 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

185. A method of establishing a network of efficiently powered electrical devices as described in clause 181 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

186. A method of establishing a network of efficiently powered electrical devices as described in clause 181 or any other clause, wherein said step of providing at least one additional electrical motor utilizing a core sized to fit what currently industry association standards establish as a higher than rated horsepower motor comprises the step of providing at least one additional electrical motor utilizing a core sized for that motor's anticipated typical percentage load.

187. A method of establishing a network of efficiently powered electrical devices as described in clause 181 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized for an amount of current lag behind voltage for said initial electrical network.

188. A method of establishing a network of efficiently powered electrical devices as described in clause 158 or any other clause, wherein said step of correcting to at least some degree said initial inductive component by said at least one additional electrical motor comprises the step of variably correcting to at least some degree said initial inductive component.

189. A method of establishing a network of efficiently powered electrical devices as described in clause 188 or any other clause, wherein said step of variably correcting to at least some degree said initial inductive component comprises the step of correcting to at least some degree said initial inductive component by said at least one additional electrical motor across substantially all work producing loads.

190. A network of efficiently powered inductive electrical devices comprising:
   at least one first type predominately inductive electrical device;
   at least one forward plus reverse winding induction motor having a forward to reverse winding ratio of greater than two; and
   an electrical connection combining said at least one first type predominately inductive electrical device and said at least one forward plus reverse winding induction motor to form an enhanced power factor electrical network that has a less inductive component than without said at least forward plus reverse winding predominately inductive electrical device for said otherwise same enhanced power factor electrical network.

191. A network of efficiently powered electrical devices as described in clause 190 or any other clause, wherein said corrected inductive power factor condition comprises a corrected inductive power factor condition that lessens to at least some degree an amount of current lag behind voltage for said initial electrical network by said at least one additional electrical motor.

192. A network of efficiently powered electrical devices as described in clause 190 or any other clause, wherein said enhanced power factor value comprises a power factor closer to one than without said at least one second type predominately inductive electrical device for said otherwise same enhanced power factor electrical network.

193. A network of efficiently powered electrical devices as described in clause 190 or any other clause, wherein said initial inductive component comprises an initial inductive component that is inductively corrected to at least some degree said by said at least one additional electrical motor.

194. A network of efficiently powered electrical devices as described in clause 190 or any other clause, wherein said at least one additional electrical motor comprises a variable power factor correction motor that variably acts without altering a character of an electrical correction component that contributes to said correction.

195. A network of efficiently powered electrical devices as described in clause 191 or any other clause, wherein said at least one additional electrical motor comprises at least one electrical induction motor.

196. A network of efficiently powered electrical devices as described in clause 190 or any other clause, wherein said at least one additional electrical motor comprises at least one forward winding and at least one reverse winding.

197. A network of efficiently powered electrical devices as described in clause 196 or any other clause, wherein said at least one forward winding comprises at least one forward winding establishing a forward winding magnetic flux space, and or any other clause, wherein said at least one reverse winding comprises at least one reverse winding establishing a reverse winding magnetic flux space, and or any other clause, wherein said forward reverse winding magnetic flux space and said reverse winding magnetic flux space coincide to at least some degree.

198. A network of efficiently powered electrical devices as described in clause 197 or any other clause, wherein at least one forward winding and said at least one reverse winding comprises opposite direction windings.

199. A network of efficiently powered electrical devices as described in clause 190 or any other clause, wherein said at least one additional electrical motor comprises magnetic flux direction opposed electrical motor.

200. A network of efficiently powered electrical devices as described in clause 190 or any other clause, wherein said at least one additional electrical motor is configured to accomplish at least some mechanical work while acting to correct to at least some degree said initial inductive component.

201. A network of efficiently powered electrical devices as described in clause 190 or any other clause, wherein said at least one additional electrical motor comprises a power over-rated core.

202. A network of efficiently powered electrical devices as described in clause 190 or any other clause, wherein said at least one additional electrical motor comprises a network current lag reduction electrical motor for at least one given load percentage condition with reference to said network without said at least one additional electrical motor.

203. A network of efficiently powered electrical devices as described in clause 200 or any other clause, wherein said at least one additional electrical motor comprises a network power consumption reduction electrical motor that reduces, for at least one given load percentage condition above 50%, network power consumption of said electrical network with said network power consumption reduction electrical motor as compared to said network power consumption without said at least one additional electrical motor at said same load percentage.

204. A network of efficiently powered electrical devices as described in clause 202 or any other clause, wherein said network power consumption reduction electrical motor comprises a network power consumption reduction electrical motor chosen from:
- an at least about 80 degrees of network current lag reduction at 0 percent of maximum rated load electrical motor;
- an at least about 60 degrees of network current lag reduction at 15 percent of maximum rated load electrical motor;
- an at least about 50 degrees of network current lag reduction at 25 percent of maximum rated load electrical motor;
- an at least about 40 degrees of network current lag reduction at 50 percent of maximum rated load electrical motor;
- an at least about 30 degrees of network current lag reduction at 75 percent of maximum rated load electrical motor; and
- an at least about 20 degrees of network current lag reduction at 100 percent of maximum rated load electrical motor.

205. A network of efficiently powered electrical devices as described in clause 203 or any other clause, wherein said network power consumption reduction electrical motor comprises a network power consumption reduction electrical motor chosen from:
- an at least about 1% network power consumption reduction electrical motor;
- an at least about 2% network power consumption reduction electrical motor;
- an at least about 4% network power consumption reduction electrical motor;
- an at least about 8% network power consumption reduction electrical motor;
- an at least about 10% network power consumption reduction electrical motor;
- an at least about 15% network power consumption reduction electrical motor;
- an at least about 20% network power consumption reduction electrical motor; and
- an at least about 25% network power consumption reduction electrical motor.

206. A network of efficiently powered electrical devices as described in clause RNa1 or any other clause, wherein said at least one forward plus reverse winding induction motor comprises a network power factor correction electrical motor that corrects, for at least one load percentage condition, a power factor condition that said enhanced power factor electrical network would have without said at least one forward plus reverse winding induction motor.

207. A network of efficiently powered electrical devices as described in clause RNa41.1 or any other clause, wherein network power factor correction electrical motor comprises a network power factor correction electrical motor that accomplishes a power factor correction chosen from:
- an at least about 0.1 up to a maximum of about 1.00 correction;
- an at least about 0.2 up to a maximum of about 1.00 correction;
- an at least about 0.3 up to a maximum of about 1.00 correction;
- an at least about 0.4 up to a maximum of about 1.00 correction;
- an at least about 0.5 up to a maximum of about 1.00 correction; and
- an at least about 0.6 up to a maximum of about 1.00 correction.

208. A network of efficiently powered electrical devices as described in clause 198 or any other clause, wherein at least one forward winding comprises at least about five times the number of said reverse windings.

209. A network of efficiently powered electrical devices as described in clause 198 or any other clause, wherein at least one forward winding comprises at least about four times the number of said reverse windings.

210. A network of efficiently powered electrical devices as described in clause 198 or any other clause, wherein at least one forward winding comprises at least about three times the number of said reverse windings.

211. A network of efficiently powered electrical devices as described in clause 198 or any other clause, wherein at least one forward winding comprises at least about two and a half times the number of said reverse windings.

212. A network of efficiently powered electrical devices as described in clause 198 or any other clause, wherein at least one forward winding comprises at least about two point one times the number of said reverse windings.

213. A network of efficiently powered electrical devices as described in clause 198 or any other clause, wherein at least one forward winding comprises at least greater than two times the number of said reverse windings.

214. A network of efficiently powered electrical devices as described in clause 197 or any other clause, and further comprising a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

215. A network of efficiently powered electrical devices as described in clause 190 or any other clause, wherein at least one additional electrical motor comprises a core sized to fit what currently industry association standards establish as a higher than rated horsepower motor.

216. A network of efficiently powered electrical devices as described in clause 190 or any other clause, and further comprising a currently industry association standards established sized motor encasement for that horsepower rated motor, and or any other clause, wherein said core sized to fit what currently industry association standards establish as a higher than rated horsepower motor comprises a core sized to fit what currently industry association standards establish as a higher than rated horsepower motor fit within a currently industry association standards established sized motor encasement for that horsepower rated motor.

217. A network of efficiently powered electrical devices as described in clause 190 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

218. A network of efficiently powered electrical devices as described in clause 190 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

219. A network of efficiently powered electrical devices as described in clause 215 or any other clause, wherein said core sized to fit what currently industry association standards establish as a higher than rated horsepower motor comprises a core sized for that motor's anticipated typical percentage load.

220. A network of efficiently powered electrical devices as described in clause 215 or any other clause, wherein said core sized to fit what currently industry association standards establish as a higher than rated horsepower motor comprises a core sized to fit what currently industry association standards establish as a higher than rated horsepower motor sized for an amount of current lag behind voltage for said initial electrical network.

221. A network of efficiently powered electrical devices as described in clause 190 or any other clause, wherein said at least one additional electrical motor comprises at least one variable correction electrical motor.

222. A network of efficiently powered electrical devices as described in clause 221 or any other clause, wherein said at least one variable correction electrical motor comprises at least one variable correction electrical motor that acts across substantially all work producing loads.

223. A method of providing a progressive start reverse winding induction motor system comprising the steps of:
provided a reverse winding electrical motor comprising:
a rotor, at least one forward winding, and at least one reverse winding;
providing a forward winding electrical reconfiguration switch to which said at least one forward winding is responsive capable of altering an electrical configuration of said at least one forward winding from a first electrical configuration to a second electrical configuration;
providing a source of electrical power to said forward and reverse winding electrical motor;
start controlling said reverse winding electrical motor;
firstly accelerating said rotor with action of said at least one forward winding in said first electrical configuration;
switching said forward winding electrical reconfiguration switch to cause at least one forward winding to achieve a second electrical configuration;
secondly accelerating said rotor with action of said at least one forward winding in said second electrical configuration; and
thirdly accelerating said rotor with action of both said at least one forward winding and said at least one reverse winding.

224. A method of providing a progressive start reverse winding induction motor system as described in clause 223 or any other clause, wherein said step of providing a reverse winding electrical motor comprises the step of providing a reverse winding electrical motor comprising multiple windings in a three phase configuration.

225. A method of providing a progressive start reverse winding induction motor system as described in clause 223 or any other clause, wherein said step of switching said forward winding electrical reconfiguration switch to cause at least one forward winding to achieve a second electrical configuration comprises the step of differentially switching between an electrically reconfigurable star configuration start winding and an electrically reconfigurable delta configuration drive winding.

226. A method of providing a progressive start reverse winding induction motor system as described in clause 225 or any other clause, wherein said step of switching said forward winding electrical reconfiguration switch to cause at least one forward winding to achieve a second electrical configuration comprises the step of switching said at least one forward winding to a delta configuration when a start is substantially complete.

227. A method of providing a progressive start reverse winding induction motor system as described in clause 226 or any other clause, wherein said step of switching said at least one forward winding to a delta configuration when a start is substantially complete comprises the step of timing activation of said step of switching.

228. A method of providing a progressive start reverse winding induction motor system as described in clause 227 or any other clause, wherein said step of timing activation of said step of switching comprises the step of timing activation of said step of switching chosen from:
timing activation of said step of switching to said delta configuration about ten seconds after initiating a start operation;
timing activation of said step of switching to said delta configuration about fifteen seconds after initiating a start operation;
timing activation of said step of switching to said delta configuration about twenty seconds after initiating a start operation; and
timing activation of said step of switching to said delta configuration about twenty-five seconds after initiating a start operation.

229. A method of providing a progressive start reverse winding induction motor system as described in clause 227 or any other clause, wherein said step of timing activation of said step of switching comprises the step of timing activation of said step of switching to said delta configuration about twenty seconds after initiating a start operation.

230. A method of providing a progressive start reverse winding induction motor system as described in clause 223 or any other clause, wherein said step of start controlling said reverse winding electrical motor comprises the step of passively establishing a limited amount of inrush current.

231. A method of providing a progressive start reverse winding induction motor system as described in clause 230 or any other clause, wherein said step of passively establishing a limited amount of inrush current comprises the step of secondarily establishing an inrush current limitation.

232. A method of providing a progressive start reverse winding induction motor system as described in clause 231 or any other clause, wherein said step of secondarily establishing an inrush current limitation comprises the step of decreasing current after an initial current transition.

233. A method of providing a progressive start reverse winding induction motor system as described in clause 232 or any other clause, wherein said step of step of decreasing current after an initial current transition comprises the step of substantially maintaining a low inrush current throughout a start of said reverse winding induction motor.

234. A method of providing a progressive start reverse winding induction motor system as described in clause 233 or any other clause, wherein said step of substantially maintaining a low inrush current throughout start comprises the step of substantially maintaining not greater than one and one-half rated full load current throughout start.

235. A method of providing a progressive start reverse winding induction motor system as described in clause 230 or any other clause, wherein said step of passively establishing a limited amount of inrush current comprises the step of maintaining substantially not more than rated full load current throughout start.

236. A method of providing a progressive start reverse winding induction motor system as described in clause 230 or any other clause, wherein said step of passively establishing a limited amount of inrush current comprises the step of utilizing at least partially a reverse winding effect.

237. A method of providing a progressive start reverse winding induction motor system as described in clause 235 or any other clause, wherein said step of maintaining substantially not more than rated full load current throughout start comprises the step of utilizing at least partially a reverse winding effect.

238. A method of providing a progressive start reverse winding induction motor system as described in clause 223 or any other clause, wherein said step of start controlling said reverse winding electrical motor comprises the step of substantially directly applying a source voltage.

239. A method of providing a progressive start reverse winding induction motor system as described in clause 223 or any other clause, wherein said step of start controlling said reverse winding electrical motor comprises the step of passive switch controlling a current ramp down.

240. A method of providing a progressive start reverse winding induction motor system as described in clause 239 or any other clause, wherein said step of passive switch controlling a current ramp down comprises the step of passive switch controlling a further reduced current as speed increases.

241. A method of providing a progressive start reverse winding induction motor system as described in clause 239 or any other clause, wherein said step of passive switch controlling a current ramp down comprises the step of utilizing at least partially a reverse winding effect.

242. A method of providing a progressive start reverse winding induction motor system as described in clause 223 or any other clause, wherein said step of providing at least one forward winding establishes a forward winding magnetic flux space and providing at least one reverse winding establishes a reverse winding magnetic flux space, and or any other clause, wherein said forward reverse winding magnetic flux space and said reverse winding magnetic flux space coincide to at least some degree.

243. A method of providing a progressive start reverse winding induction motor system as described in clause 242 or any other clause, wherein said at least one forward winding and said at least one reverse winding comprise opposite direction windings.

244. A method of providing a progressive start reverse winding induction motor system as described in clause 242 or any other clause, wherein said step of providing a reverse winding electrical motor comprising: a rotor, at least one forward winding, and at least one reverse winding comprises the step of providing a core sized to fit what currently industry association standards establish as a higher than rated horsepower motor.

245. A method of providing a progressive start reverse winding induction motor system as described in clause 243 or any other clause, wherein said opposite direction windings comprises differential turn windings.

246. A method of providing a progressive start reverse winding induction motor system as described in clause 245 or any other clause, wherein said differential turn windings comprise at least one forward winding having at least about five times the number of winding turns of said at least one reverse winding.

247. A method of providing a progressive start reverse winding induction motor system as described in clause 245 or any other clause, wherein said differential turn windings comprise at least one forward winding having at least about four times the number of winding turns of said at least one reverse winding.

248. A method of providing a progressive start reverse winding induction motor system as described in clause 245 or any other clause, wherein said differential turn windings comprise at least one forward winding having at least about three times the number of winding turns of said at least one reverse winding.

249. A method of providing a progressive start reverse winding induction motor system as described in clause 245 or any other clause, wherein said differential turn windings comprise at least one forward winding having at least about two and a half times the number of winding turns of said at least one reverse winding.

250. A method of providing a progressive start reverse winding induction motor system as described in clause 245 or any other clause, wherein said differential turn windings comprise at least one forward winding having at least about two point one times the number of winding turns of said at least one reverse winding.

251. A method of providing a progressive start reverse winding induction motor system as described in clause 245 or any other clause, wherein said differential turn windings comprise at least one forward winding having at least greater than two times the number of winding turns of said at least one reverse winding.

252. A method of providing a progressive start reverse winding induction motor system as described in clause 245 or any other clause, and further comprising the step of providing a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

253. A method of providing a progressive start reverse winding induction motor system as described in clause 245 or any other clause, and further comprising the step of providing a capacitor connected in series with each of said at least one reverse winding or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

254. A method of providing a progressive start reverse winding induction motor system as described in clause 245 or any other clause, and further comprising the step of providing a capacitor connected in series with each of said at least one reverse winding or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

255. A method of providing a progressive start reverse winding induction motor system as described in clause 223 or any other clause, wherein said step of providing a reverse winding electrical motor comprising: a rotor, at least one forward winding, and at least one reverse winding comprises the step of providing at least one delta configuration reverse winding.

256. A method of providing a progressive start reverse winding induction motor system as described in clause 224 or any other clause, wherein said step of providing a reverse winding electrical motor comprising: a rotor, at least one forward winding, and at least one reverse winding comprises the step of providing multiple windings in a three phase delta configuration.

257. A method of providing a progressive start reverse winding induction motor system as described in clause 245 or any other clause, wherein said differential turn windings comprise differential turn windings utilizing a forward winding to reverse winding ratio selected to fit within a currently industry association standards established sized motor encasement for the rated horsepower of said motor.

258. A method of providing a progressive start reverse winding induction motor system as described in clause 245 or any other clause, wherein said differential turn windings comprise differential turn windings utilizing a forward winding to reverse winding wire cross sectional area ratio sized to fit within a currently industry association standards established sized motor encasement for the rated horsepower of said motor.

259. A method of providing a progressive start reverse winding induction motor system as described in clause 223 or any other clause, wherein said steps of providing a reverse winding electrical motor comprising: a rotor, at least one forward winding, and at least one reverse winding comprises the step of utilizing a forward winding to reverse winding wire cross sectional area ratio of less than about two to about one half.

260. A progressive start reverse winding induction motor system comprising:
   a reverse winding electrical motor comprising: a rotor, at least one forward winding, at least one reverse winding, a core, and a motor encasement;
   a forward winding electrical reconfiguration switch to which said at least one forward winding is responsive capable of altering an electrical configuration of said at least one forward winding from a first electrical configuration to a second electrical configuration;
   a source of electrical power for said reverse winding electrical motor;
   a start control to which power for said reverse winding electrical motor is responsive;
   a first acceleration condition under which said rotor rotationally accelerates with action of said at least one forward winding in said first electrical configuration;
   a second acceleration condition under which said rotor rotationally accelerates with action of said at least one forward winding in said second electrical configuration; and
   a third acceleration condition under which said rotor rotationally accelerates with action of both said at least one forward winding and said at least one reverse winding.

261. A progressive start reverse winding induction motor system as described in clause 260 or any other clause, wherein said at least one forward winding comprises multiple windings in a three phase configuration.

262. A progressive start reverse winding induction motor system as described in clause 260 or any other clause, wherein said forward winding electrical reconfiguration switch selects either an electrically reconfigurable star configuration start winding, or an electrically reconfigurable delta configuration drive winding.

263. A progressive start reverse winding induction motor system as described in clause 262 or any other clause, wherein said forward winding electrical reconfiguration switch comprises a forward winding electrical reconfiguration switch that selects said electrically reconfigurable delta configuration drive winding when a start is substantially complete.

264. A progressive start reverse winding induction motor system as described in clause 263 or any other clause, wherein said start control comprises a switch timer.

265. A progressive start reverse winding induction motor system as described in clause 264 or any other clause, wherein said switch timer comprises a switch timer chosen from:
   a switch timer that activates switching to a delta configuration about ten seconds after initiating a start operation;
   a switch timer that activates switching to a delta configuration about fifteen seconds after initiating a start operation;
   a switch timer that activates switching to a delta configuration about twenty seconds after initiating a start operation; and
   a switch timer that activates switching to a delta configuration about twenty-five seconds after initiating a start operation.

266. A progressive start reverse winding induction motor system as described in clause 264 or any other clause, wherein said switch timer comprises a switch timer that activates switching to a delta configuration about twenty seconds after initiating a start operation.
267. A progressive start reverse winding induction motor system as described in clause 260 or any other clause, wherein said start control comprises a passive current establishment control.
268. A progressive start reverse winding induction motor system as described in clause 267 or any other clause, wherein said passive current establishment control comprises a secondary current limitation effect control.
269. A progressive start reverse winding induction motor system as described in clause 268 or any other clause, wherein said secondary current limitation effect control comprises a current decrease after initial transition control.
270. A progressive start reverse winding induction motor system as described in clause 269 or any other clause, wherein said current decrease after initial transition control comprises a low inrush current maintenance control that acts throughout a start of said reverse winding induction motor.
271. A progressive start reverse winding induction motor system as described in clause 270 or any other clause, wherein said low inrush current maintenance control comprises a substantially not more than one and one-half full load current throughout start control.
272. A progressive start reverse winding induction motor system as described in clause 267 or any other clause, wherein said passive current establishment control comprises a substantially not more than average operational current start control.
273. A progressive start reverse winding induction motor system as described in clause 272 or any other clause, wherein said substantially not more than average operational current start control comprises a reverse winding effect control.
274. A progressive start reverse winding induction motor system as described in clause 260 or any other clause, wherein said start control comprises a substantially direct source voltage application control.
275. A progressive start reverse winding induction motor system as described in clause 260 or any other clause, wherein said start control comprises a passive switched element control that causes a current ramp down.
276. A progressive start reverse winding induction motor system as described in clause 275 or any other clause, wherein said passive switched element control causes a further reduced current as speed increases.
277. A progressive start reverse winding induction motor system as described in clause 275 or any other clause, wherein said passive switched element control comprises a delayed reverse winding effect control.
278. A progressive start reverse winding induction motor system as described in clause 260 or any other clause, wherein said at least one forward winding comprises at least one forward winding establishing a forward winding magnetic flux space, and or any other clause, wherein said at least one reverse winding comprises at least one reverse winding establishing a reverse winding magnetic flux space, and or any other clause, wherein said forward reverse winding magnetic flux space and said reverse winding magnetic flux space coincide to at least some degree.
279. A progressive start reverse winding induction motor system as described in clause 278 or any other clause, wherein said core comprises a core sized to fit what currently industry association standards establish as a higher than rated horsepower motor.
280. A progressive start reverse winding induction motor system as described in clause 278 or any other clause, wherein said at least one forward winding and said at least one reverse winding comprise differential turn windings.
281. A progressive start reverse winding induction motor system as described in clause 280 or any other clause, wherein said differential turn windings comprises at least one forward winding having at least about five times the number of winding turns of said at least one reverse winding.
282. A progressive start reverse winding induction motor system as described in clause 280 or any other clause, wherein said differential turn windings comprises at least one forward winding having at least about four times the number of said at least one reverse winding.
283. A progressive start reverse winding induction motor system as described in clause 280 or any other clause, wherein said differential turn windings comprises at least one forward winding having at least about three times the number of said at least one reverse winding.
284. A progressive start reverse winding induction motor system as described in clause 280 or any other clause, wherein said differential turn windings comprises at least one forward winding having at least about two and a half times the number of said at least one reverse winding.
285. A progressive start reverse winding induction motor system as described in clause 280 or any other clause, wherein said differential turn windings comprises at least one forward winding having at least about two point one times the number of said at least one reverse winding.
286. A progressive start reverse winding induction motor system as described in clause 280 or any other clause, wherein said differential turn windings comprises at least one forward winding having at least greater than two times the number of said at least one reverse winding.
287. A progressive start reverse winding induction motor system as described in clause 280 or any other clause, and further comprising a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.
288. A progressive start reverse winding induction motor system as described in clause 280 or any other clause, and further comprising a capacitor connected in series with each of said at least one reverse winding or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

289. A progressive start reverse winding induction motor system as described in clause 280 or any other clause, and further comprising a capacitor connected in series with each of said at least one reverse winding or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

290. A progressive start reverse winding induction motor system as described in clause 260 or any other clause, wherein said at least one reverse winding comprises at least one delta configuration reverse winding.

291. A progressive start reverse winding induction motor system as described in clause 261 or any other clause, wherein said at least one reverse winding comprises multiple windings in a three phase delta configuration.

292. A progressive start reverse winding induction motor system as described in clause 280 or any other clause, wherein said differential turn windings comprises differential turn windings utilizing a forward winding to reverse winding ratio selected to fit within a currently industry association standards established sized motor encasement for the rated horsepower of said motor.

293. A progressive start reverse winding induction motor system as described in clause 280 or any other clause, wherein said differential turn windings comprises differential turn windings utilizing a forward winding wire to reverse winding wire cross sectional area ratio selected to fit within a currently industry association standards established sized motor encasement for the rated horsepower of said motor.

294. A progressive start reverse winding induction motor system as described in clause 260 or any other clause, wherein said or any other clause, wherein said at least one forward winding and said at least one reverse winding comprises a forward winding to reverse winding wire cross sectional area ratio of less than about two to about one half.

295. A method of providing an operationally stable induction motor comprising the steps of:
  providing at least one motor winding;
  providing a rotor;
  providing a core; and
  encasing said at least one motor winding, said rotor, and said core, in a motor case,
  or any other clause, wherein said induction motor exhibits negative reactive power.

296. A method of providing an operationally stable induction motor as described in clause 295 or any other clause, wherein said step of providing at least one additional electrical motor comprises the step of providing at least one torque producing electrical motor.

297. A method of providing an operationally stable induction motor as described in clause 296 or any other clause, wherein said step of providing at least one additional electrical motor comprises the step of providing at least one additional electrical motor that is not prone to overheating in substantially full load operation.

298. A method of providing an operationally stable induction motor as described in clause 297 or any other clause, wherein said step of providing at least one additional electrical motor comprises the step of providing at least one additional electrical motor capable of long term operation.

299. A method of providing an operationally stable induction motor as described in clause 295 or any other clause, wherein said step of providing at least one motor winding comprises the steps of:
  providing at least one forward winding; and
  providing at least one reverse winding.

300. A method of providing an operationally stable induction motor as described in clause 299 or any other clause, and further comprising the step of connecting a capacitor in series with said at least one reverse winding.

301. A method of providing an operationally stable induction motor as described in clause 300 or any other clause, wherein said step of connecting a capacitor in series with said at least one reverse winding comprises the step of connecting a capacitor, having a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

302. A method of providing an operationally stable induction motor as described in clause 300 or any other clause, wherein said step of connecting a capacitor in series with said at least one reverse winding comprises the step of connecting a capacitor, having a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

303. A method of providing an operationally stable induction motor as described in clause 300 or any other clause, wherein said step of connecting a capacitor in series with said at least one reverse winding comprises the step of connecting a capacitor, having a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

304. A method of providing an operationally stable induction motor as described in clause 299 or any other clause, wherein said step of providing at least one forward and reverse winding electrical motor comprises the step of providing at least one forward winding establishing a forward winding magnetic flux space and providing at least one reverse winding establishing a reverse winding magnetic flux space, and or any other clause, wherein said forward reverse winding magnetic flux space and said reverse winding magnetic flux space coincide to at least some degree.

305. A method of providing an operationally stable induction motor as described in clause 304 or any other clause, wherein said at least one forward winding and said at least one reverse winding comprise opposite direction windings.

306. A method of providing an operationally stable induction motor as described in clause 295 or any other clause, wherein said step of correcting to at least some degree said initial inductive component by said at least one additional electrical motor comprises the step of utilizing a power over-rated core in said at least one additional electrical motor.

307. A method of providing an operationally stable induction motor as described in clause 305 or any other clause, wherein said at least one forward winding has at least about five times the number of winding turns of said at least one reverse winding.

308. A method of providing an operationally stable induction motor as described in clause SCm13 or any other clause, wherein said at least one forward winding has at least about four times the number of winding turns of said at least one reverse winding.

309. A method of providing an operationally stable induction motor as described in clause 305 or any other clause, wherein said at least one forward winding has at least about three times the number of winding turns of said at least one reverse winding.

310. A method of providing an operationally stable induction motor as described in clause 305 or any other clause, wherein said at least one forward winding has at least about two and a half times the number of winding turns of said at least one reverse winding.

311. A method of providing an operationally stable induction motor as described in clause 305 or any other clause, wherein said at least one forward winding has at least about two point one times the number of winding turns of said at least one reverse winding.

312. A method of providing an operationally stable induction motor as described in clause 305 or any other clause, wherein said at least one forward winding has at least greater than two times the number of winding turns of said at least one reverse winding.

313. A method of providing an operationally stable induction motor as described in clause 295 or any other clause, wherein said step of providing at least one additional electrical motor comprises the step of providing at least one additional electrical motor utilizing a core sized to fit what currently industry association standards establish as a higher than rated horsepower motor.

314. A method of providing an operationally stable induction motor as described in clause 313 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor.

315. A method of providing an operationally stable induction motor as described in clause 313 or any other clause, and further comprising the step of encasing said motor in a currently industry association standards established sized motor encasement for that horsepower rated motor, and or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor fit within a currently industry association standards established sized motor encasement for that horsepower rated motor.

316. A method of providing an operationally stable induction motor as described in clause 313 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

317. A method of providing an operationally stable induction motor as described in clause 313 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

318. A method of providing an operationally stable induction motor as described in clause 305 or any other clause, and further comprising the step of encasing said motor in a currently industry association standards established sized motor encasement for that rated horsepower, and or any other clause, wherein said step of providing at least one additional electrical motor comprises the step of providing at least one additional electrical motor utilizing a forward winding to reverse winding ratio selected to fit within said currently industry association standards established sized motor encasement for that rated horsepower.

319. A method of providing an operationally stable induction motor as described in clause 305 or any other clause, wherein said step of providing at least one additional electrical motor comprises the step of providing at least one additional electrical motor utilizing a forward winding to reverse winding ratio of from at least about two point one times the number of winding turns of said at least one reverse winding to about three times the number of winding turns of said at least one reverse winding.

320. A method of providing an operationally stable induction motor as described in clause 305 or any other clause, and further comprising the step of encasing said motor in a currently industry association standards established sized motor encasement for the horsepower rating of said motor, and or any other clause, wherein said step of providing at least one additional electrical motor comprises the step of providing at least one additional electrical motor utilizing a forward winding to reverse winding wire cross sectional area ratio sized to fit within said currently industry association standards established sized motor encasement for the horsepower rating of said motor.

321. A method of providing an operationally stable induction motor as described in clause 295 or any other clause, wherein said step of providing at least one additional electrical motor comprises the step of providing at least one additional electrical motor utilizing a forward winding to reverse winding wire cross sectional area ratio of less than about two to about one half.

322. An operationally stable induction motor comprising:
 a motor winding;
 a rotor;
 a core;
 a motor case;
 or any other clause, wherein said induction motor exhibits negative reactive power.

323. An operationally stable induction motor as described in clause 322 or any other clause, wherein at least one additional electrical motor comprises at least one torque producing electrical motor.

324. An operationally stable induction motor as described in clause 323 or any other clause, wherein at least one torque producing electrical motor comprises at least one not prone to overheating at full load operation electrical motor.

325. An operationally stable induction motor as described in clause 324 or any other clause, wherein at least one not prone to overheating at full load operation electrical motor comprises at least one not prone to overheating at full load operation electrical motor capable of long term operation.

326. An operationally stable induction motor as described in clause 322 or any other clause, wherein motor winding comprises at least one forward winding and at least one reverse winding.

327. An operationally stable induction motor as described in clause 326 or any other clause, and further comprising a capacitor connected in series said at least one reverse winding.

328. An operationally stable induction motor as described in clause 327 or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

329. An operationally stable induction motor as described in clause 327 or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

330. An operationally stable induction motor as described in clause 327 or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

331. An operationally stable induction motor as described in clause 299 or any other clause, wherein said at least one forward winding comprises at least one forward winding establishing a forward winding magnetic flux space, and or any other clause, wherein said at least one reverse winding comprises at least one reverse winding establishing a reverse winding magnetic flux space, and or any other clause, wherein said forward reverse winding magnetic flux space and said reverse winding magnetic flux space coincide to at least some degree.

332. An operationally stable induction motor as described in clause 331 or any other clause, wherein at least one forward winding and said at least one reverse winding comprises opposite direction windings.

333. An operationally stable induction motor as described in clause 322 or any other clause, wherein said at least one additional electrical motor comprises a power over-rated core.

334. An operationally stable induction motor as described in clause 332 or any other clause, wherein at least one forward winding comprises at least about five times the number of said reverse windings.

335. An operationally stable induction motor as described in clause 332 or any other clause, wherein at least one forward winding comprises at least about four times the number of said reverse windings.

336. An operationally stable induction motor as described in clause 332 or any other clause, wherein at least one forward winding comprises at least about three times the number of said reverse windings.

337. An operationally stable induction motor as described in clause 332 or any other clause, wherein at least one forward winding comprises at least about two and a half times the number of said reverse windings.

338. An operationally stable induction motor as described in clause 332 or any other clause, wherein at least one forward winding comprises at least about two point one times the number of said reverse windings.

339. An operationally stable induction motor as described in clause 332 or any other clause, wherein at least one forward winding comprises at least greater than two times the number of said reverse windings.

340. An operationally stable induction motor as described in clause 322 or any other clause, wherein at least one additional electrical motor comprises a core sized to fit what currently industry association standards establish as a higher than rated horsepower motor.

341. An operationally stable induction motor as described in clause 340 or any other clause, and further comprising a currently industry association standards established sized motor encasement for that horsepower rated motor, and or any other clause, wherein said core sized to fit what currently industry association standards establish as a higher than rated horsepower motor comprises a core sized to fit what currently industry association standards establish as a higher than rated horsepower motor fit within a currently industry association standards established sized motor encasement for that horsepower rated motor.

342. An operationally stable induction motor as described in clause 340 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

343. An operationally stable induction motor as described in clause 340 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

344. An operationally stable induction motor as described in clause 332 or any other clause, and further comprising a currently industry association standards established sized motor encasement for that rated horsepower, and or any other clause, wherein said at least one forward winding and said at least one reverse winding have a forward winding to reverse winding ratio, and or any other clause, wherein said forward winding to reverse winding ratio comprises a forward winding to reverse winding ratio selected to fit within said currently industry association standards established sized motor encasement for that rated horsepower.

345. An operationally stable induction motor as described in clause 332 or any other clause, wherein at least one forward winding and said at least one reverse winding have a forward winding to reverse winding ratio, and or any other clause, wherein said forward winding to reverse winding ratio comprises a forward winding to reverse winding ratio of from at least about two point one to about three.

346. An operationally stable induction motor as described in clause 332 or any other clause, and further comprising a currently industry association standards established sized motor encasement for the horsepower rating of said motor, and or any other clause, wherein said at least one additional electrical motor comprises a forward winding to reverse winding wire cross sectional area ratio sized to fit within said currently industry association standards established sized motor encasement for the horsepower rating of said motor.

347. An operationally stable induction motor as described in clause 322 or any other clause, wherein at least one additional electrical motor comprises at least one additional electrical motor utilizing a forward winding to reverse winding wire cross sectional area ratio of less than about two to about one half.

348. A method of providing an efficiently powered electrical device comprising the steps of:
  providing at least one forward winding;
  providing at least one reverse winding having a forward to reverse winding ratio of greater than two;
  connecting a capacitor in series with said at least one reverse winding;
  providing a core; and
  encasing said at least one forward winding, at least one reverse winding, said capacitor, and said core, in a motor case.

349. A method of providing an efficiently powered electrical device as described in clause 348 or any other clause, and further comprising the step of providing a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

350. A method of providing an efficiently powered electrical device as described in clause 348 or any other clause, and further comprising the step of providing a capacitor connected in series with each of said at least one reverse winding or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

351. A method of providing an efficiently powered electrical device as described in clause 348 or any other clause, and further comprising the step of providing a capacitor connected in series with each of said at least one reverse winding or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

352. A method of providing an efficiently powered electrical device as described in clause 349 or any other clause, wherein said step of providing at least one forward and reverse winding electrical motor comprises the step of providing at least one forward winding establishing a forward winding magnetic flux space and providing at least one reverse winding establishing a reverse winding magnetic flux space, and or any other clause, wherein said forward reverse winding magnetic flux space and said reverse winding magnetic flux space coincide to at least some degree.

353. A method of providing an efficiently powered electrical device as described in clause 352 or any other clause, wherein said at least one forward winding and said at least one reverse winding comprise opposite direction windings.

354. A method of providing an efficiently powered electrical device as described in clause 348 or any other clause, wherein said step of correcting to at least some degree said initial inductive component by said at least one additional electrical motor comprises the step of utilizing a power over-rated core in said at least one additional electrical motor.

355. A method of providing an efficiently powered electrical device as described in clause 348 or any other clause, wherein said step of providing at least one additional electrical motor comprises the step of providing at least one torque producing electrical motor.

356. A method of providing an efficiently powered electrical device as described in clause 355 or any other clause, wherein said step of providing at least one additional electrical motor comprises the step of providing at least one additional electrical motor that is not prone to overheating in substantially full load operation.

357. A method of providing an efficiently powered electrical device as described in clause 356 or any other clause, wherein said step of providing at least one additional electrical motor comprises the step of providing at least one additional electrical motor capable of long term operation.

358. A method of providing an efficiently powered electrical device as described in clause 357 or any other clause, wherein said at least one additional electrical motor comprises an induction motor that exhibits a lag angle of current as compared to voltage chosen from:
- a lag angle of current as compared to voltage of not greater than 80 degrees at a 0 percent maximum rated load;
- a lag angle of current as compared to voltage of not greater than 60 degrees at a 15 percent maximum rated load;
- a lag angle of current as compared to voltage of not greater than 45 degrees at a 25 percent maximum rated load;
- a lag angle of current as compared to voltage of not greater than 30 degrees at a 50 percent maximum rated load;
- a lag angle of current as compared to voltage of not greater than 30 degrees at a 75 percent maximum rated load; and
- a lag angle of current as compared to voltage of not greater than 30 degrees at a 100 percent maximum rated load.

359. A method of providing an efficiently powered electrical device as described in clause 358 or any other clause, wherein said at least one additional electrical motor comprises an induction motor that exhibits a lead angle of current as compared to voltage chosen from:
- a lead angle of current as compared to voltage at 0 percent of maximum rated load;
- a lead angle of current as compared to voltage at 25 percent of maximum rated load;
- a lead angle of current as compared to voltage at 50 percent of maximum rated load;
- a lead angle of current as compared to voltage at 75 percent of maximum rated load;
- a lead angle of current as compared to voltage at 90 percent of maximum rated load;
- a lead angle of current as compared to voltage at 95 percent of maximum rated load; and
- a lead angle of current as compared to voltage at 100 percent of maximum rated load.

360. A method of providing an efficiently powered electrical device as described in clause 357 or any other clause, and further comprising the step of causing current to lead voltage for up to a maximum load by said reverse winding and said capacitor.

361. A method of providing an efficiently powered electrical device as described in clause 357 or any other clause, wherein said at least one additional electrical motor capable of long term operation comprises an induction motor that exhibits parameters chosen from:
- a leading current as compared to voltage at about 0 percent of maximum rated load;
- a leading current as compared to voltage at about 25 percent of maximum rated load;
- a leading current as compared to voltage at about 50 percent of maximum rated load;
- a leading current as compared to voltage at about 75 percent of maximum rated load; and
- a leading current as compared to voltage at about 100 percent of maximum rated load.

362. A method of providing an efficiently powered electrical device as described in clause 353 or any other clause, wherein said at least one forward winding has at least about five times the number of winding turns of said at least one reverse winding.

363. A method of providing an efficiently powered electrical device as described in clause 353 or any other clause, wherein said at least one forward winding has at least about four times the number of winding turns of said at least one reverse winding.

364. A method of providing an efficiently powered electrical device as described in clause 353 or any other clause, wherein said at least one forward winding has at least about three times the number of winding turns of said at least one reverse winding.

365. A method of providing an efficiently powered electrical device as described in clause 353 or any other clause, wherein said at least one forward winding has at least about two and a half times the number of winding turns of said at least one reverse winding.

366. A method of providing an efficiently powered electrical device as described in clause 353 or any other clause, wherein said at least one forward winding has at least about two point one times the number of winding turns of said at least one reverse winding.

367. A method of providing an efficiently powered electrical device as described in clause 353 or any other clause, wherein said at least one forward winding has at least greater than two times the number of winding turns of said at least one reverse winding.

368. A method of providing an efficiently powered electrical device as described in clause 348 or any other clause, wherein said step of providing at least one additional electrical motor comprises the step of providing at least one additional electrical motor utilizing a core sized to fit what currently industry association standards establish as a higher than rated horsepower motor.

369. A method of providing an efficiently powered electrical device as described in clause 368 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor.

370. A method of providing an efficiently powered electrical device as described in clause 368 or any other clause, and further comprising the step of encasing said motor in a currently industry association standards established sized motor encasement for that horsepower rated motor, and or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor fit within a currently industry association standards established sized motor encasement for that horsepower rated motor.

371. A method of providing an efficiently powered electrical device as described in clause 368 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

372. A method of providing an efficiently powered electrical device as described in clause 368 or any other clause, wherein said step of providing at least one additional electrical motor utilizing a core sized to fit what currently industry association standards establish as a higher than rated horsepower motor comprises the step of providing at least one additional electrical motor utilizing a core sized to fit what currently industry association standards establish as a higher than rated horsepower motor sized from larger than one hundred ten percent of a core sized to fit what currently industry association standards establish for that horsepower rated motor to about two hundred percent of a core sized to fit what currently industry association standards establish for that horsepower rated motor.

373. A method of providing an efficiently powered electrical device as described in clause 353 or any other clause, and further comprising the step of encasing said motor in a currently industry association standards established sized motor encasement for that rated horsepower, and or any other clause, wherein said step of providing at least one additional electrical motor comprises the step of providing at least one additional electrical motor utilizing a forward winding to reverse winding ratio selected to fit within said currently industry association standards established sized motor encasement for that rated horsepower.

374. A method of providing an efficiently powered electrical device as described in clause 353 or any other clause, wherein said step of providing at least one additional electrical motor comprises the step of providing at least one additional electrical motor utilizing a forward winding to reverse winding ratio of from at least about two point one times the number of winding turns of said at least one reverse winding to about three times the number of winding turns of said at least one reverse winding.

375. A method of providing an efficiently powered electrical device as described in clause 353 or any other clause, and further comprising the step of encasing said motor in a currently industry association standards established sized motor encasement for the horsepower rating of said motor, and or any other clause, wherein said step of providing at least one additional electrical motor comprises the step of providing at least one additional electrical motor utilizing a forward winding to reverse winding wire cross sectional area ratio sized to fit within said currently industry association standards established sized motor encasement for the horsepower rating of said motor.

376. A method of providing an efficiently powered electrical device as described in clause 348 or any other clause, wherein said step of providing at least one additional electrical motor comprises the step of providing at least one additional electrical motor utilizing a forward winding to reverse winding wire cross sectional area ratio of less than about two to about one half.

377. An induction motor comprising:
  at least one forward winding;
  at least one reverse winding having a forward to reverse winding ratio of greater than two;
  a capacitor connected in series with said at least one reverse winding;
  a core; and
  a motor case.

378. An induction motor as described in clause 377 or any other clause, and further comprising a capacitor connected in series with each of said at least one reverse winding or any other clause, wherein said capacitor has a capacitance value in microfarads of about: from about one and thirty-two hundredths to about one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

379. An induction motor as described in clause 377 or any other clause, and further comprising a capacitor connected in series with each of said at least one reverse winding or any other clause, wherein said capacitor has a capacitance value in microfarads of about: one and thirty-two hundredths times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

380. An induction motor as described in clause 377 or any other clause, and further comprising a capacitor connected in series with each of said at least one reverse winding or any other clause, wherein said capacitor has a capacitance value in microfarads of about: not more than one and one half times, the operational nominal motor current in amps of said at least one additional electric motor, times, the square of the RMS phase-to-phase applied voltage in volts of said at least one additional electric motor, divided by, the square of the RMS rated optimal operational motor voltage in volts of said at least one additional electric motor, and that result times, the rated full load motor current in amps of said at least one additional electric motor for that RMS rated optimal operational motor voltage.

381. An induction motor as described in clause 377 or any other clause, wherein said at least one forward winding comprises at least one forward winding establishing a forward winding magnetic flux space, and or any other clause, wherein said at least one reverse winding comprises at least one reverse winding establishing a reverse winding magnetic flux space, and or any other clause, wherein said forward reverse winding magnetic flux space and said reverse winding magnetic flux space coincide to at least some degree.

382. An induction motor as described in clause 381 or any other clause, wherein at least one forward winding and said at least one reverse winding comprises opposite direction windings.

383. An induction motor as described in clause 377 or any other clause, wherein said at least one additional electrical motor comprises a power over-rated core.

384. An induction motor as described in clause 377 or any other clause, wherein said induction motor comprises at least one torque producing electrical motor.

385. An induction motor as described in clause 384 or any other clause, wherein said induction motor comprises at least one not prone to overheating at full load operation electrical motor.

386. An induction motor as described in clause 385 or any other clause, wherein at least one not prone to overheating at full load operation electrical motor comprises at least one not prone to overheating at full load operation electrical motor capable of long term operation.

387. An induction motor as described in clause 386 or any other clause, wherein said induction motor exhibits a lag angle of current as compared to voltage chosen from:
- a lag angle of current as compared to voltage of not greater than 80 degrees at a 0 percent maximum rated load;
- a lag angle of current as compared to voltage of not greater than 60 degrees at a 15 percent maximum rated load;
- a lag angle of current as compared to voltage of not greater than 45 degrees at a 25 percent maximum rated load;
- a lag angle of current as compared to voltage of not greater than 30 degrees at a 50 percent maximum rated load;
- a lag angle of current as compared to voltage of not greater than 30 degrees at a 75 percent maximum rated load; and
- a lag angle of current as compared to voltage of not greater than 30 degrees at a 100 percent maximum rated load.

388. An induction motor as described in clause 387 or any other clause, wherein said induction motor exhibits a lead angle of current as compared to voltage chosen from:
- a lead angle of current as compared to voltage at 0 percent of maximum rated load;
- a lead angle of current as compared to voltage at 25 percent of maximum rated load;
- a lead angle of current as compared to voltage at 50 percent of maximum rated load;
- a lead angle of current as compared to voltage at 75 percent of maximum rated load;
- a lead angle of current as compared to voltage at 90 percent of maximum rated load;
- a lead angle of current as compared to voltage at 95 percent of maximum rated load;
- a lead angle of current as compared to voltage at 100 percent of maximum rated load.

389. An induction motor as described in clause 386 or any other clause, wherein said reverse winding and capacitor cause current to lead voltage for up to a maximum load.

390. An induction motor as described in clause 386 or any other clause, wherein said induction motor exhibits parameters chosen from:
- a leading current as compared to voltage at about 0 percent of maximum rated load;
- a leading current as compared to voltage at about 25 percent of maximum rated load;
- a leading current as compared to voltage at about 50 percent of maximum rated load;
- a leading current as compared to voltage at about 75 percent of maximum rated load; and
- a leading current as compared to voltage at about 100 percent of maximum rated load.

391. An induction motor as described in clause 382 or any other clause, wherein at least one forward winding comprises at least about five times the number of said reverse windings.

392. An induction motor as described in clause 382 or any other clause, wherein at least one forward winding comprises at least about four times the number of said reverse windings.

393. An induction motor as described in clause 382 or any other clause, wherein at least one forward winding comprises at least about three times the number of said reverse windings.

394. An induction motor as described in clause 382 or any other clause, wherein at least one forward winding comprises at least about two and a half times the number of said reverse windings.

395. An induction motor as described in clause 382 or any other clause, wherein at least one forward winding comprises at least about two point one times the number of said reverse windings.

396. An induction motor as described in clause RMa13 or any other clause, wherein at least one forward winding comprises at least greater than two times the number of said reverse windings.

397. An induction motor as described in clause 377 or any other clause, wherein at least one additional electrical motor comprises a core sized to fit what currently industry association standards establish as a higher than rated horsepower motor.

398. An induction motor as described in clause 397 or any other clause, and further comprising a currently industry association standards established sized motor encasement for that horsepower rated motor, and or any other clause, wherein said core sized to fit what currently industry association standards establish as a higher than rated horsepower motor comprises a core sized to fit what currently industry association standards establish as a higher than rated horsepower motor fit within a currently industry association standards established sized motor encasement for that horsepower rated motor.

399. An induction motor as described in clause 397 or any other clause, wherein said core sized to fit what currently industry association standards establish as a higher than rated horsepower motor comprises a core sized to fit what currently industry association standards establish as a higher than rated horsepower motor sized from larger than one hundred ten percent of a core sized to fit what currently industry association standards establish for that horsepower rated motor to about one hundred twenty five percent of a core sized to fit what currently industry association standards establish for that horsepower rated motor.

400. An induction motor as described in clause 382 or any other clause, and further comprising a currently industry association standards established sized motor encasement for that rated horsepower, and or any other clause, wherein said at least one forward winding and said at least one reverse winding have a forward winding to reverse winding ratio, and or any other clause, wherein said forward winding to reverse winding ratio comprises a forward winding to reverse winding ratio selected to fit within said currently industry association standards established sized motor encasement for that rated horsepower.

401. An induction motor as described in clause 382 or any other clause, wherein at least one forward winding and said at least one reverse winding have a forward winding to reverse winding ratio, and or any other clause, wherein said forward winding to reverse winding ratio comprises a forward winding to reverse winding ratio of from at least about two point one to about three.

402. An induction motor as described in clause 382 or any other clause, and further comprising a currently industry association standards established sized motor encasement for the horsepower rating of said motor, and or any other clause, wherein said at least one additional electrical motor comprises a forward winding to reverse winding wire cross sectional area ratio sized to fit within said currently industry association standards established sized motor encasement for the horsepower rating of said motor.

403. An induction motor as described in clause 377 or any other clause, wherein at least one additional electrical motor comprises at least one additional electrical motor utilizing a forward winding to reverse winding wire cross sectional area ratio of less than about two to about one half.

404. A method of establishing a network of efficiently powered electrical devices as described in clause 8 or any other clause, wherein said at least one forward winding and said at least one reverse winding comprise adjacent, opposite direction windings.

405. A network of efficiently powered electrical devices as described in clause 57 or any other clause, wherein at least one forward winding and said at least one reverse winding comprises adjacent, opposite direction windings.

As can be easily understood from the foregoing, the basic concepts of the present invention may be embodied in a variety of ways. It involves (as only two of the many possible examples) both correction and start techniques as well as devices to accomplish the appropriate correction or start. In this application, the correction and start techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure. The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, as either may be specified. For example, using percentage values as one example, for the aspect of a start operation being substantially complete as but one example, it should be understood that embodiments of the invention may encompass the option of percentage values that include 99.5%, 99%, 97%, 95%, 92% or even 90% of start being complete. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "start control" should be understood to encompass disclosure of the act of "starting"—whether explicitly discussed or not— and, conversely, were there effectively disclosure of the act of "starting", such a disclosure should be understood to encompass disclosure of a "start element," a "starter" and even a "means for starting" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any standards or other externals mentioned in this application for patent, any patents, publications, or other references mentioned in this application or listed in an information disclosure with this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s). Accordingly, all references listed in the list of references below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

References to be Incorporated by Reference
U.S. PATENTS

| Pat. No. | Kind Code | Issue Date | Name of Patentee or Applicant of cited Document |
|---|---|---|---|
| 5,212,435 | | 1993 May 18 | Dutro |
| 2,100,660 | | 1937 Nov. 30 | Greiner |
| 4,063,135 | | 1977 Dec. 13 | Wanlass |
| 4,095,149 | | 1978 Jun. 13 | Wanlass |
| 4,132,932 | | 1979 Jan. 2 | Wanlass |
| 4,134,052 | | 1979 Jan. 9 | Wanlass et al. |
| 4,152,630 | | 1979 May 1 | Wanlass |
| 4,187,457 | | 1980 Feb. 5 | Wanlass |
| 4,338,557 | | 1982 Jul. 6 | Wanlass |
| 4,446,416 | | 1984 May 1 | Wanlass |

-continued

References to be Incorporated by Reference
U.S. PATENTS

| Pat. No. | Kind Code | Issue Date | Name of Patentee or Applicant of cited Document |
|---|---|---|---|
| 7,034,426 | B2 | 2006 Apr. 25 | Goche |
| 7,227,288 | B2 | 2007 Jun. 5 | Goche |
| 8,093,857 | B1 | 2012 Jan. 10 | Kolomeitsev |
| 8,773,062 | B2 | 2014 Jul. 8 | Kolomeitsev |
| 9,997,983 | B2 | 2018 Jun. 12 | Nordstrom et al. |

U.S. PATENT APPLICATION PUBLICATIONS

| Publication Number | Kind Code | Publication Date | Name of Patentee or Applicant of cited Document |
|---|---|---|---|
| 20140253054 | A1 | 2014 Sep. 11 | Frampton et al. |
| 20150349598 | A1 | 2015 Dec. 3 | Gieras et al. |
| 20160204683 | A1 | 2016 Jul. 14 | Nordstrom et al. |
| 20160352204 | A1 | 2016 Dec. 1 | LI et al. |

U.S. PATENT APPLICATION PUBLICATIONS

| Foreign Document Number | Country Code | Kind Code | Publication Date | Name of Patentee or Applicant of cited Document |
|---|---|---|---|---|
| 104038004 | CN | A | 2014 Oct. 9 | Frampton et al. |
| 2017070101 | JP | A | 2017 Jun. 4 | Keio et al. |
| 2559197 | RU | C2 | 2015 Oct. 8 | Golovan |
| 24416 | SI | A | 2014 Dec. 31 | Mandelj et al. |
| 2004001933 | WO | A2 | 2003 Dec. 31 | Goche |
| 2006130565 | WO | A3 | 2006 Dec. 7 | Goche |

NON-PATENT LITERATURE DOCUMENTS

Power Management, Waveform audit: is your inductor saturated?, https://e2e.ti.com/blogs_/b/powerhouse/archive/2016/09/22/ waveform-audit, Jul. 19, 2019, 4 pages
Wikipedia, Saturation (magnetic), https://en.wikipedia.org/wiki/ Saturation_(magnetic), Jul. 19, 2019, 3 pages
Quora, What is inductor saturation current?, https://www.quora.com/ What-is-inductor-saturation-current, Jul. 19, 2019, 4 pages
Circuit Digese, What is Inductor Coupling- Inductors in Series & Parallel Combinations, https://circuitdigest.com/tutorial/what-is-inductor-couple-series-and-parallel-combinations, Jul. 19, 2019, 16 pages Thus, the applicant(s) should be understood to have support to claim and make a statement of invention to at least: i) each of the motor devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein. In addition and as to computer aspects and each aspect amenable to programming or other electronic automation, it should be understood that in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of establishing a network of efficiently powered electrical devices comprising the steps of:
    providing at least one electrical motor;
    establishing an electrical connection to said at least one electrical motor wherein said electrical connection to said at least one electrical motor is capable of exhibiting characteristics of an initial electrical network having an initial inductive power factor condition having an initial inductive component;
    providing at least one forward and reverse winding electrical motor comprising:
        at least one forward winding establishing a forward winding magnetic flux space;
        at least one opposite direction reverse winding establishing a reverse winding magnetic flux space, wherein said forward winding magnetic flux space and said reverse winding magnetic flux space coincide to at least some degree, and wherein said at least one forward winding has at least about three times the number of winding turns of said at least one opposite direction reverse winding; and
        a capacitor connected in series with each of said at least one opposite direction reverse winding, wherein said capacitor has a capacitance value in microfarads of about: from about one and thirty-two hundredths to about one and one half times, the operational nominal motor current in amps of said at least one forward and reverse winding electric motor, times, the square of the RMS applied voltage in volts of said at least one forward and reverse winding electric motor, divided by, the square of the RMS rated optimal operational motor voltage in volts of said at least one forward and reverse winding electric motor, and that result times, the rated full load motor current in amps of said at least one forward and reverse winding electric motor for that RMS rated optimal operational motor voltage;
    electrically connecting said at least one forward and reverse winding electrical motor with said initial electrical network wherein a connection of said at least one forward and reverse winding electrical motor with said initial electrical network is capable of exhibiting characteristics of a corrected inductive power factor condition; and
    variably correcting to at least some degree, by said at least one forward and reverse winding electrical motor while accomplishing at least some mechanical work by said at least one forward and reverse winding electrical motor, said initial inductive component without altering the character of an electrical correction component that contributes to varying the correction.

2. A method of establishing a network of efficiently powered electrical devices as described in claim 1 wherein said at least one forward and reverse winding electrical motor comprises a core sized to fit what currently industry association standards establish as a higher than rated horsepower motor.

3. A method of establishing a network of efficiently powered electrical devices as described in claim 1 and further comprising the step of encasing said at least one forward and reverse winding electrical motor in a currently industry association standards established sized motor encasement for that rated horsepower, and wherein said step of providing at least one forward and reverse winding electrical motor comprises the step of providing at least one forward and reverse winding electrical motor utilizing a forward winding to reverse winding ratio selected to fit within said currently industry association standards established sized motor encasement for that rated horsepower.

4. A method of establishing a network of efficiently powered electrical devices as described in claim 1 and further comprising the step of encasing said at least one forward and reverse winding electrical motor in a currently industry association standards established sized motor encasement for the horsepower rating of said motor, and wherein said step of providing at least one forward and reverse winding electrical motor comprises the step of providing at least one forward and reverse winding electrical motor utilizing a forward winding to reverse winding wire cross sectional area ratio sized to fit within said currently industry association standards established sized motor encasement for the horsepower rating of said motor.

5. A method of establishing a network of efficiently powered electrical devices as described in claim 1 wherein said step of providing at least one forward and reverse winding electrical motor comprises the step of providing at least one torque producing electrical motor.

6. A method of establishing a network of efficiently powered electrical devices as described in claim 1 wherein said step of providing at least one forward and reverse winding electrical motor comprises the step of providing at least one forward and reverse winding electrical motor that is not prone to overheating in substantially full load operation.

7. A method of establishing a network of efficiently powered electrical devices as described in claim 1 wherein said step of providing at least one forward and reverse winding electrical motor comprises the step of providing at least one forward and reverse winding electrical motor capable of long term operation.

8. A method of establishing a network of efficiently powered electrical devices as described in claim 1 wherein said step of variably correcting to at least some degree, by said at least one forward and reverse winding electrical motor while accomplishing at least some mechanical work by said at least one forward and reverse winding electrical motor, said initial inductive component without altering the character of an electrical correction component that contributes to varying the correction comprises the step of utilizing a power over-rated core in said at least one forward and reverse winding electrical motor.

9. A method of providing an efficiently powered electrical device as described in claim 1 wherein said at least one forward and reverse winding electrical motor comprises an induction motor that exhibits a lag angle of current as compared to voltage chosen from:
- a lag angle of current as compared to voltage of not greater than 80 degrees at a 0 percent maximum rated load;
- a lag angle of current as compared to voltage of not greater than 60 degrees at a 15 percent maximum rated load;
- a lag angle of current as compared to voltage of not greater than 45 degrees at a 25 percent maximum rated load;
- a lag angle of current as compared to voltage of not greater than 30 degrees at a 50 percent maximum rated load;
- a lag angle of current as compared to voltage of not greater than 30 degrees at a 75 percent maximum rated load; and
- a lag angle of current as compared to voltage of not greater than 30 degrees at a 100 percent maximum rated load.

10. A method of establishing a network of efficiently powered electrical devices as described in claim 1 wherein said at least one forward and reverse winding electrical motor comprises an induction motor that exhibits a lead angle of current as compared to voltage chosen from:
- a lead angle of current as compared to voltage at 0 percent of maximum rated load;
- a lead angle of current as compared to voltage at 25 percent of maximum rated load;
- a lead angle of current as compared to voltage at 50 percent of maximum rated load;
- a lead angle of current as compared to voltage at 75 percent of maximum rated load;
- a lead angle of current as compared to voltage at 90 percent of maximum rated load;
- a lead angle of current as compared to voltage at 95 percent of maximum rated load; and
- a lead angle of current as compared to voltage at 100 percent of maximum rated load.

11. A method of establishing a network of efficiently powered electrical devices comprising the steps of:
- providing at least one electrical motor;
- establishing an electrical connection to said at least one electrical motor wherein said electrical connection to said at least one electrical motor is capable of exhibiting characteristics of an initial electrical network having an initial inductive power factor condition having an initial inductive component;
- providing at least one forward and reverse winding electrical motor;
- electrically connecting said at least one forward and reverse winding electrical motor with said initial electrical network wherein a connection of said at least one forward and reverse winding electrical motor with said initial electrical network is capable of exhibiting characteristics of a corrected inductive power factor condition; and
- correcting to at least some degree said initial inductive component by said at least one forward and reverse winding electrical motor.

12. A method of establishing a network of efficiently powered electrical devices as described in claim 11 wherein said at least one forward winding and said at least one reverse winding comprise opposite direction windings, and wherein said at least one forward winding has at least about five times the number of winding turns of said at least one reverse winding.

13. A method of establishing a network of efficiently powered electrical devices as described in claim 11 wherein said at least one forward winding and said at least one reverse winding comprise opposite direction windings, and wherein said at least one forward winding has at least about two and a half times the number of winding turns of said at least one reverse winding.

14. A method of establishing a network of efficiently powered electrical devices as described in claim 11 wherein said at least one forward winding and said at least one reverse winding comprise opposite direction windings, and wherein said at least one forward winding has at least greater than two times the number of winding turns of said at least one reverse winding.

15. A method of establishing a network of efficiently powered electrical devices as described in claim 11 and further comprising the step of providing a capacitor connected in series with each of said at least one reverse winding, wherein said capacitor has a capacitance value in microfarads of about: from about one and thirty-two hundredths to about one and one half times, the operational nominal motor current in amps of said at least one forward and reverse winding electric motor, times, the square of the RMS phase-to-phase applied voltage in volts of said at least one forward and reverse winding electric motor, divided by, the square of the RMS rated optimal operational motor voltage in volts of said at least one forward and reverse winding electric motor, and that result times, the rated full load motor current in amps of said at least one forward and reverse winding electric motor for that RMS rated optimal operational motor voltage.

16. A method of establishing a network of efficiently powered electrical devices as described in claim 11 wherein said step of providing at least one forward and reverse winding electrical motor comprises the step of providing at least one forward and reverse winding electrical motor utilizing a core sized to fit what currently industry association standards establish as a higher than rated horsepower motor.

17. A method of establishing a network of efficiently powered electrical devices comprising the steps of:
- providing at least one predominantly inductive electrical device;
- establishing an electrical connection to said at least one predominantly inductive electrical device wherein said electrical connection to said at least one predominantly inductive electrical device is capable of exhibiting characteristics of an initial electrical network having an initial inductive power factor condition having an initial inductive component;
- electrically connecting at least one work producing forward and reverse winding electrical device with said initial electrical network wherein a connection of said at least one work producing forward and reverse winding electrical device with said initial electrical network is capable of exhibiting characteristics of corrected inductive power factor condition; and
- correcting to at least some degree said initial inductive component by said at least one work producing forward and reverse winding electrical device.

18. A method of establishing a network of efficiently powered electrical devices as described in claim 17 wherein said step of correcting to at least some degree said initial inductive component by said at least one work producing forward and reverse winding electrical device comprises the step of causing, by said at least one work producing forward and reverse winding electrical device, a reduction in the power consumed by said at least one electrical network and said at least one work producing forward and reverse winding electrical device for at least one given load percentage condition above 50% as compared to the power that would have been consumed by said at least one electrical network without said at least one work producing forward and reverse winding electrical device at said same load percentage chosen from:

- causing, by said at least one work producing forward and reverse winding electrical motor, at least about a 1% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage;
- causing, by said at least one work producing forward and reverse winding electrical motor, at least about a 2% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage;
- causing, by said at least one work producing forward and reverse winding electrical motor, at least about a 4% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage;
- causing, by said at least one work producing forward and reverse winding electrical motor, at least about a 8% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage;
- causing, by said at least one work producing forward and reverse winding electrical motor, at least about a 10% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage;
- causing, by said at least one work producing forward and reverse winding electrical motor, at least about a 15% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage;
- causing, by said at least one work producing forward and reverse winding electrical motor, at least about a 20% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage; and
- causing, by said at least one work producing forward and reverse winding electrical motor, at least about a 25% percent reduction in the power consumed by said at least one electrical network and said at least one work producing forward and reverse winding electrical device as compared to the power that would have been consumed by said at least one electrical network without said at least one work producing forward and reverse winding electrical device at said same load percentage.

* * * * *